US008712397B2

(12) United States Patent
Feng

(10) Patent No.: US 8,712,397 B2
(45) Date of Patent: Apr. 29, 2014

(54) METHOD AND APPARATUS FOR CONTROLLABLE COMMUNICATION

(76) Inventor: Guang Feng, Matsuzaki-cho (JP)

( * ) Notice: Subject to any disclaimer, the term of this patent is extended or adjusted under 35 U.S.C. 154(b) by 2608 days.

(21) Appl. No.: 11/194,906

(22) Filed: Aug. 2, 2005

(65) Prior Publication Data

US 2006/0212561 A1   Sep. 21, 2006

Related U.S. Application Data

(63) Continuation-in-part of application No. PCT/JP2004/001182, filed on Feb. 5, 2004, which is a continuation-in-part of application No. PCT/JP03/12014, filed on Sep. 19, 2003.

(30) Foreign Application Priority Data

Feb. 10, 2003 (JP) .................................. 2003-70953
Jun. 22, 2005 (JP) .................................. 2005-181485

(51) Int. Cl.
*H04M 3/00* (2006.01)
(52) U.S. Cl.
USPC ........ 455/420; 455/410; 455/411; 455/414.1; 455/415; 455/418; 715/741; 715/743
(58) Field of Classification Search
USPC ................ 455/410–411, 412.1–412.2, 413, 455/414.1–414.4, 415, 418–420, 445, 41.2; 715/741–748; 705/64–79
See application file for complete search history.

(56) References Cited

U.S. PATENT DOCUMENTS

| 5,586,025 | A | * | 12/1996 | Tsuji et al. ................... 715/207 |
| 5,594,902 | A | * | 1/1997 | Nishigaya et al. ............ 718/102 |
| 5,661,783 | A | * | 8/1997 | Assis .......................... 379/88.01 |
| 5,983,200 | A | * | 11/1999 | Slotznick ........................ 705/26 |
| 6,005,576 | A | * | 12/1999 | Kojima et al. ................ 715/810 |
| 6,171,109 | B1 | * | 1/2001 | Ohsuga ......................... 434/118 |
| 6,370,235 | B1 | | 4/2002 | Heiner |
| 6,691,156 | B1 | | 2/2004 | Drummond et al. |
| 7,103,167 | B2 | * | 9/2006 | Brahm et al. ............. 379/211.02 |
| 7,103,630 | B2 | | 9/2006 | Kim et al. |
| 7,177,651 | B1 | | 2/2007 | Almassy |
| 7,428,303 | B2 | * | 9/2008 | Campbell et al. ........ 379/265.09 |
| 7,472,187 | B2 | * | 12/2008 | Malik .......................... 709/224 |
| 7,573,995 | B2 | * | 8/2009 | Gross et al. ............. 379/210.01 |

FOREIGN PATENT DOCUMENTS

| JP | 05-014488 | 1/1993 |
| JP | 11-068828 | 3/1999 |
| JP | 11-234393 | 8/1999 |
| JP | 2000-010880 | 1/2000 |

(Continued)

OTHER PUBLICATIONS

Patent Abstracts of Japan, Publication No. 11-068828, Sep. 1999.

(Continued)

*Primary Examiner* — Tuan A Tran

(57) ABSTRACT

Communication and a communications apparatus are controlled with a communication intermediating apparatus. Multiple methods of processing communication requests are provided. Decided rules comprising of pairs of identification information of communication requests and methods of processing are recorded beforehand. When a communication request is received, the identification of the communication request is distinguished, an applying rule is picked from the recorded rules, and the communication request is processed. A virtual account to be set maximum payment amount beforehand is used, and electronic transactions communication is done.

140 Claims, 46 Drawing Sheets

(56) References Cited

FOREIGN PATENT DOCUMENTS

| | | |
|---|---|---|
| JP | 2000-048283 | 2/2000 |
| JP | 2000-123296 | 4/2000 |
| JP | 2000-163341 | 6/2000 |
| JP | 2001-217861 | 8/2001 |
| JP | 2002-042273 | 2/2002 |
| JP | 2002-290566 | 10/2002 |
| JP | 2002-344524 | 11/2002 |
| JP | 2002-374307 | 12/2002 |
| JP | 2003-018636 | 1/2003 |
| JP | 2003-036230 | 2/2003 |
| JP | 2003-141043 | 5/2003 |
| JP | 2003-216548 | 7/2003 |
| JP | 2003-333097 | 11/2003 |

OTHER PUBLICATIONS

Patent Abstracts of Japan, Publication No. 2000-123296.
English language translation of parts of the foreign patent document, Cite No. 2, JP, 2000-123296.
Patent Abstracts of Japan, Publication No. 05-014488, Jan. 1993.
Patent Abstracts of Japan, Publication No. 2000-163341.
English language translation of parts of the foreign patent document, Cite No. 4, JP, 2000-163341.
Patent Abstracts of Japan, Publication No. 2002-344524.
English language translation of parts of the foreign patent document, Cite No. 5, JP, 2002-344524.
Patent Abstracts of Japan, Publication No. 2000-010880.
English language translation of parts of the foreign patent document, Cite No. 6, JP, 2000-010880.
Patent Abstracts of Japan, Publication No. 2003-141043.
English language translation of parts of the foreign patent document, Cite No. 7, JP, 2003-141043.
Patent Abstracts of Japan, Publication No. 2002-374307.
Patent Abstracts of Japan, Publication No. 2003-036230.
Patent Abstracts of Japan, Publication No. 2001-217861.
Patent Abstracts of Japan, Publication No. 2002-290566.
Patent Abstracts of Japan, Publication No. 2000-048283.
Patent Abstracts of Japan, Publication No. 2002-042273.
English language translation of parts of the foreign patent document, Cite No. 13, JP, 2002-042273.
Patent Abstracts of Japan, Publication No. 11-234393, Aug. 1999.
English language translation of parts of the foreign patent document, Cite No. 13, JP, 11-234393, Aug. 1999.
Patent Abstracts of Japan, Publication No. 2003-018636.
Patent Abstracts of Japan, Publication No. 2003-333097.
Patent Abstracts of Japan, Publication No. 2003-216548.

* cited by examiner

FIG. 4

Field Name | Field Specifications

Treatment-set data database (TDB)

| Treatment ID | Identifier, Primary Key |
|---|---|
| Treatment | Text |

FIG. 5

1st RuleSet data database on communication initiator and Treatment (R1DB)

| Item 1 | Signs/Text/Sound/Images |
|---|---|
| Item 2 | Signs/Text/Sound/Images |
| ... | ...... |
| Item n | Signs/Text/Sound/Images |
| Treatment ID | Identifier, External Key |

FIG. 6

Presentation information data database (GDB)

| Presentation information | Text/Sound/Image |
|---|---|

FIG. 7

2nd RuleSet data database on keyword and Treatment (R2DB)

| Keyword | Signs/Text/Sound/Images |
|---|---|
| Treatment ID | Identifier, External Key |

FIG. 8

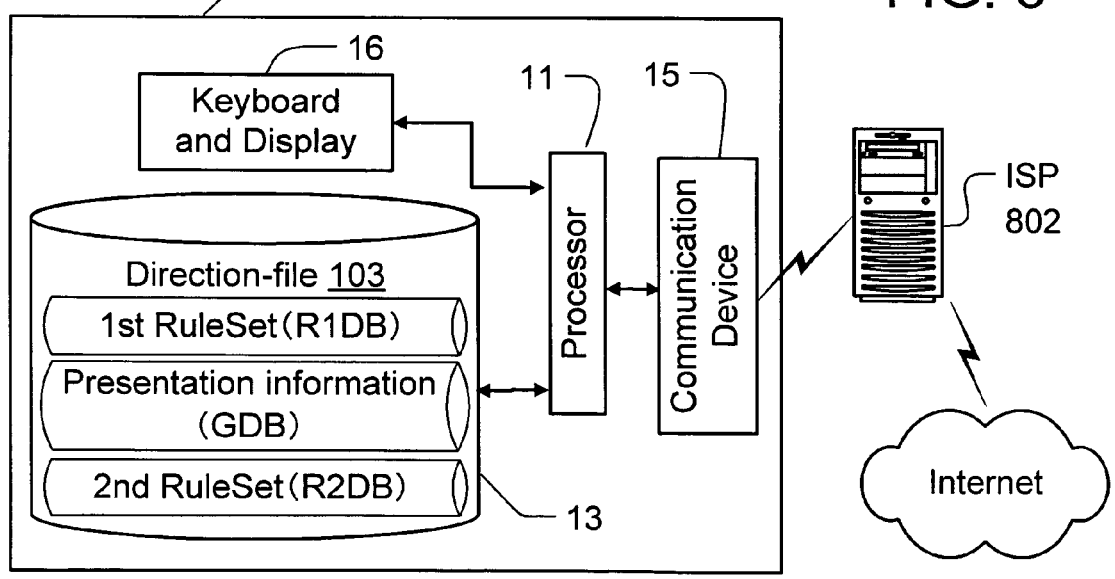

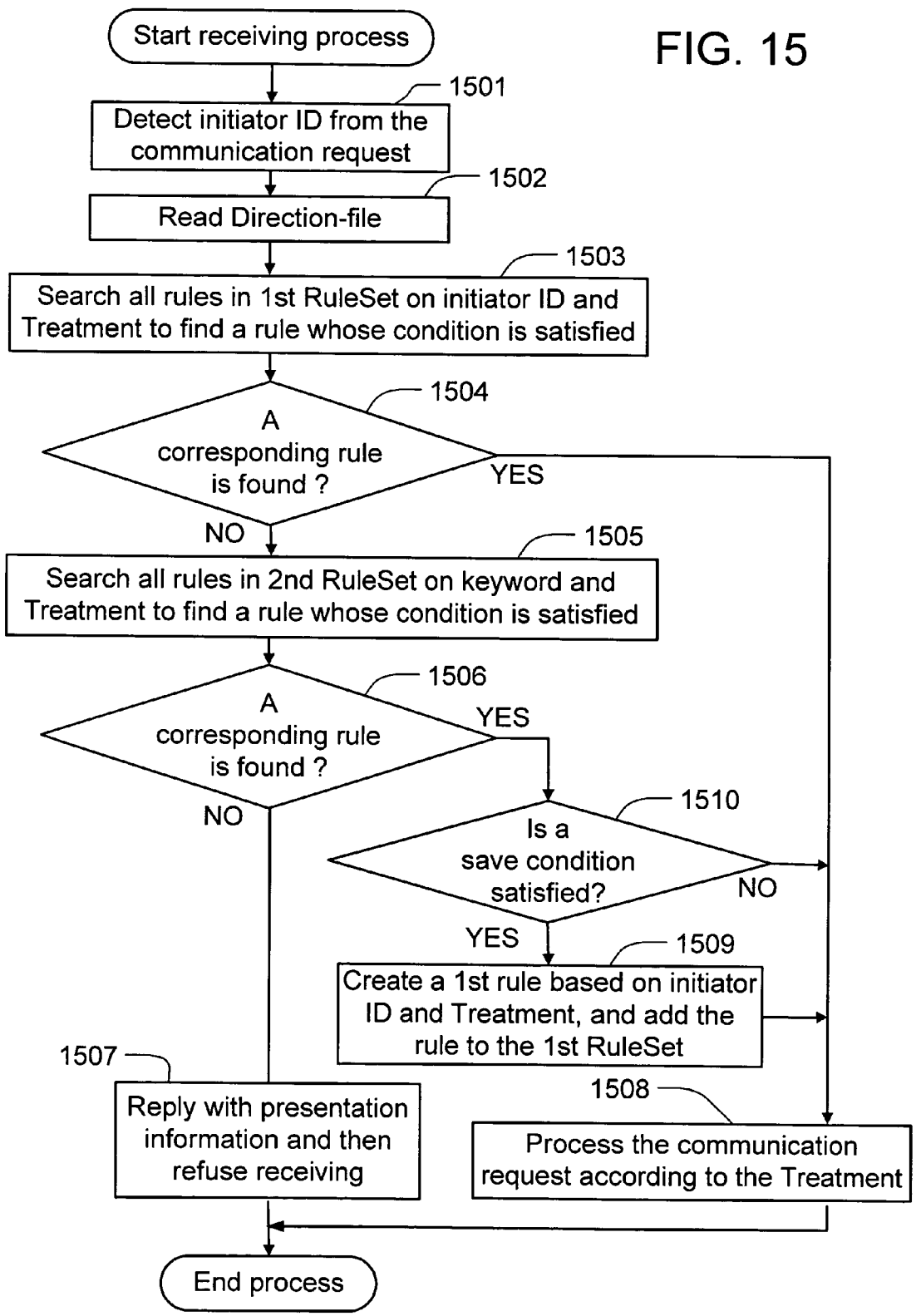

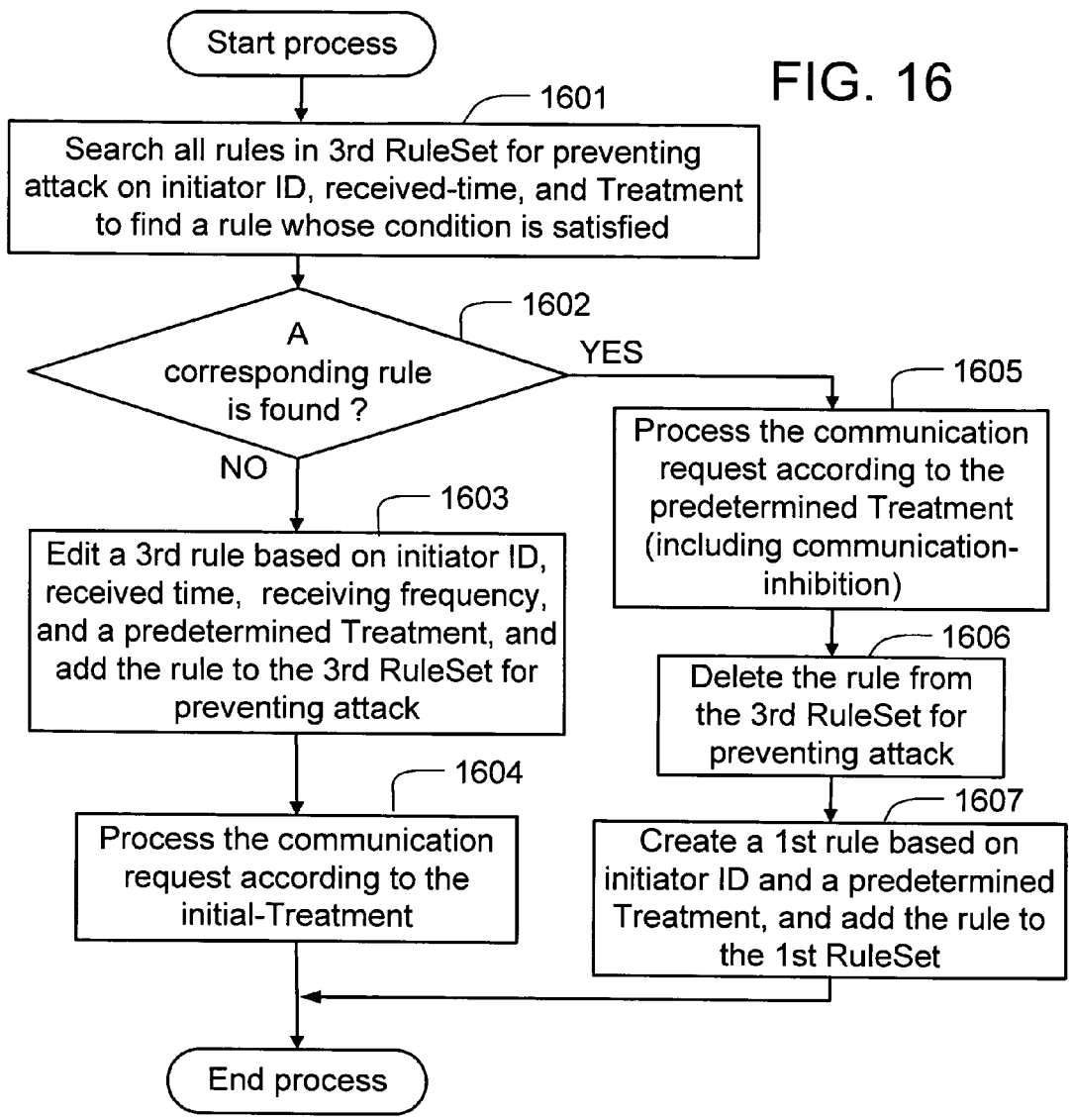

FIG. 20 — 4th RuleSet data database on questions, answers, and marks (R4DB)

| Question | Text/Sound/Images |
|---|---|
| Answer | Text/Sound/Images/Numerics |
| Marks | Numerics |

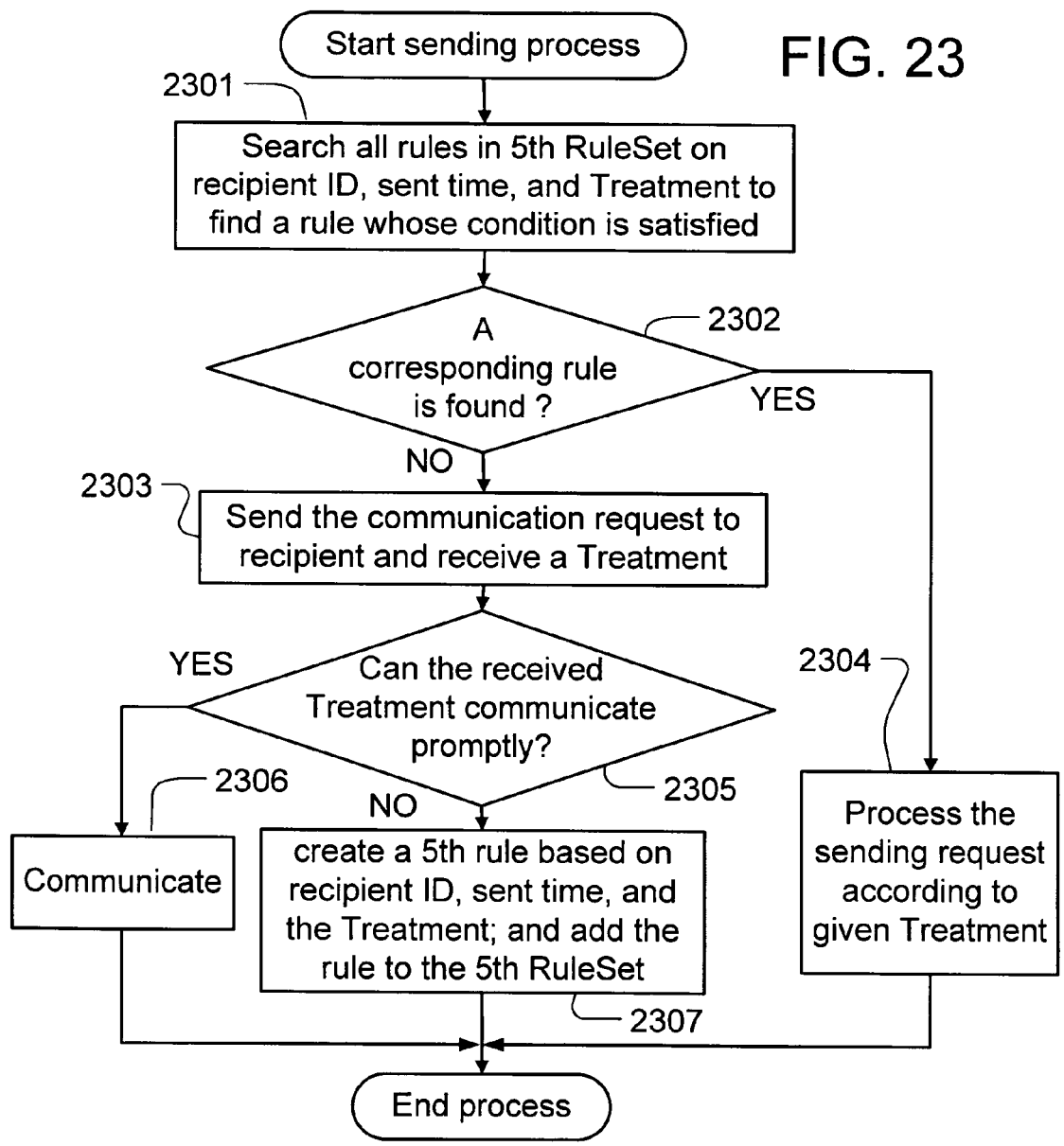

FIG. 26

Party data tablebase
(PDDB)

| Party ID | Identifier, Primary Key |
|---|---|
| Name | Text |
| Pseudonym list | Text list of pseudonyms used to explain this party |
| Address | Text/Audio/Image |
| Education history | Text/Audio/Image |
| Employment history | Text/Audio/Image |
| Hobbies | Text/Audio/Image |
| Self Introduction | Text/Audio/Image |
| Release authorization profile | Profiles of candidates the party will and will not release information to. Also, includes information as to what information will be released |
| ID of a Treatment to give | Identifier, External Key |

FIG. 33

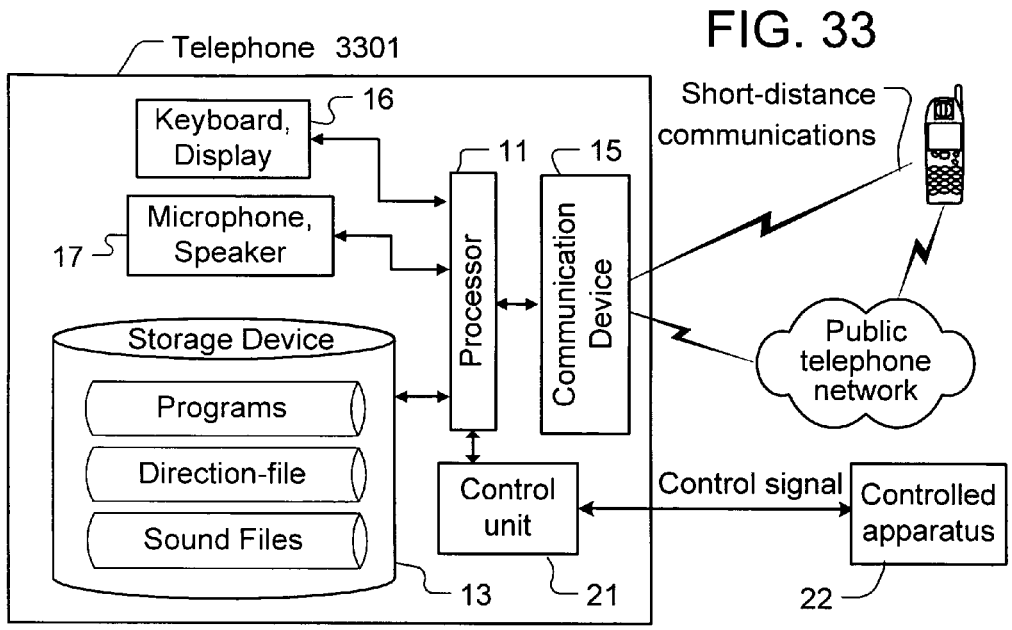

FIG. 34

Treatment-set data database
(TDB)

| Treatment ID | Treatment |
|---|---|
| 0 | Refuse to answer the telephone after replaying messages of refusing to answer |
| 1 | Refuse to answer the telephone |
| 2 | Replay question messages and decide treatment based on response (initial-Treatment) |
| 3 | Record the voice without ringing |
| 4 | Ring and make normal use status |
| 5 | Connect to answer the telephone without ringing and hold the line |
| 6 | Output unlocking signal |

FIG. 35

1st RuleSet data database on caller
and Treatment (R1DB)

| Caller ID | Treatment ID |
|---|---|
| 03-1234-5678 | 4 |
| 03-5678-1234 | 1 |

FIG. 36 2nd RuleSet data database on expected application contents and Treatment (R2DB)

| expected application contents (mark) | Treatment ID |
|---|---|
| 0 | 0 |
| 3 | 3 |
| 4 | 4 |
| 5 | 4 |
| 8 | 0 |
| 9 | 5 |
| 10 | 6 |

FIG. 37 4th RuleSet data database on questions, answers, and marks (R4DB)

| Question | Correct Answer | Mark |
|---|---|---|
| Who do you want to talk with? Please press a number: 1. TANAKA, 2. IKEDA, 3. KOIKE, 4. I have another business | 1 | 8 |
| | 2 | 5 |
| | 3 | 8 |
| | 4 | 0 |
| | 5678 | 9 |
| | 8765 | 10 |
| Please tell me your business? 1. to sell real estate, 2. English course, 3. Daily use goods, 4. sports goods, 5. other business | 1 | 4 |
| | 2 | 3 |
| | 3 | 3 |
| | 4 | 3 |
| | 5 | 0 |
| Please tell me your business? 1. for an opinion poll, 2. for an appeal of a vote | 1 | 8 |
| | 2 | 4 |

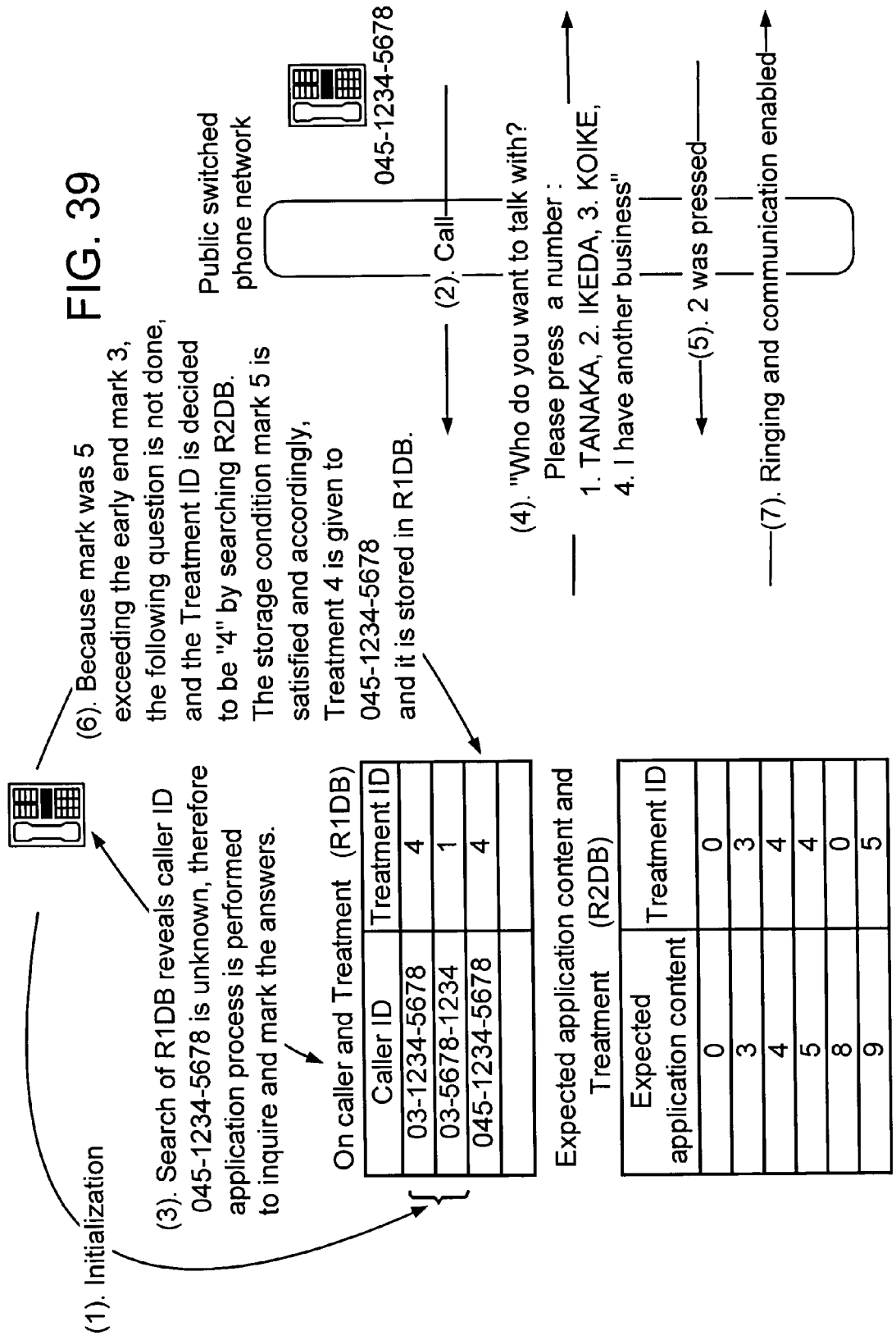

FIG. 40
Treatment-set data database (TDB)

| Treatment ID | Treatment |
|---|---|
| 0 | Refuse to answer the telephone after replaying messages of refusing to answer |
| 1 | Refuse to answer the telephone |
| 2 | Replay guidance message, make hear caller's voice from a speaker. the telephone can be answered if receiver is picked up. (initial-Treatment) |
| 3 | Record the voice without ringing, switch off the speaker |
| 4 | Ring and make normal use status |

FIG. 41

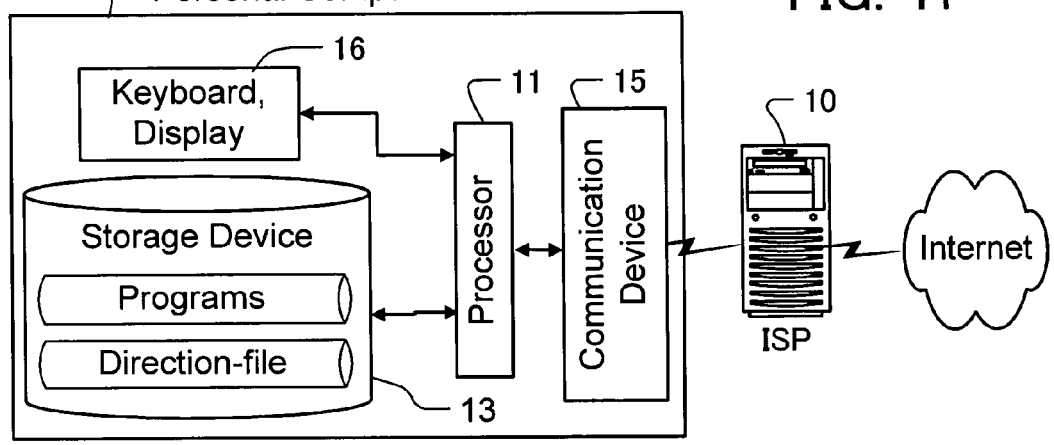

FIG. 42
Treatment-set data database (TDB)

| Treatment ID | Treatment |
|---|---|
| 0 | Reply with messages of refusing receiving to the sender and refuse receiving |
| 1 | Refuse receiving |
| 2 | Reply with questions for verifying to the sender and refuse receiving |
| 3 | Receive with size limiting, store the partial email in temporary folder, and notify the recipient |
| 4 | Receive |
| 5 | Receive and give the "Receive" Treatment to it |

FIG. 43
1st RuleSet data database on sender and Treatment (R1DB)

| Sender email address or domain | Treatment ID |
|---|---|
| a@xx.co.Jp | 4 |
| bb@yy.co.Jp | 1 |
| c@zz.Com | 2 |
| d@ii.Com | 3 |
| @***.Com | 1 |
| @netinfotech.co.Jp | 4 |

FIG. 44
2nd RuleSet data database on Expected application contents and Treatment (R2DB)

| keyword | Treatment ID |
|---|---|
| unconsent advertisement | 1 |
| 2 | 3 |
| TANAKA | 5 |
| 1965.2.3 | 5 |
| golf | 4 |
| 5678 | 4 |

FIG. 45
Presentation information data database (GDB)

| Presentation information |
|---|
| This address does not receive an email that the sender was not registered. Please answer the following questions in a possible range, and email again with the subject including the answer. Registering will be done by contents of your answer automatically. Registration is completed only once. Thank you very much for your cooperation.<br><br>1+1=?<br>What is the name of the recipient ?<br>When is the recipient's birthday ?<br>If you want to sell some goods, please tell me keywords of the goods. |

FIG. 50 Treatment-relation master data database (TRDB)

| Callee ID | Identifier, Primary Key, External Key |
| --- | --- |
| Caller ID | Identifier, Primary Key, External Key |
| Treatment ID | Identifier, External Key, ID of Treatment given to the caller. |
| applying-for-Treatment flag | Identifier. Set at the first time doing applying-for-Treatment. |

FIG. 65A Treatment information data database (TDB)

| Treatment ID | Treatment |
|---|---|
| 0 | Refuse to receive and do not reply |
| 1 | Reply with messages of refusing receiving to the sender and refuse receiving |
| 2 | Refuse receiving (initial-Treatment) |
| 3 | Reply with questions for verifying and refuse receiving |
| 4 | Receive with size limiting and store the partial-email in temporary folder |
| 5 | Receive (temporary receiving permission) |
| 6 | Receive (normal receiving permission, and save sender ID into 1st RuleSet) |

FIG. 65B Guidance information data database (GDB)
(for F: Application support section)

| Guidance information |
|---|
| This address is the inquiry address of application registration at Japan Patent Office. If you need to send message to this address, please put the phrase "inquiry about application registration" in the subject of the email and send it again. |

FIG. 65C 2nd RuleSet data database on keyword and Treatment (R2DB)
(for F: Application support section)

| keyword | Treatment ID |
|---|---|
| inquiry about application registration | 5 |

FIG. 65D The tyoe-1 RuleSet on sender and Treatment data database (R1DB)
(for F: Application support section)

| Sender email address | Treatment ID |
|---|---|
| c@xxxx.yy (C:Sender of mail bombs) | 0 |
|  |  |

FIG. 66A
3rd RuleSet data database for preventing attack on sender, received time and Treatment (R3DB1)
(for F: Application support section)

| Sender email address | Received time | Treatment ID |
|---|---|---|
| b@xxxx.yy | 03/03/16 03:19:45 | 0 |
| c@xxxx.yy | 03/03/16 12:46:20 | 0 |

FIG. 66B
Initialization

| | |
|---|---|
| Time (minutes) in condition part of the 3rd RuleSet for preventing attack | 60 |
| Treatment ID in action part of the 3rd RuleSet for preventing attack | 0 |
| Time (minutes) in condition part of the 3rd RuleSet for forcibly breaking | 30 |
| Treatment ID in action part of the 3rd RuleSet for forcibly breaking | 0 |
| Time (minutes) in condition part of the 5th RuleSet for preventing unsolicited communications from outbreak sources | 1440 |
| Treatment ID in action part of the 3rd RuleSet for preventing unsolicited communications from outbreak sources | 0 |

FIG. 66C
3rd RuleSet data database for forcibly breaking on sender and received time (R3DB)

| Sender email address | Received time | Treatment ID |
|---|---|---|
| b@xxxx.yy | 03/03/16 03:19:45 | 0 |
| c@xxxx.yy | 03/03/16 12:46:20 | 0 |

FIG. 66D
5th RuleSet data database for preventing unsolicited communications from sources on recipient ID and sent time
(R5DB)    (for D: Sender of mail bombs)

| Sender email address | Received time | Treatment ID |
|---|---|---|
| fe1@netinfotech.co.jp (A: applicant) | 03/03/16 03:19:45 | 0 |

Layout of user interface for direction-file input component

| recipient email address | text |
|---|---|
| keyword | text |
| ID of Treatment to give to | Numerics |

Data to pass to the direction-file input component

| Recipient email address | Keyword | Treatment |
|---|---|---|
| e@jpo.go.jp | JP2003-70953:0302-001 | 6 |

FIG. 70 Treatment information data database (TDB)

| Treatment ID | Treatment |
| --- | --- |
| 0 | Refuse to answer the telephone |
| 1 | Ring and wait that the telephone is answered by somebody |
| 2 | Connect to answer the telephone and hold the line |
| 3 | Vibrate, receive information, and show the received information on the screen; transmit verifying-information by pushing a button |
| 4 | Ring, vibrate, receive information, and play back received voice information; transmit verifying-information after voice recognition |
| 5 | Vibrate, receive information, and show the received information on the screen; transmit a verifying-information after fingerprint authentication |
| 6 | Vibrate, receive information, and show the received information on the screen; transmit a verifying-information after collating a inputting code |

FIG. 71 1st RuleSet data database on communication initiator and Treatment (R1DB)

| Caller's number | Command | Treatment ID |
| --- | --- | --- |
| 03-1234-5678 | Transaction-approval-request for East Japan Railway Company | 3 |
| 03-5678-1234 | Transaction-approval-request for Nippon Expressway Company | 4 |
| 03-5678-1234 | Transaction-approval-request for Shopping | 5 |
| 03-5678-1234 | Transaction-approval-request for online shopping | 6 |
| 045-123-4567 | Sound obtaining | 2 |
| 045-123-4567 | Call | 1 |
| 045-123-4567 | Unlocking-approval-request | 5 |
| Nothing | Sound obtaining password | 2 |
| Other unknown phone numbers | Nothing | 1 |

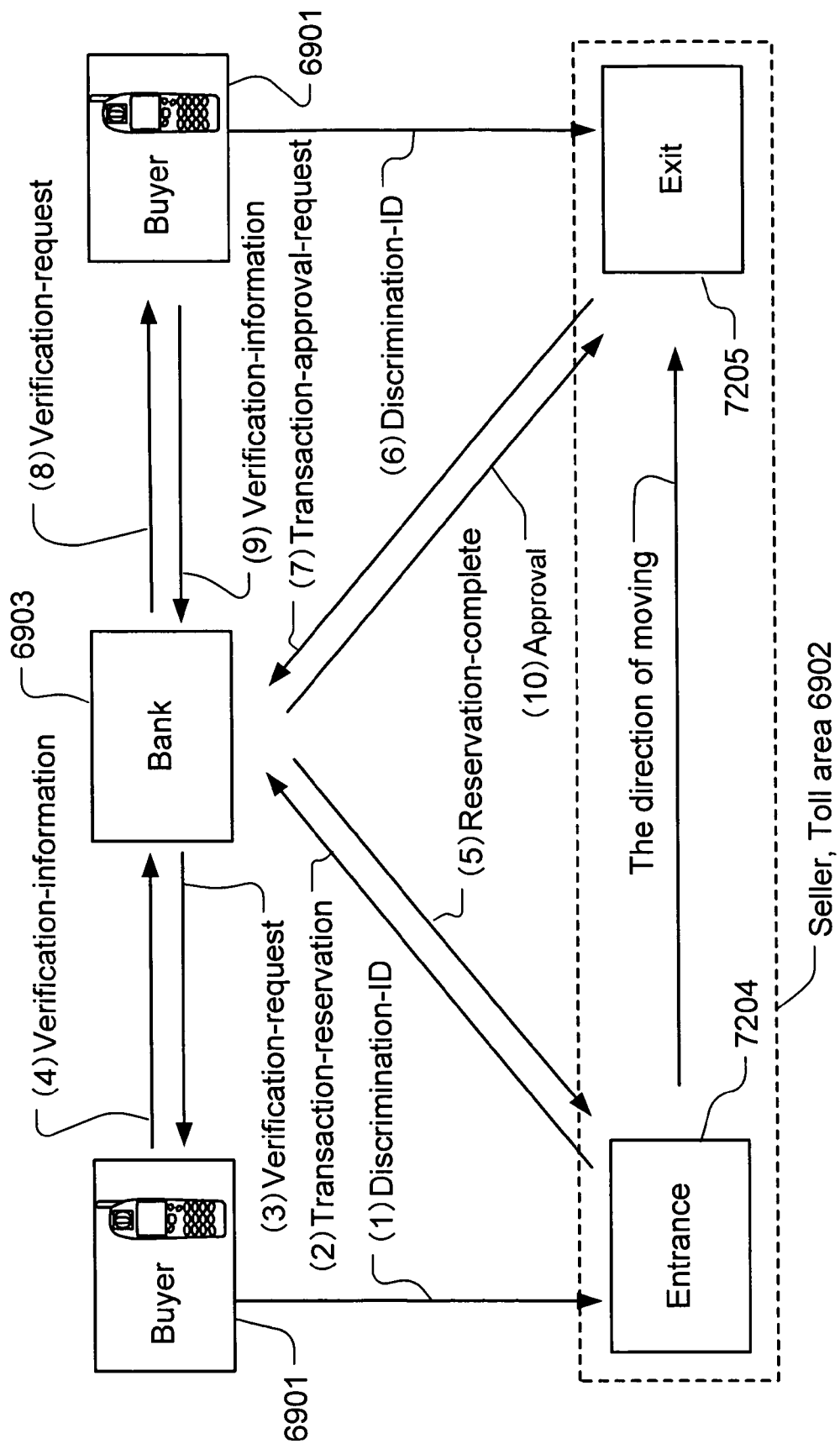

FIG. 73A

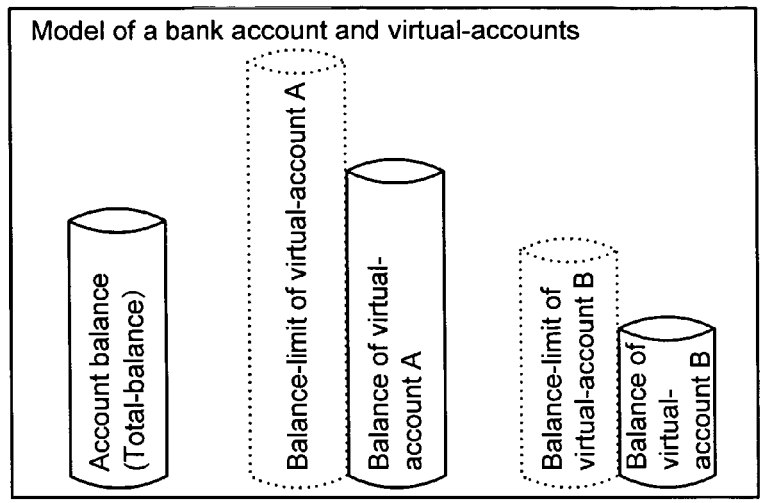

Model of a bank account and virtual-accounts

FIG. 73B

A simple example of reservation-information, data, and operation-information

| Communication-ID | 090-1234-5678 | 090-1234-5678 | 090-1234-5678,shop | abc@docomo.ne.jp | 090-1234-5678 |
|---|---|---|---|---|---|
| discrimination-ID | IC card number | License plate number | 045-1234-5678 | abc@y.ne.jp | Card number |
| Account number | 12312345 | 12312345 | 12312345 | 12312345 | 12312345 |
| Virtual-account | Railroad | Expressway | Shopping | Online shop | ATM cash withdrawals |
| Balance-limit | 20,000 yen | 30,000 yen | 100,000 yen | 30,000 yen | 500,000 yen |
| No-verification-limit | 560 yen | 1,000 yen | 1,000 yen | 0 yen | 0 yen |
| No-verification-accumulation-limit | 5,000 yen | 5,000 yen | 5,000 yen | 0 yen | 0 yen |
| Balance-notifying-amount | 2,000 yen | 3,000 yen | 10,000 yen | 10,000 yen | 300,000 yen |
| Balance-notice-destination | ab@y.ne.jp | ab@y.ne.jp | ab@y.ne.jp | ab@y.ne.jp | ab@y.ne.jp |
| Auto-recovery-interval (day) | 30 | 10 | 30 | 60 | 30 |
| transaction-reservation-verifying-need-or-no | No | Yes | - | - | - |
| Verification-information | 456 | 456 | 456 | 456 | **** |
| Password | ****** | ****** | ****** | ****** | ****** |
| User-identifying Treatment ID | 3 | 4 | 5 | 6 | 5 |
| Operation-information | Yes button | "O. K." | fingerprint | 456 | fingerprint |

METHOD AND APPARATUS FOR CONTROLLABLE COMMUNICATION

CROSS-REFERENCE TO RELATED APPLICATIONS

This is a Continuation-in-part of Application PCT/JP2004/001182, filed Feb. 5, 2004, which was published under PCT Article 21(2) in Japanese, now abandoned; The present application claims the benefit of patent application number 2005-181485, filed in Japan on Jun. 22, 2005, the subject matter of which is hereby incorporated herein by reference;

The present application claims the benefit of PCT/JP2003/012014, filed Sep. 19, 2003, which was published under PCT Article 21(2) in Japanese; The present application claims the benefit of patent application No. 2003-70953, filed in Japan on Feb. 10, 2003, the subject matter of which is hereby incorporated herein by reference;

REFERENCE TO A COMPUTER PROGRAM LISTING APPENDIX SUBMITTED ON A COMPACT DISC

I submit a computer program list appendix with a compact disk, The subject matter of which is hereby incorporated herein by reference.

The number of total of compact disk submitted is two pieces. It is included a copy, each compact disk includes 240 files.

BACKGROUND OF THE INVENTION

1. Field of the Invention

The present invention relates to electronic apparatus that provide a communication function (hereafter referred to as communication device), relates to protecting user's right and communication's security, relates to communication and control, and also relates to electronic commercial transactions.

2. Description of Related Art

Electronic communication services are was spread widely. The various information technology services that utilize the Internet have become widely used by a lot of people, and broad-band flat-rate internet connection services begin to spread to a general family.

However, there are issues of that the a user (As used hereafter, the term "User" shall mean the user.) owning the terminal device cannot fully control the device, and there are issues of User's right and communication security.

A User unsolicited and undesired communication occurs when the User is a recipient. A User has no way to control the terminal device by itself when the User is a sender. For example, the User cannot connect the home telephone by itself to confirm the actual scene of the home.

As for the conventional technology to prevent unsolicited communication, there are technologies that realize white-list or black-list.

There are credit cards and debit cards (shopping by bank cards) electronic transactions system, and there are transaction technologies that use mobile terminals. However, the User cannot safely use password for purchasing. Card data is easily stolen. The input of password is non-safe in shopping with debit cards, and password is easily stolen from the movement of the fingers.

Damage by theft of card information are occurring. There are technologies to open an exclusive prepaid account in order to prevent the occurrence of the high-priced damage.

BRIEF SUMMARY OF THE INVENTION

An object of the present invention is to provide a controllable communication apparatus and a communication method to protect the User's rights according to the User's intention.

The more other objects of the present invention will become obvious in the following detailed explanation.

FIG. 1 illustrates one embodiment of the present invention. A User controls communication and a terminal by an apparatus that is named electronic secretary. The electronic secretary exists between the terminal and a network.

In order to process the incoming communication requests from the inside (the terminal) or the outside (the networks), the electronic secretary is provided with multiple processing methods;

The User decides rules comprising identification information of communication requests and methods of processing the requests and saves a set of the rules.

The electronic secretary distinguishes the identification information of the communication request, picks a rule that can apply from the recorded RuleSet, and processes the communication request according to the method recorded in the rule when a communication request is received.

As used herein, the term "Treatment" shall mean the method of processing a communication request; the Treatment means a method of processing a communication request deciding by the User.

As used herein, the term "executing Treatment" shall mean executing the action that corresponds to the Treatment.

Depending on needs, the electronic-secretary can be provided with Treatments including: permitting communication request, rejecting communication request, verifying communication request, controlling the terminal, starting a user-authentication program, and so on.

The electronic secretary distinguishes the identification information with a part or a complex of next two kinds of information:

(a) a subscriber ID (identification, for example a telephone number of caller or callee, E-mail addresses, and so on) provided by communication service providers, and (b) keywords information such as a keyword inputted by communication initiator.

A virtual-account with a beforehand decided maximum payment amount that can be settled by an account is used in communication for electronic transactions.

It is possible that the virtual-account balance is more than the account balance.

A possible payment amount of money is not more than both the virtual-account balance and account balance.

BRIEF DESCRIPTION OF THE SEVERAL VIEWS OF THE DRAWING

FIGS. 2, 3, 9, 11, 15, 16, 19 illustrate flowcharts of the embodiments of this invention;

FIGS. 4-7, 17, 20, 24, 26, 50 illustrate each of the embodiments of the layout of the database of the Treatment-set, the 1st RuleSet, the presentation information, the 2nd to 5th RuleSet, the party data, and the Treatment-relation;

FIGS. 8, 10, 18, 21, 22 illustrate each of the embodiments of this invention;

FIG. 23 is a flowchart of a sending process;

FIG. 33 illustrates the structure of a multifunction telephone of Example 1;

FIGS. 34-37 illustrate TDB, R1DB, R2DB, and R4DB of the multifunction telephone;

FIG. 39 illustrates an example of the autoSetting-permission Treatment;

FIG. 40 illustrates a Treatment-set of an example of a telephone answering machine.

FIG. 41 illustrates the structure of an electronic secretary of an email terminal;

FIGS. 42-45 illustrate TDB, R1DB, R2DB, and GDB of the electron secretary;

FIGS. 65A-D and FIGS. 66A-D show a setting example of a direction-file;

FIGS. 70, 71 show TDB and R1DB of example of electronic transactions;

FIG. 72 is a block diagram of a example of a ticket;

FIG. 73A is a model diagram of a virtual-account;

FIG. 73B shows a example of a reservation-information;

DETAILED EXPLANATION OF INVENTION

Figure 1:
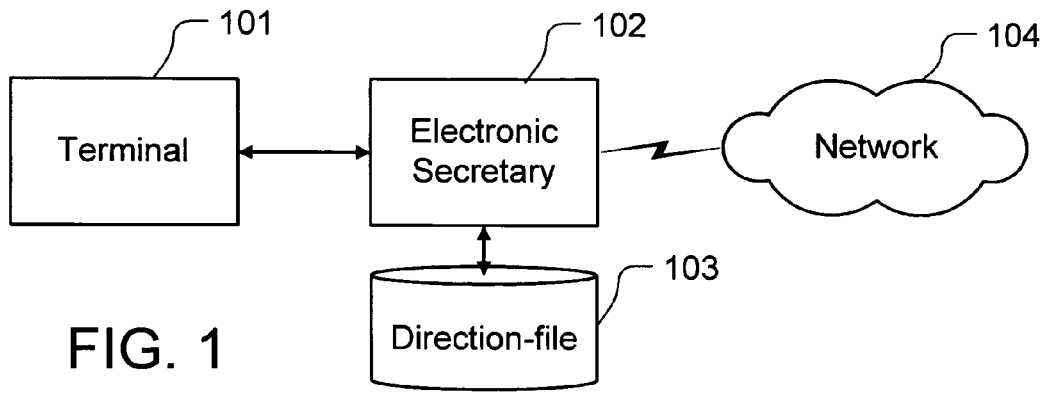
FIG. 1 illustrates one embodiment of an outline constitution of this invention.

As used herein, the term "communication request" shall mean messages received by the electronic secretary before the original intention of the caller is achieved, for example, a connection request is a communication request, and an email or a data or a request for confirmation being received by the electronic secretary is a communication request, when the recipient has not received them yet;

the term "Treatment" shall mean a method of processing a communication request;

the term "Treatment-set" shall mean a set of Treatments;

the term "initiator/recipient ID" shall mean initiator/recipient subscriber identification;

and the term "keyword information" shall mean the keyword, password, etc. information sent by initiator;

the term "rule" shall mean knowledge used for control of processing; a rule consists of a condition-part and an action-part (i.e. an IF-THEN rule);

the term "RuleSet" shall mean a set of rules, and X RuleSet shall mean a set of the X rules;

the term "apply X RuleSet" shall mean that search the X RuleSet to find an rule whose condition is satisfied, and execute found rule's action, for example, "apply 1st RuleSet" shall mean that search the 1st RuleSet to find an rule whose condition is satisfied, and execute found rule's action;

the term "1st rule" shall mean a rule that include a condition-part and an action-part, the condition-part has an application condition on identification information to distinguish a communication request, and the action-part orders execution of an action corresponding to a Treatment, and the rule can be expressed in the following:

"upon receiving a communication request from an initiator, if identification information (actual identification information) of the communication request detected from the communication request is equal to the identification information of the condition-part, then the communication request is processed according to the Treatment of the action-part";

the term "2nd rule" shall mean a rule that include a condition-part and an action-part, the condition-part has an application condition on keyword information, and the action-part orders execution of an action corresponding to a Treatment, and the rule can be expressed in the following:

"upon receiving a communication request from an initiator, if keyword information detected from the communication request is equal to the keyword information of the condition-part, then the communication request is processed according to the Treatment of the action-part the term "3rd rule" shall mean a rule that include a condition-part and an action-part, the condition-part has an application condition on a initiator ID and a received-time of a communication request, and the action-part orders execution of an action corresponding to a Treatment, and the rule can be expressed in the following:

"upon receiving a communication request from an initiator, if the actual initiator ID detected from the communication request is equal to the initiator ID of the condition-part, and a predetermined amount of time from the received-time has not passed, then process the communication request according to the Treatment of the action-part";

the term "4th rule" shall mean a rule including a condition-part including conditions on a question to present communication initiator and a answer of the question, and an action-part on obtaining marks, and the rule can be expressed in the following method:

"If responses from the initiator are correct answers, summing up the marks";

the term "5th rule" shall mean a rule that include a condition-part and an action-part, the condition-part has an application condition on a recipient ID and a sent-time, and the action-part orders execution of an action corresponding to a Treatment, and the rule can be expressed in the following:

"If an ID of the addressee (recipient ID) is equal to the recipient ID of the condition-part, and a predetermined amount of time from the sent-time has not passed, then the sending request is processed according to the Treatment of the action-part";

the term "initiator" shall mean an object selected from the group consisting of a person and a machine that requests initiation of communication;

the term "Treatment information" shall mean information on set Treatment and RuleSet;

the term "communication-permission" shall mean permitting transmission of requests of communication to recipients, the electronic secretary permits communication, transmits communication request to the recipient, and makes a status same as conventional communication, the recipient can make final determination whether or not to accept the request;

the term "communication-inhibition" shall mean refusing communication requests;

the term "communication-verification" shall mean including showing presentation information to the initiator and permitting transmission of the request of communication to the electronic secretary;

the term "receiving client" shall mean device capable of retrieving email stored in servers, for example mobile phone capable of retrieving email, or a host that uses a client software in accordance with POP3 protocol specified in the RFC (Request for Comments) published by IAB(Internet Architecture Board);

the term "sending client" shall mean device capable of sending email, for example a client terminal that can send email, or an email relay server at ISP(internet service provides);

the term "server" shall mean side that provide service, for example telephone switchboards;

the term "receiving server" shall mean device that store received email, and enable recipient to retrieve stored email, for example email centers of mobile phone or Internet hosts providing POP3 service are the receiving servers;

the term "electronic mail" shall mean a substance including an envelop and a content, the content includes a header and a body, the envelope includes whatever information is needed to accomplish transmission and delivery, the contents comprise the object to be delivered to the recipient, the header is a sequence of lines of characters with special syntax as defined in a standard, the body is simply a sequence of characters that follows the header;

the term "email" shall mean the electronic mail;

the term "communication" shall mean transmission of information as well as control signals;

the term "hearing-permission" shall mean permitting initiator to obtain sound signals collected by receiving-side's communication device;

the term "monitor-permission" shall mean permitting initiator to obtain image signals collected by receiving-side's communication device;

the term "position-obtaining-permission" shall mean permitting initiator to obtain position information collected by receiving-side's communication device;

the term "attention-attracting-permission" shall mean permitting initiator to output attention-attracting-symbols from receiving-side's communication device to attract recipient's attention;

the term "information-transmission-permission" shall mean permitting initiator to transfer information to the receiving-side's communication device;

the term "default-Treatment" shall mean the predefined Treatment when Treatment cannot be determined by applying a RuleSet should be applied;

the term "sender's email address" shall mean the email address that was specified by the sender of the email itself for reply to the email;

the term "applying-for-Treatment" shall mean applying for permission of communication, which includes conventional initiation of communication requests;

the term "Treatment-relation" shall mean the relation between two parties based on Treatment given, by each party to the other party;

the term "application-contents" shall mean the content of application for permission of communication;

the term "program-executing-permission" shall mean permitting to execute application programs in a terminal, the terminal includes means such as CPUs for executing the application programs.

FIG. 1 illustrates one embodiment of an outline constitution of present invention.

The terminal 101 communicates using network 104 via the electronic secretary 102.

The electronic secretary is connected directly with the terminal.

The electronic secretary may be built in the terminal, or servers providing communication services, or may become independent.

For example, in the case of telephone communication, the electronic secretary may be built in the telephone or the switchboard.

Direction-file 103 can be stored inside the electronic secretary system or be independent from implementations of the system.

A User can directly input (It is not shown in the FIG.) data to the direction-file.

For example, the provider of services can make the User access to Internet Web pages and input data into the direction-file through the Web pages.

The User can use the terminal of embodiment of this invention as a recipient or an initiator or a buyer using an electronic transactions system.

The User can control the terminal of embodiment of this invention from another device as the initiator directly.

When beginning communication for electronic transactions, the User can make the terminal of embodiment of this invention start an authentication program as the buyer.

(Hereafter same symbols are used in different figures to indicate same or similar components)

The electronic secretary processes a communication request that arrive from the inside (the terminal) or from the outside (the network).

As used herein, the term "control-permission" shall mean permitting the User to control the terminal according to the User's intention without intervention from the person at the receiving-side in order to obtain real-time information, to relay an actual scene, and to do real-time processing.

The electronic-secretary is made to have the authority for the controlling the directly connected terminal.

For example, if the electronic secretary is built in the terminal, the electronic secretary can control the terminal directly.

When the electronic secretary is installed at the outside of the terminal, the electronic secretary can control the terminal through the communication channel to be connected directly with it.

The control-permission is realized by controlling the terminal through the electronic secretary.

It is an example of control-permission that the initiator remotely controls the terminal.

The initiator can watch the receiving-side by starting a camera that is connected to the terminal.

The initiator can locate the receiving-side by starting a GPS device that is connected to the terminal.

Another example of control-permission relates to electronic transactions.

The electronic secretary starts an authentication program for responding the communication request from the inside or the outside.

The direction-file can be stored in any storage devices including magnetic tapes, semiconductor memories like RAM or ROM, or optical storage devices, as long as the purpose of the present invention can be achieved.

Preferably the direction-file is stored in relational databases that integrate different formats of data and are easy to perform search.

Figure 2:
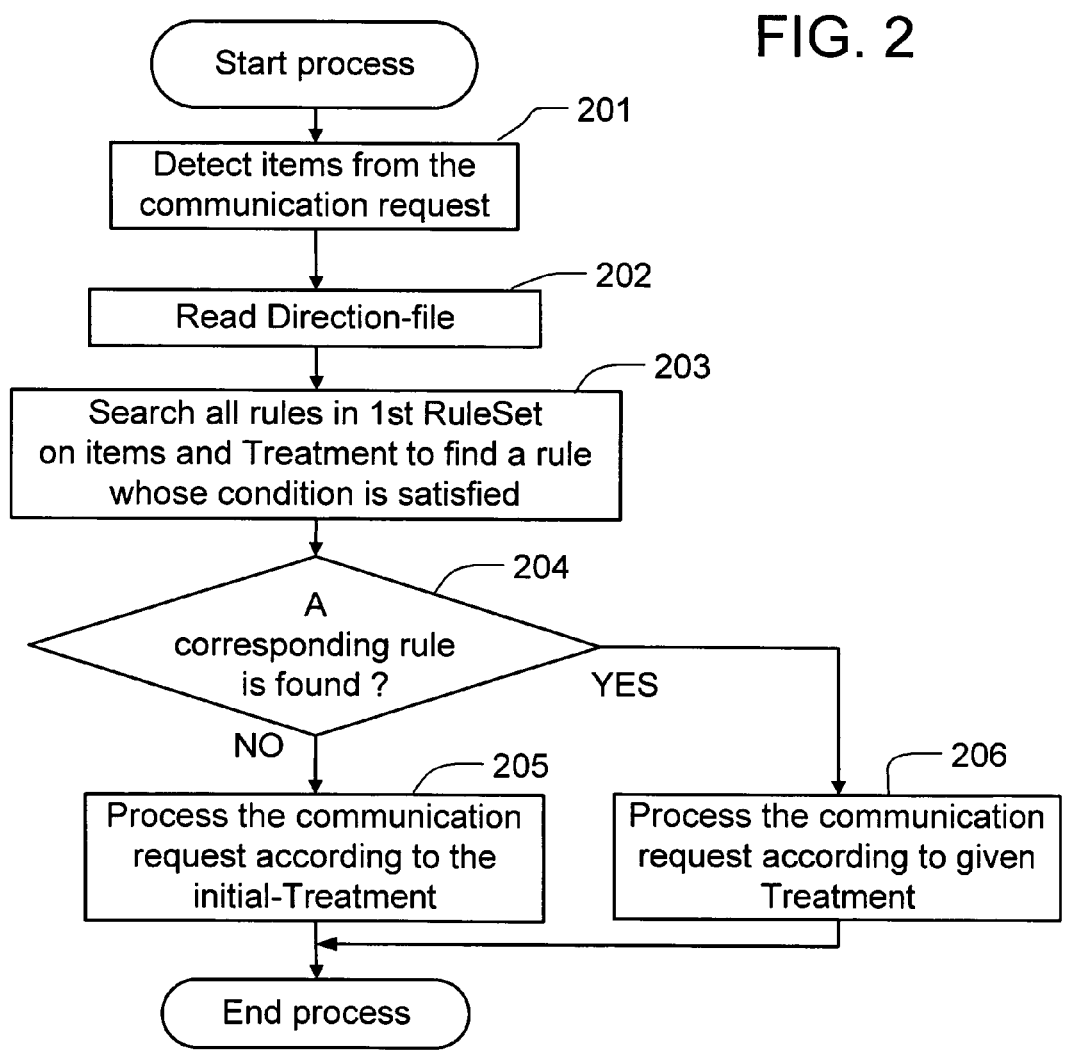

FIG. 2 is a flowchart of one embodiment of the present invention.

Upon receiving a communication request from an initiator of the inside or the outside, the electronic secretary system detects (201) identification information (i.e. actual identification information) of the communication request, reads (202) the direction-file, and applies the 1st RuleSet in the following 1st RuleSet applying-procedure.

That is to say, the system searches the R1 DB (see FIG. 5) using the received identification information as a key to find a rule whose condition is satisfied (203), tests (204) to determine whether a corresponding rule is found, if an entry is found, i.e., if a corresponding rule is found, then the system extracts given Treatment from the Treatment ID field of the found entry, and executes (206) the action-part of the rule.

If no corresponding rule is found, then the system processes (205) the communication request according to beforehand predetermined method i.e. "default-Treatment".

Figure 3:
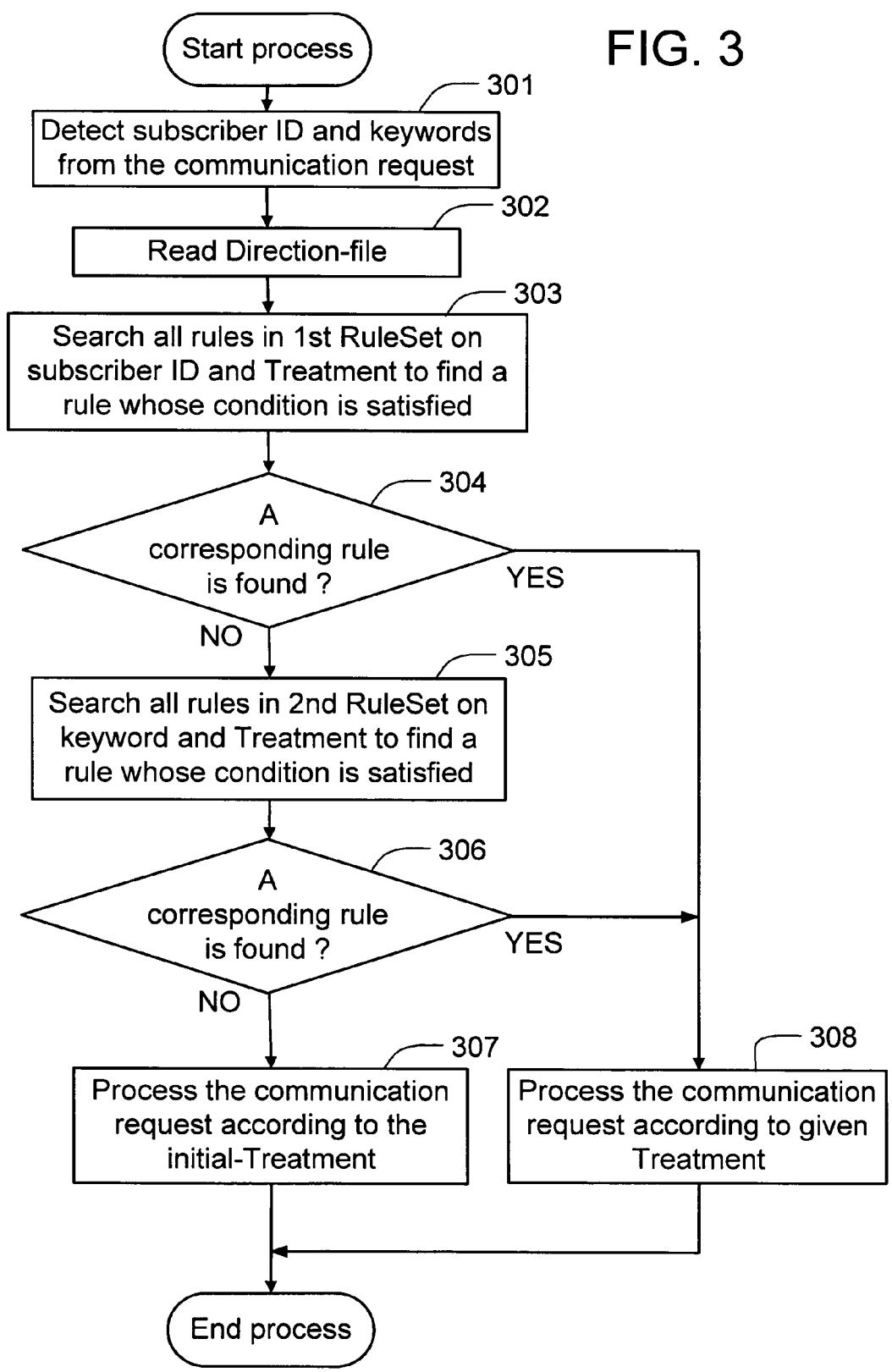

FIG. 3 is a flowchart of one embodiment of the present invention.

As for this embodiment, applying the 2nd RuleSet is added to the embodiment shown in FIG. 2, and only subscriber ID is included in the 1st RuleSet.

The system searches (305) 2nd RuleSet on keyword information and Treatment to find a rule whose condition is satisfied, and tests (306) to determine if a rule is found.

Steps 301-304, 307, and 308 are equivalent to steps 201-206.

Tables include all the data in a database. A table is a collection of "columns" and data is stored in columns and rows. Each row represents a record and each column represents a field.

The layout of the record comprises "name of field" (in the left hand side in the figure) and "field specifications" (in the right hand side in the figure). The rows correspond to respective fields.

Primary key is the column with unique identification key for each row in the table. External key is for linking data in two tables.

FIG. 4 illustrates the layout of record of the database that stores one embodiment of a Treatment-set (hereafter referred to as TDB). Realization of each Treatment and the number of available Treatments differs for different communication devices. The Treatment-set may be extended or simplified according to need of User individual.

FIG. 5 illustrates the layout of the record of a database (hereafter referred to as R1DB) that stores a set of the 1st rule on identification information and Treatment.

The communication request is distinguished by at least one of the items.

An item being expressed on the table shown in FIG. 5 is ignored when it is nothing (not set); it means that the condition in the condition-part on the item is satisfied.

An example in that a caller's number and a command are nothing is shown in FIG. 71.

When processing a communication request from the outside, initiator ID is usable as one of the items of the above identification information.

In the case of telephone or email communication, initiator ID is a caller's number or a sender's email address.

A keyword in the communication request is usable as one of the items of the above identification information. For example, signs, text, sound, or images are usable as a one of the items of identification information.

FIG. 6 illustrates the layout of record of the database (hereafter referred to as GDB) that stores one embodiment of the presentation information. In case the presentation information includes questions presented to initiator, layout shown in FIG. 20 may be used.

FIG. 7 illustrates the layout of record of the database (hereafter referred to as R2DB) that stores one embodiment of the 2nd RuleSet on keyword and Treatment. The 2nd RuleSet is equivalent to the 1st RuleSet that has only one keyword item.

The present invention distinguishes the communication request with a combination of subscriber ID and keyword information.

Subscriber ID is a unique identification provided by a communication services provider; a keyword is communication contents; and plural keywords may be used simultaneously to distinguish the communication request.

It is enables to include subscriber ID and keyword in the 1st RuleSet simultaneously.

For simplicity, the 1st RuleSet has only the subscriber ID; the 2nd RuleSet may have only the keyword.

As used herein, the term "give a Treatment to a subscriber (or give a Treatment to a subscriber ID)" shall mean creating a 1st rule and adding the rule to a 1st RuleSet; the 1st rule executes the Treatment after distinguishing the communication request by the subscriber ID.

As used herein, the term "give a Treatment to keyword information (or give a Treatment to a keyword)" shall mean creating a 1st or 2nd rule and adding it to a RuleSet; the 1st or 2nd rule executes the Treatment after distinguishing the communication request by the keyword information.

An example of the present invention has conventional white list and blacklist function. However, the User cannot fully control the terminal only with the conventional function.

In order to solve this problem, a list of control-permission (control authority) address, and a list of control-permission keyword was devised.

The concept of "Treatment" is introduced in order to control the terminal fully according to the User's intention.

When a conventional art is described directly with "a list", attentions should be paid to the point that is hard to compare the conventional art with this invention, because of this invention is described with RuleSet. It can be understood that if a RuleSet is expanded into plural equivalent lists, such as control-permission list element is not included in the conventional arts that are disclosed in the INFORMATION DISCLOSURE STATEMENT BY APPLICANT of this application.

Conventional white list technology cannot prevent "phishing" fraud that use forged initiator ID occurring frequently recently.

An embodiment of the present invention enables identification of a communication request that does not depend on initiator ID. The use of the present invention enables initiator authentication equivalent to such as a login by a password of email server when it is necessary.

For example, the collating a password of a customer stored in the keyword field of a RuleSet with a password that is a bank account password to be included in the communication request can certify the initiator is the bank.

The password may use One Time Password (OTP) or cipher.

The password may be transmitted in a specific information field in the communication request. For example, keyword field may be used in the case of email communication.

A communication request from the inside or outside can be processed by same mechanism.

For example, a 1st RuleSet on recipient ID and Treatment for sending can be used.

A Treatment to refuse a communication request named "transmission-inhibition", a Treatment to permit a communication request named "transmission-permission", and a Treatment named "transmission-authenticating" can be used.

The transmission-authenticating Treatment starts an authentication program in transmission terminals; if the authentication such as collation of a password is successful, the transmission is permitted. For example, restricting sending an electronic transactions request to a bank only to the owner can prevent an abuse when the terminal is lost.

Communication-verification Treatment permits transmitting a communication request to the electronic secretary and including showing presentation information to the initiator.

An initiator's response is received after the information was shown to the initiator. Until the response is determined to be correct for permitting the request of communication, the initiator cannot accomplish the originally intended purpose of the communication request.

In the case of non-realtime communication, a communication-verifying Treatment considers that a communication request from the initiator that initiator ID is not memorized is the response to the presentation information.

For example, in the case of email communication, the reception is permitted when the passwords or keywords decided beforehand was included in an email.

In the case of realtime communication, a communication-verifying Treatment receives a response of an initiator, and extracts identification information from the response.

For example, in the case of telephone communication, the electronic secretary records the caller's name, telephone number, or business for telling callee, and sends voice guidance to outside to receive the caller's response; the response is tested, but until it is determined to be correct, the caller will not be allowed to talk to the callee.

The question and answer of repetition is possible.

The response may be determined to be correct immediately or be determined later by the callee.

The response can be received by a dial number tone or voice recognition.

Using an answering machine mode to pretend to be out is one concrete example of the communication-verification Treatment.

A flowchart of FIG. 3 can be used in email communication, too.

The initiator ID is sender's email address (a reply address), the presentation information includes description of conditions for receiving email, and the communication-permission Treatment is to make the recipient receive the email.

At first the 1st RuleSet is applied (the sender's email address is checked) upon arrival of a communication request, when no applicable rule is found, the 2nd RuleSet is applied (the conditions for receiving is checked), when no applicable rule is found, default-Treatment is executed.

When the default-Treatment is communication-verification, the system replies to the sender with the presentation information and refuses the receiving of the email.

FIG. 8 illustrates the constitution of another embodiment of the present invention. The electronic secretary and the direction-file R1DB, GDB, and R2DB are installed in the receiving client side User terminal 801. Reference numeral 802 shows a receiving server of ISP.

Figure 9:
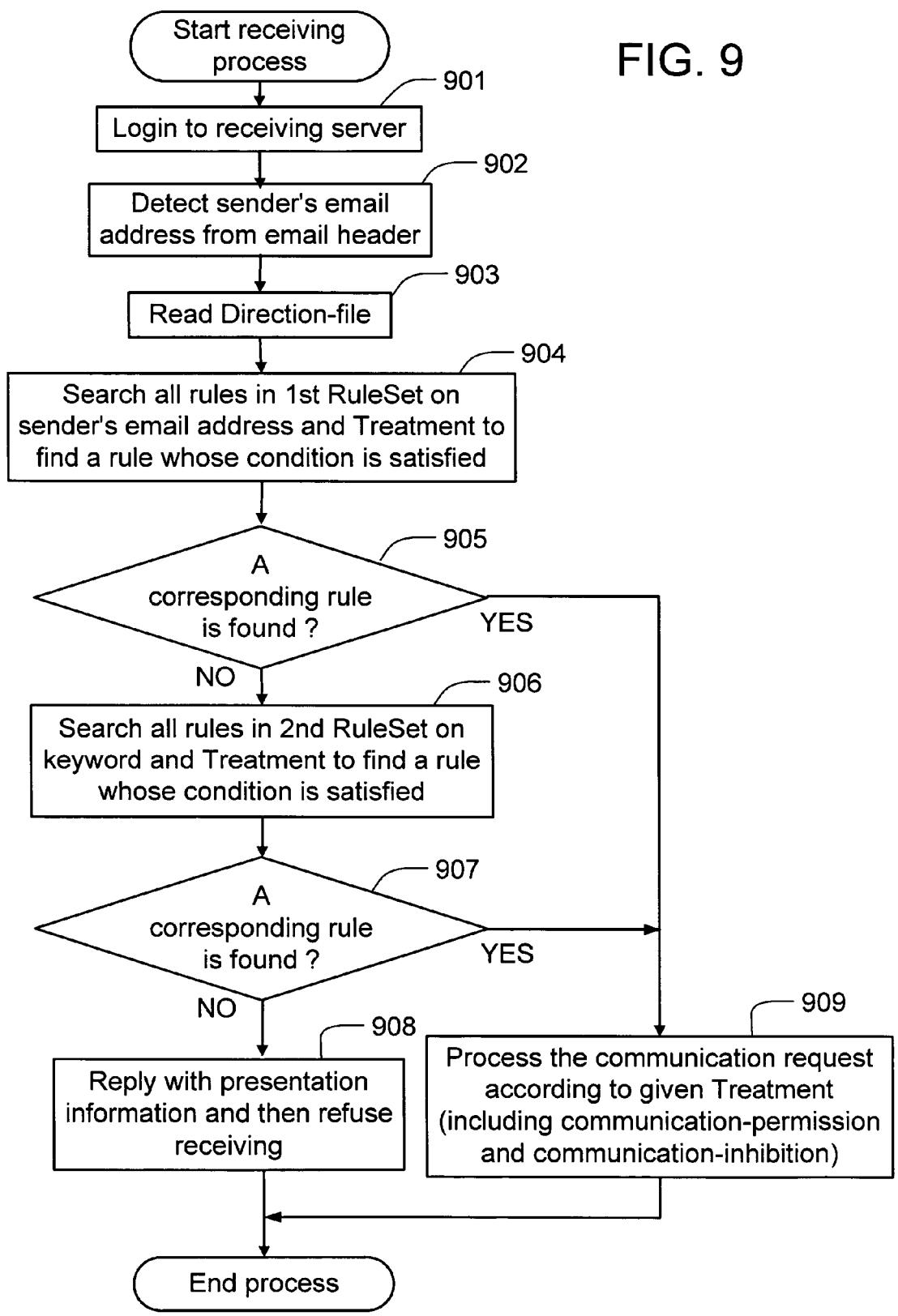

FIG. 9 is a flowchart of the embodiment shown in FIG. 8.

The electronic secretary is installed in the receiving client side; rejecting a communication request is issuing a email delete command to the receiving server for deleting the email from the server.

The method to apply for permission of communication to present to the initiator is to put application contents in the subject of an email.

The presentation information includes at least the contents that promotes to put the application contents to the subject of the email.

For example, it may present questions and ask to put the answers to the questions in the subject.

After the electronic secretary logs in (901) to the receiving server and detects (902) the initiator ID i.e. the sender's email address from the email's header.

For example, a sender's email address can be detected by analyzing the header of a email; the header of the first email can be received from a POP3 server by sending out a command "TOP 10" that is recorded in POP3 that is a general email-receiving-protocol.

Then, the electronic secretary reads (903) the direction-file, and applies (904-905, 909) the 1st RuleSet with the 1st RuleSet applying-procedure; when no rule whose condition is satisfied can be found, applies (906-907) the 2nd rule.

When an applicable rule is found, the electronic secretary can extract Treatment ID from the field of Treatment ID, and executes (909) the action-part of the rule.

The electronic secretary processes (908) the default-Treatment.

This embodiment extracts the identification only from email header, and can achieve the purpose without receiving the contents of the email.

Especially for applying it in mobile phones, the quantity of communication of the charge part of communication with the server can be reduced largely.

Figure 10:
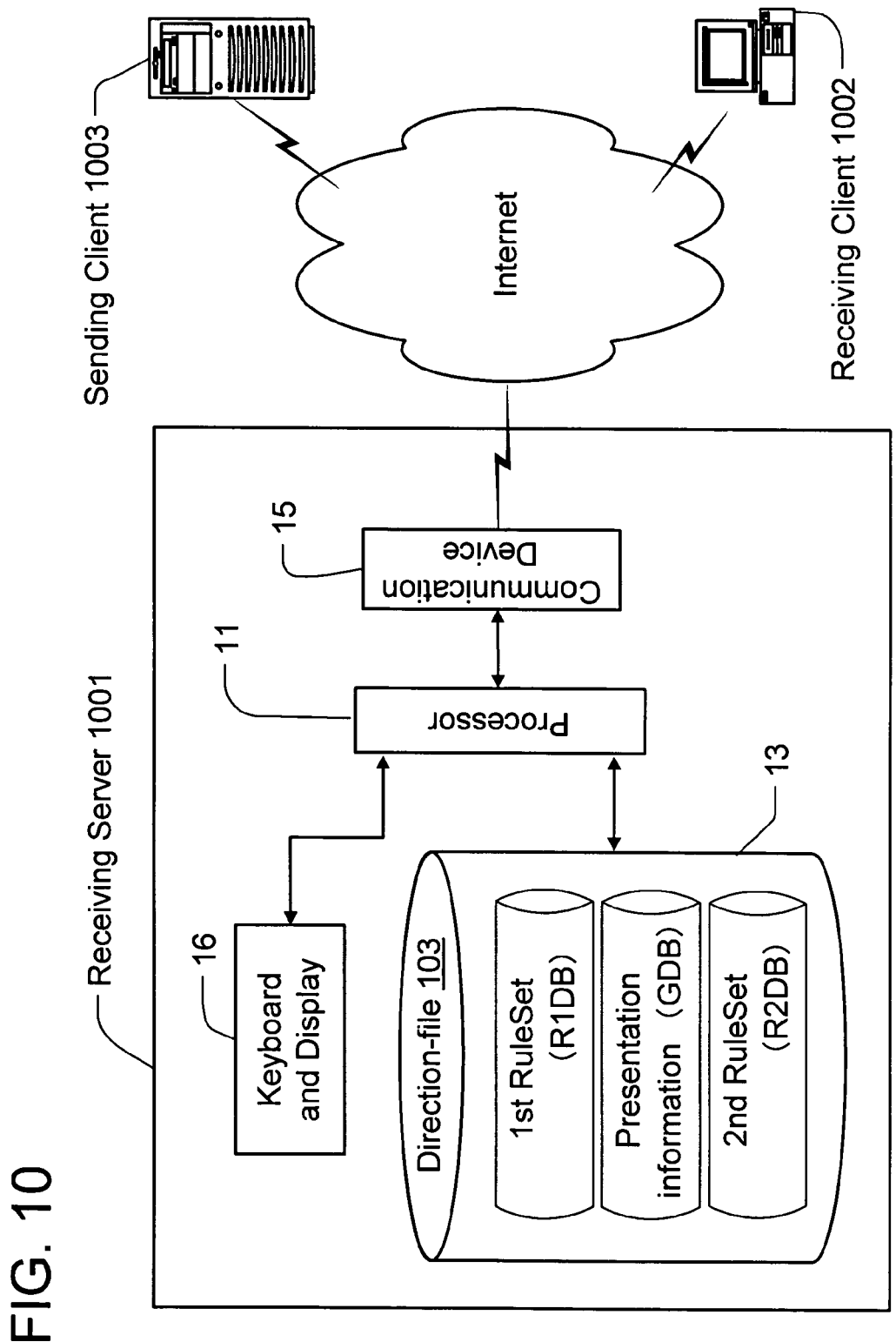

FIG. 10 illustrates the constitution of another embodiment of the present invention mentioned in explanation of FIG. 3. The electronic secretary and the direction-file R1DB, GDB and R2DB are installed in the receiving-server 1001. Reference numeral 1002 shows a receiving client. Reference numeral 1003 shows a sending client of emails.

Figure 11:
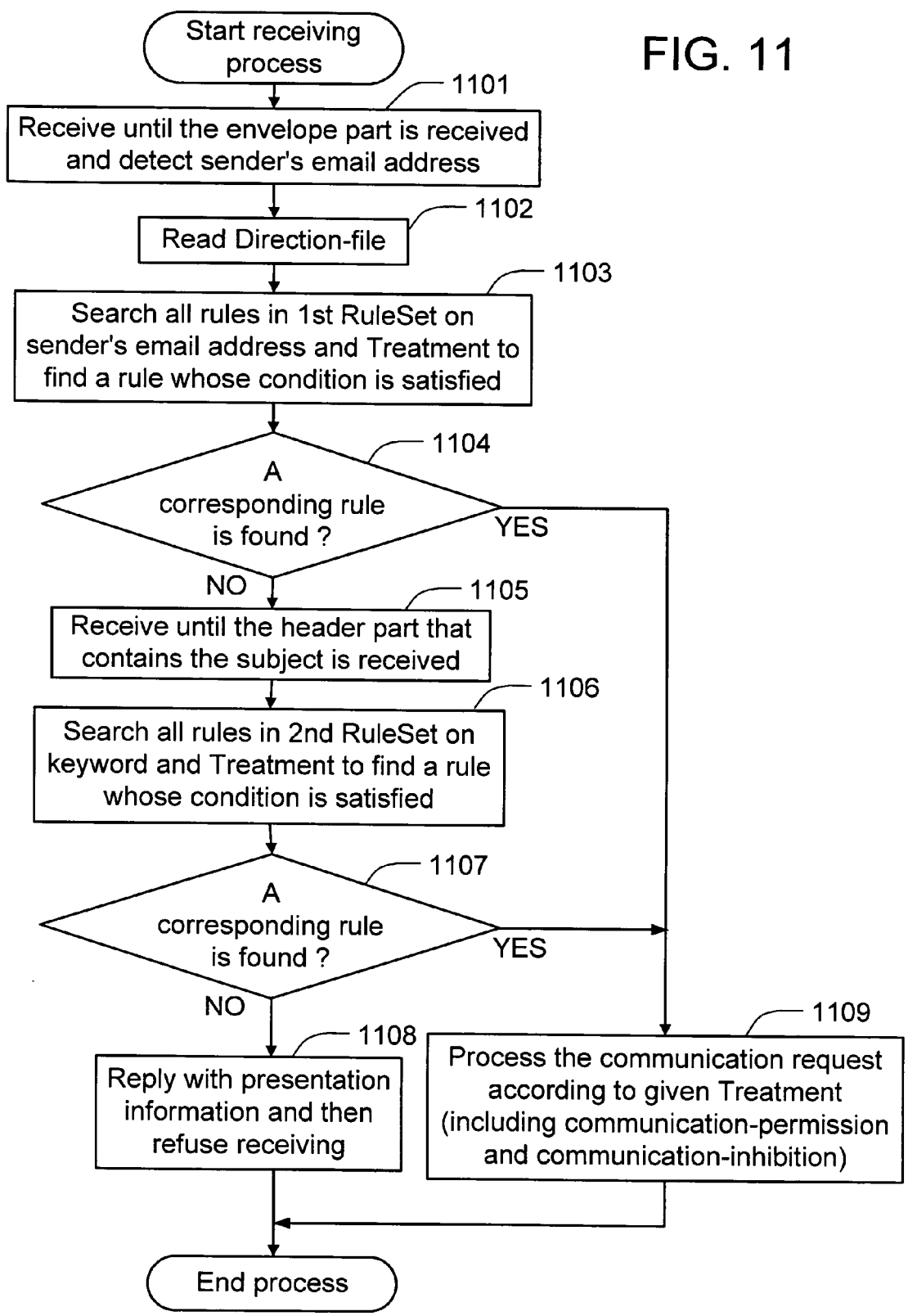

FIG. 11 is a flowchart of another embodiment of the present invention mentioned in explanation of FIG. 3. The method to apply to for the permission of communication to present to a sender is to put application contents on to the subject of the email.

The presentation information includes at least the content that promotes to put the application contents to the subject of the email. The electronic secretary is installed in the receiving server side.

The "rejecting a communication request" is to break communication after returning error messages to sending client.

The electronic secretary receives (1101) only the envelope of message and detects the sender's email address, reads (1102) the direction-file, and applies (1103-1104, 1109) the 1st RuleSet with the applying-procedure.

When no rule whose condition is satisfied can be found from the set of the 1st rule, in order to receive the subject of the email, the electronic secretary receives (1105) the header of the email.

Then the electronic secretary applies (1106-1107, 1109) the 2nd RuleSet with the applying-procedure.

The default-Treatment is processed (1108).

Generally, emails are sent from a sender terminal (a sending client) to a sending email server (a receiving server), and then from the sending email server (a sending client) to a receiving server, and then from the receiving server to a receiver terminal (a receiving client).

The sending email server has two role of a receiving server and a sending client.

Figure 12:
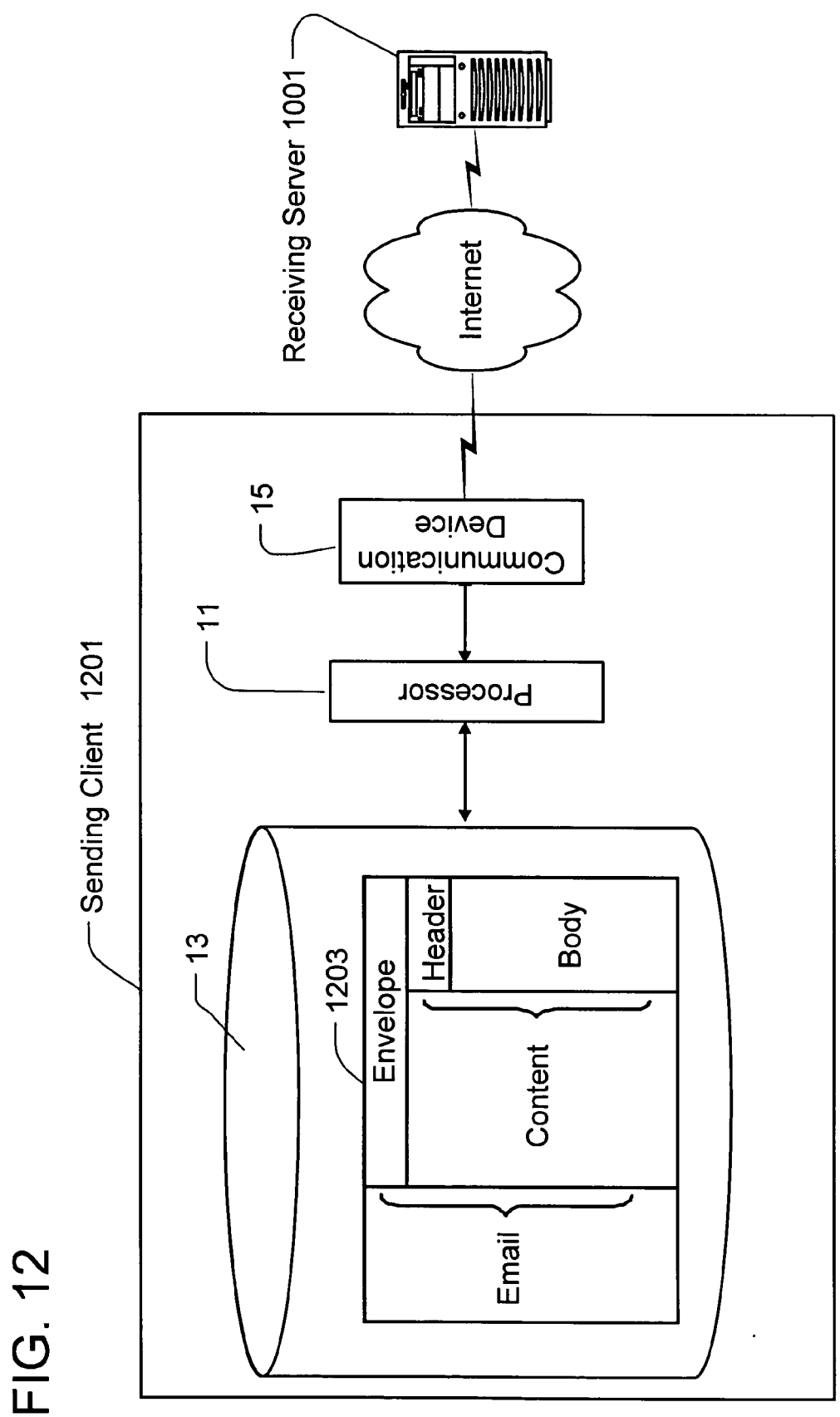
FIG. 12 illustrates one embodiment of a sending client of email.

FIG. 12 illustrates the constitution of a sending client to send emails to the embodiment (FIG. 10, 11) of the present invention for receiving.

A sending client 1201 sends emails 1203 stored in storage device 13 to a receiving server 1001. The example of the structure of email 1203 is as defined in conventional standard, referring to "RFC2822 (Internet Message Format)" that was prescribed in RFC.

In the header of the content, informational fields for human readable information including subject, comments, and keywords are specified.

Figure 13:
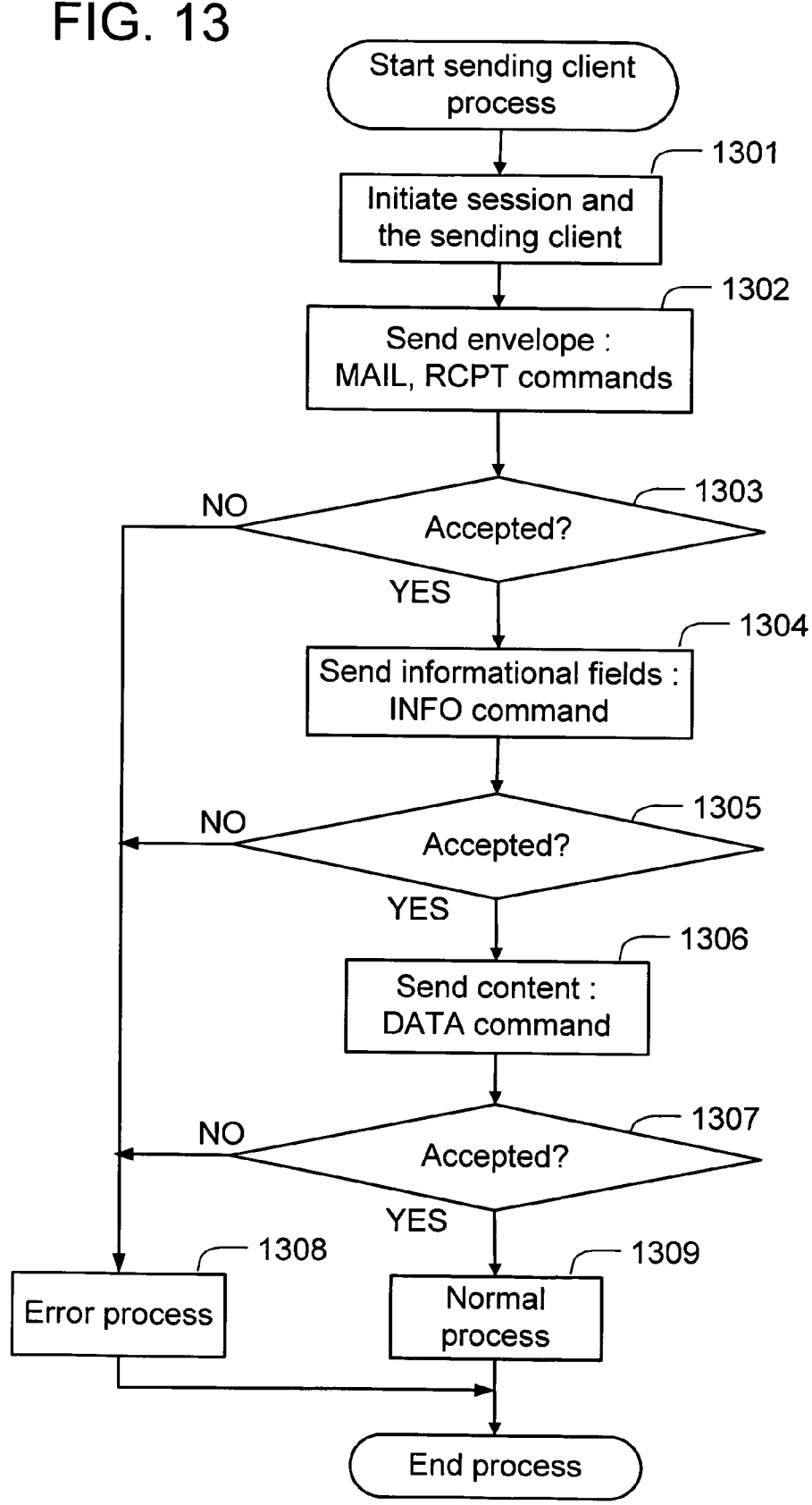
FIG. 13 illustrates a flowchart of sending email.

FIG. 13 is a flowchart of an embodiment of the sending client. Session and the sending client are initiated (1301). According to the conventional SMTP protocol (RFC2821, Simple Mail Transfer Protocol), an envelope is sent (1302) by issuing SMTP compliant commands "MAIL" and "RCPT". Then the addresses of the sender and recipient are sent to the receiving server.

The sending client tests (1303) to determine whether the envelope is accepted by the receiving server.

The receiving server tests to determine whether to accept the envelope in step 1104 of FIG. 11.

The informational fields included in the header are sent (1304), the informational fields includes information to judge the condition predetermined by recipient, and the sending client tests whether the informational fields to be accepted (1305).

This embodiment calls this processing "INFO command".

The receiving server tests whether to accept the body in step 1107.

The receiving server can decide whether the transmission of the following body is approved by collating receiving condition predetermined by recipient with information obtained from the envelope and the informational fields.

When approved, the sending client sends (1306) the content by issuing conventional "DATA" command.

The sending client delete sent message from storage 13, when the "DATA" command is approved and accepted, (1307, 1309), otherwise it starts error process (1308).

Preferably, as a sending permitting standard of the body, the informational fields are separated from the header, and are sent before the content.

In order to use existing communication softwares in the maximum, the informational fields may be extracted from the header, and it may be sent first; if the informational fields are approved, then the content which is not changed is sent; i.e. original content may be sent by issuing conventional "DATA" command (1306).

It may also first send full header in the INFO command, and send only body if approved.

In conventional SMTP, there is not a step of authorization-processing of sending; the step approves sending based on keyword information. Except the senders ID, recipients have not the information that can control communication.

The conventional white lists and blacklist technology control communication by senders ID. However, there are the problems that cannot control communication satisfactorily when the senders ID has not been put on the lists; and when it is not necessary to store the sender ID of an email in the lists, the email cannot be received.

There are conventional technologies that judge whether it is unsolicited communication using the received communication contents after the communication end; however, it cannot dissolve the congestion problem of the network.

According to this embodiment, the problems of the conventional arts can be dissolved because of the information field of communication contents be used to distinguish the communication request.

When the embodiment shown in FIG. 11 receives a message from a sending client of a conventional art, a special processing is added in step 1108.

In conventional art SMTP, when the envelope is accepted, the content is sent as one block; it is decided in the protocol that the sending of content cannot break on the way.

In other words, there is not a SMTP command to break the sending can be used at step 1108.

In order to break useless communication, a processing named an early-determination is added.

Figure 14:
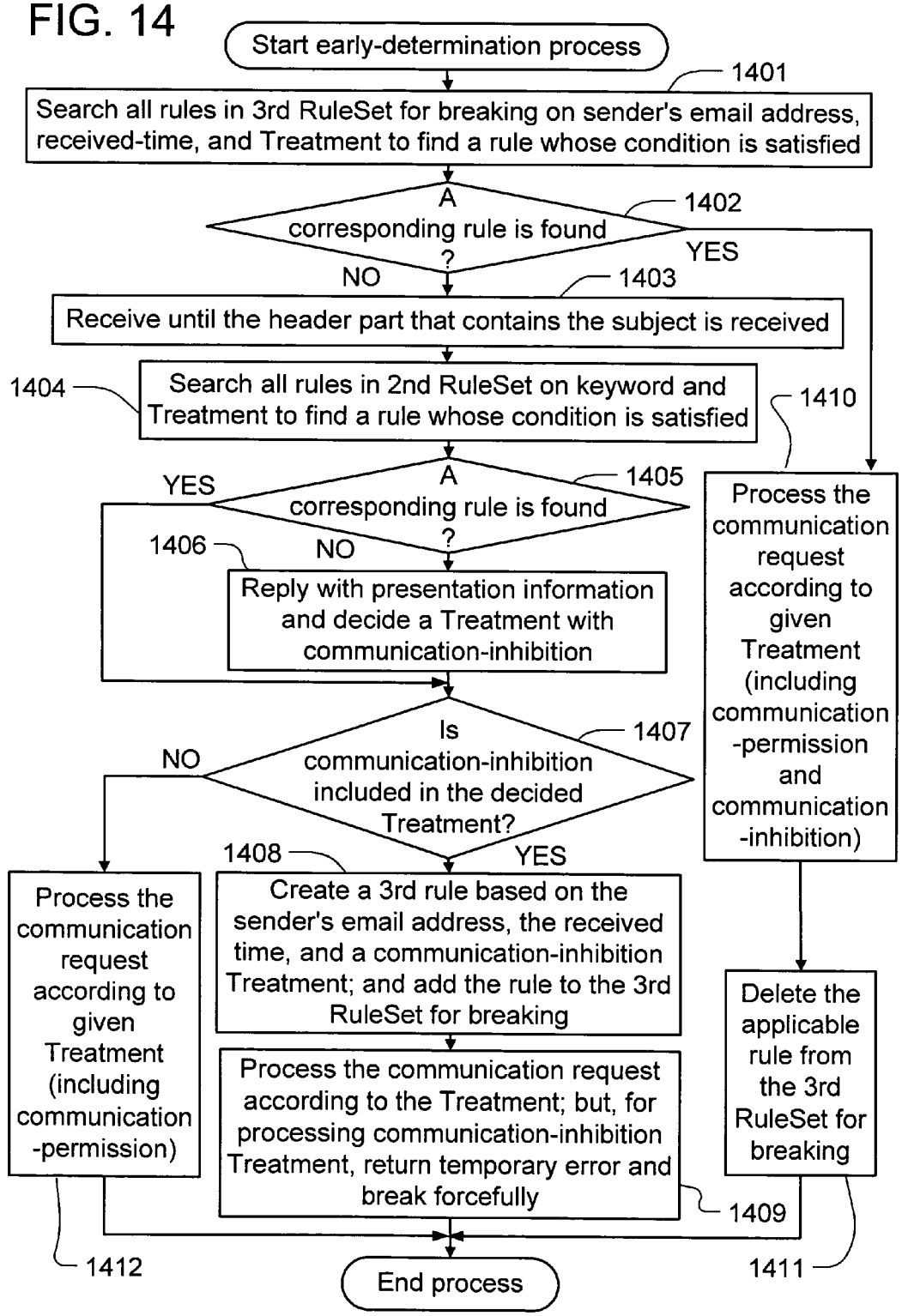
FIG. 14 illustrates a partial flowchart of early-determination process.

FIG. 14 is a partial flowchart of the early-determination process of another embodiment of the present invention shown in FIG. 11. The term "early-determination" refers to the process in which the electronic secretary decides to refuse receiving the email before receiving full body of the email.

The early-determination process begins from a point in time; at the point an applicable rule cannot be found (FIG. 11, (1104)) by applying the 1st RuleSet.

In the next step a 3rd RuleSet is applied. I.e., the system searches (1401) R3DB to find a rule; in the rule the initiator ID (in this embodiment the sender's email address) is the same, and a predetermined amount of time from the received-time to the time of searching has not passed; and tests (1402) the result.

When a record is found, the Treatment ID can be extracted from the record. Then the action-part of the rule is executed (1410).

When no rule whose condition is satisfied is found, the message is received (1403) until the header where the subject of the email is included, and the 2nd RuleSet is applied (1404-1405, 1412).

The default-Treatment is processed (1406).

However, if (determination 1407) a communication-inhibition Treatment is included in the action-part of the found rule or default-Treatment;

then a 3rd rule is created based on the actual initiator ID, the received time of the message, and a communication-inhibition Treatment, the rule is added (1408) to the 3rd RuleSet, and the electronic secretary processes communication request according to the Treatment, but, the communication-inhibition Treatment forcibly breaks (1409) the communication after returning temporary error status to the sending-client, else, processes (1412) the communication request according to given Treatment.

The purpose of execution of the 3rd rule is to stop a conventional technical sender in accordance with SMTP at a step before the reception of the header. In the step, the sender can be stopped formally.

The 3rd rule is deleted (1411) after the action-part of it is executed because it is good that it is executed once.

SMTP is located in the upper layer of layering protocol. Usually the transport protocol in the underlying of SMTP is TCP. TCP connection is indispensable in email communication.

It is one embodiment of the above described "forcibly breaks the communication" to issue a socket disconnection command (close) of TCP protocol of C language.

SMTP accomplishes transmission and reception of an email through conversations by issuing and replying to commands. Normally the sender always checks the reply of the receiver and decides movement of itself by the kind of the reply. When it is forcibly disconnected during receiving of contents, the sending is tried again automatically at intervals of a predetermined delay even if the receiver cannot reply.

The 3rd RuleSet is a RuleSet including the pair of rejection history information and a Treatment.

When sending retrying of a sender in accordance with SMTP occurs after a fixed time, in the case that sending retrying of a sender disconnected forcibly has found using the histories (1410), it is not necessary to receive the content, then the receiving server refuses the content by the standard protocol of SMTP.

When the retrying has not occurred, it is good to delete the 3rd rule that has become old.

In this way, the early-determination that can prevent happening of useless communication can be realized.

If the predetermined amount of time in the 3rd rule is longer than the interval of the sending retrying accordance with SMTP protocol, the sending retrying can be caught surely (YES of 1402), unsolicited repetitional retrying be prevented by making the sender give up.

In step 1409, a failure reply may be return to the sending client instead of the temporary error status.

In step 1105, the electronic secretary may receive while collating the rejecting or the permitting keywords from the body instead of the header.

The quantity of communication is more than the case of only using the header, but it is possible that it is statistically less than the case of judging after the communication ends, because the transfer of the body can be forcibly discontinued.

The 3rd RuleSet is a mechanism about repeated processing with history information.

In addition to the early-determination, the present invention uses this mechanism for other purpose too.

FIG. 17 illustrates the layout of record of the database (hereafter referred to as R3DB) that stores one embodiment of the 3rd RuleSet on communication initiator, received time, receiving frequency, and Treatment. The 3rd RuleSet for early-determination does not use the receiving frequency field.

The electronic secretary is provided with a Treatment named "autoSetting-permission".

The autoSetting-permission permits the communication request, and gives a communication-permission Treatment to the initiator ID.

When default-Treatment is communication-verification, the system replies with presentation information; the recipient can set the receiving condition in the presentation information freely.

For example, it is usable as a receiving condition that a name of the recipient is included in communication contents, and the autosetting-permission Treatment is given to the name. Then the email that the recipient's name is included is received, in addition, a communication-permission Treatment is given to the initiator ID.

Attention should be paid to the point that the autosetting-permission Treatment permits communication based on keyword information.

As for the above mentioned example, it is possible that the initiator ID can be added automatically to a white list, even if the initiator who knows the recipient name does not appear in the white list of the recipient, after the second time the sending can be permitted without qualification.

The whole of an email of unknown partner is not received by automatically making white list by giving the autoSetting-permission Treatment to keywords included in information fields, so that large quantities of useless communication can be avoided when the sender uses an automatic program.

There is the effect that can solve the problem of congestion of communication infrastructure.

A Treatment named "temporary-receiving" is equipped. The temporary-receiving permits a received communication request.

Emails that include specified keywords can be received by giving the temporary-receiving Treatment to the keywords. For example, an advertisement email about "golf" that has interest can be received. It is not necessary to record the initiator ID of such an email in a list.

The autoSetting-permission Treatment can be configured with a further detailed condition.

FIG. 15 is a flowchart of another embodiment of the example mentioned in explanation of FIG. 3.

When the 2nd RuleSet is applied, if an applicable rule is found, The Treatment of the action-part of the found rule is given the initiator.

The electronic secretary detects (1501) the ID, reads (1502) the direction-file, applies (1503-1504) the 1st RuleSet, applies (1505-1506) the 2nd RuleSet, and processes (1507) the default-Treatment.

The difference between FIG. 3 is that when the electronic secretary finds an applicable 2nd rule, the electronic secretary further tests (1510) to determine whether the saving condition is satisfied, and when the condition is satisfied, the electronic secretary gives the Treatment of the action-part of the found 2nd rule to the initiator, i.e. create a 1st rule based on initiator ID and Treatment, and adds (1509) the rule to the 1st RuleSet, processes (1508) the communication request according to the Treatment.

Normally, one of the saving conditions is that the Treatment in the found 2nd rule is not communication-verification. The saving condition can be predetermined or can be changed by Users.

FIG. 16 is a flowchart of one part of another embodiment of the embodiment mentioned in explanation of FIG. 3.

The process of this part is included in the block of default-Treatment (FIG. 3, 307). I.e. when no applicable 1st or 2nd rule can be found, a 3rd RuleSet is applied (1601-1602, 1605). Once a 3rd rule is applied, the rule is deleted from the RuleSet (1606); then a 1st rule is created based on initiator ID and a predetermined Treatment, and the rule is added to the 1st RuleSet (1607).

When no rule whose condition is satisfied is found, the electronic secretary creates a 3rd rule based on initiator ID, received time, receiving frequency, and a predetermined Treatment, and adds the rule to the 3rd RuleSet (c.f. FIG. 17).

When there was already a 3rd rule record, receiving frequency is added (1603).

The electronic secretary executes (1604) the original default-Treatment.

There are conventional arts for preventing unsolicited communication that automatically reply when an initiator is unknown; the reply has not any limit.

However, the reply-to addresses of most SPAM mails are forged. Those arts have a danger to promote an illegal act. I.e. legitimate recipients have danger that they are used as a stepping-stone for attacking other persons by illegal initiators.

It is possible that the auto-replied messages themselves become unsolicited email messages.

FIG. 16 is an embodiment giving a communication-verification Treatment of limited frequency to a partner.

The embodiment is a countermeasure against an email bomb attack by repetitive sending. A condition on number of times of receiving is added to the condition-part of 3rd rule so that communication requests from an initiator that exceed the predetermined number of times within a predetermined amount of time are refused and the initiator is given with a communication-inhibition Treatment.

For example, if an email is received for the second time from the same reply-to address, and the information by which predetermined identities can be confirmed is not included, then, the communication-inhibition Treatment is given to this address. Then the request can be refused without an automatic reply.

The communication-inhibition Treatment may be promptly given if the sender's address is invalid and cannot be replied to.

Conditions on time may be included in the condition-part of 1st rule in the same way as the 3rd rule.

For example, when above one month time is passed, the 1st rule having a refusing Treatment is deleted. Then the Treatment of a refused initiator can return to default-Treatment again, and the 1st RuleSet can be prevented from being too big.

Therefore, this embodiment provides an email communication system through emails header, so that the system can prevent unsolicited emails according to the individual intention of the recipients.

Further, the system can evade congestion of communication infrastructure, can evade being attacked, and can also prevent phishing fraud.

This embodiment can coexist with conventional technology, and it can be taken advantage of as an additional function of conventional technology.

The environment of the conventional email system can be maintained by specifying communication-permission as the default-Treatment for Users who uses conventional technology.

Figure 18:
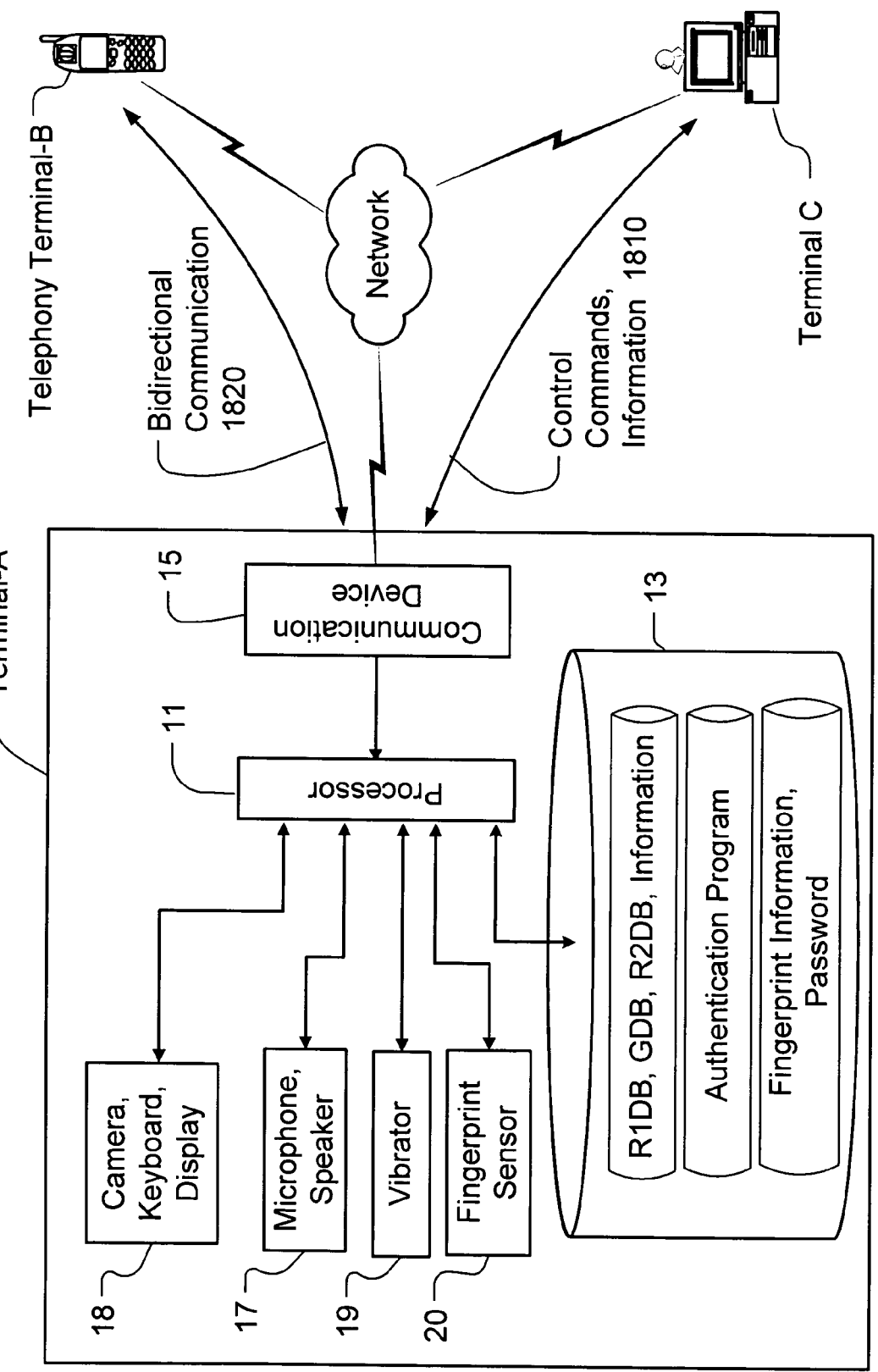

FIG. 18 illustrates the constitution of another embodiment of the embodiment mentioned in explanation of FIG. 3.

The electronic secretary, the direction-file R1DB, GDB and R2DB are installed in Terminal-A. It is provided with means for communication by real-time interaction.

Terminal C having control authority can communicate with, and send control commands 1810 to callee's Terminal-A without intervention from person at the callee side.

Terminal-B to which a communication-permission Treatment was given can still bidirectionally communicate (1820) with Terminal-A.

User of Terminal-A gave information-transmission-permission and program-executing-permission Treatment to terminal C. Information is forwarded (1810) to Terminal-A from terminal C, and written in storage device 13 of Terminal-A.

When User of Terminal-A gave a calling-attention-permission Treatment to terminal C, terminal C can make display 18 output information, can make speaker 17 produce sound, can make vibrator 19 vibrate, and so the User of terminal C can attract attention of a party near Terminal-A.

When information requesting verification of electronic commercial transactions is received from terminal C, an authentication program is started. Then the owner of Terminal-A inputs a fingerprint through fingerprint sensor 20, the authentication program collates the inputted fingerprint information with the registered fingerprint information, if they are equal, then a previously registered password is transmitted to terminal C, and the transactions can be verified.

The flowchart of FIG. 3 can be used in telephone communication, too. The initiator ID is caller's number. In step 305, a cycle comprising playing a question or message and receiving response from the caller may be included.

Figure 19:
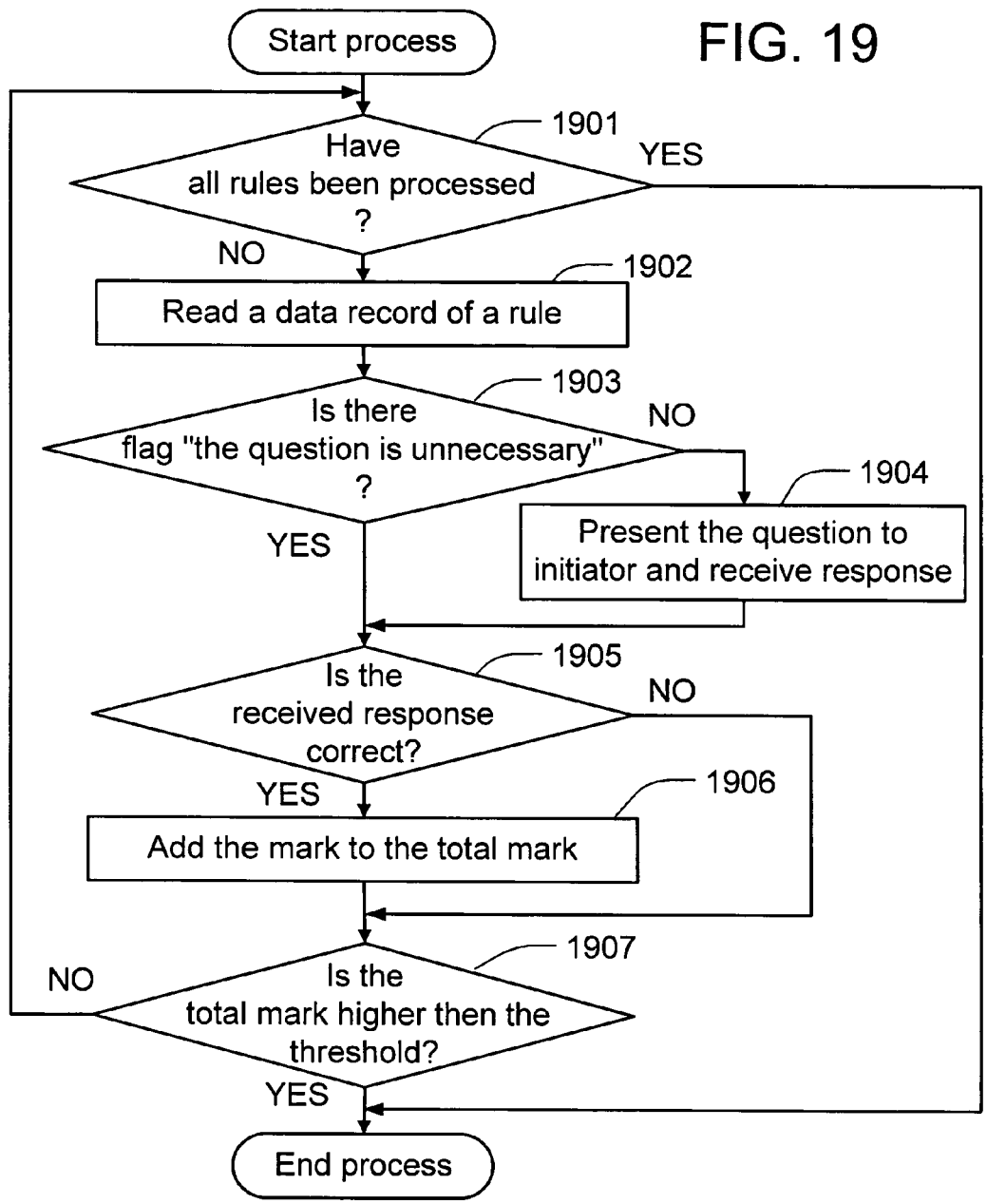

FIG. 19 is a flowchart of another embodiment of the embodiment mentioned in explanation of FIG. 3.

The presentation information includes questions asked to the initiators; the keywords are answers that have gained predetermined sum of marks to the questions.

The direction-file includes a set of 4th rules (hereafter referred to as 4th RuleSet). The 4th rule comprises a condition-part including conditions on a question to present to initiator and an answer of the question, and an action-part on obtaining marks, and the rule can be expressed in the following way:

"If responses from the initiators are correct answers, sum up the marks".

The electronic secretary is also capable of the following actions.

(a) Presenting the question to the initiator, (b) receiving initiator's answer to the questions, (c) applying the 4th RuleSet.

FIG. 20 illustrates the layout of record of the database (hereafter referred to as R4DB) that stores one embodiment of the 4th RuleSet on questions to present to initiators, answers to the questions, and marks.

The questions and presentation information that are stored in GDB are things selected from the group consisting of text, sound, and images.

This part of process exemplifies the procedure of repeated presentation of guidance information, receiving response and deciding correctness of the response. It can be included in step 305 of FIG. 3.

The electronic secretary tests (1901) to determine whether all records in R4DB have been processed, extracts (1902) a record, presents (1904) the question to the initiator, and receives response from the initiator.

There may be multiple correct responses for one question.

For example, there may well be multiple correct ID numbers when the ID numbers is identified.

This embodiment uses the following method to identify multiple correct answers:

If (1903) a record has the flag: "the question is unnecessary", or has an empty question field; then match (1905) a received answer to next record in R4DB There may be cases where determination can be made without presenting every question.

For example, there is the case which the identity of the party can be judged with the first question.

If the sum (1906) of mark reaches a predetermined sum, the question and answer will be finished (1907).

This embodiment has a mechanism to finish the question and answer early; that is if the sum of mark reaches a predetermined sum, the question and answer will be finished.

The electronic secretary that carries out this provides means of receiving response in different formats. For instance, if the response is dial tone, the system provides means of recognizing the dial tone.

Callers can be distinguished by the ID numbers or passwords that are issued by Users. Communication is possible from any indefinite calling terminal by using ID numbers.

Figure 21:
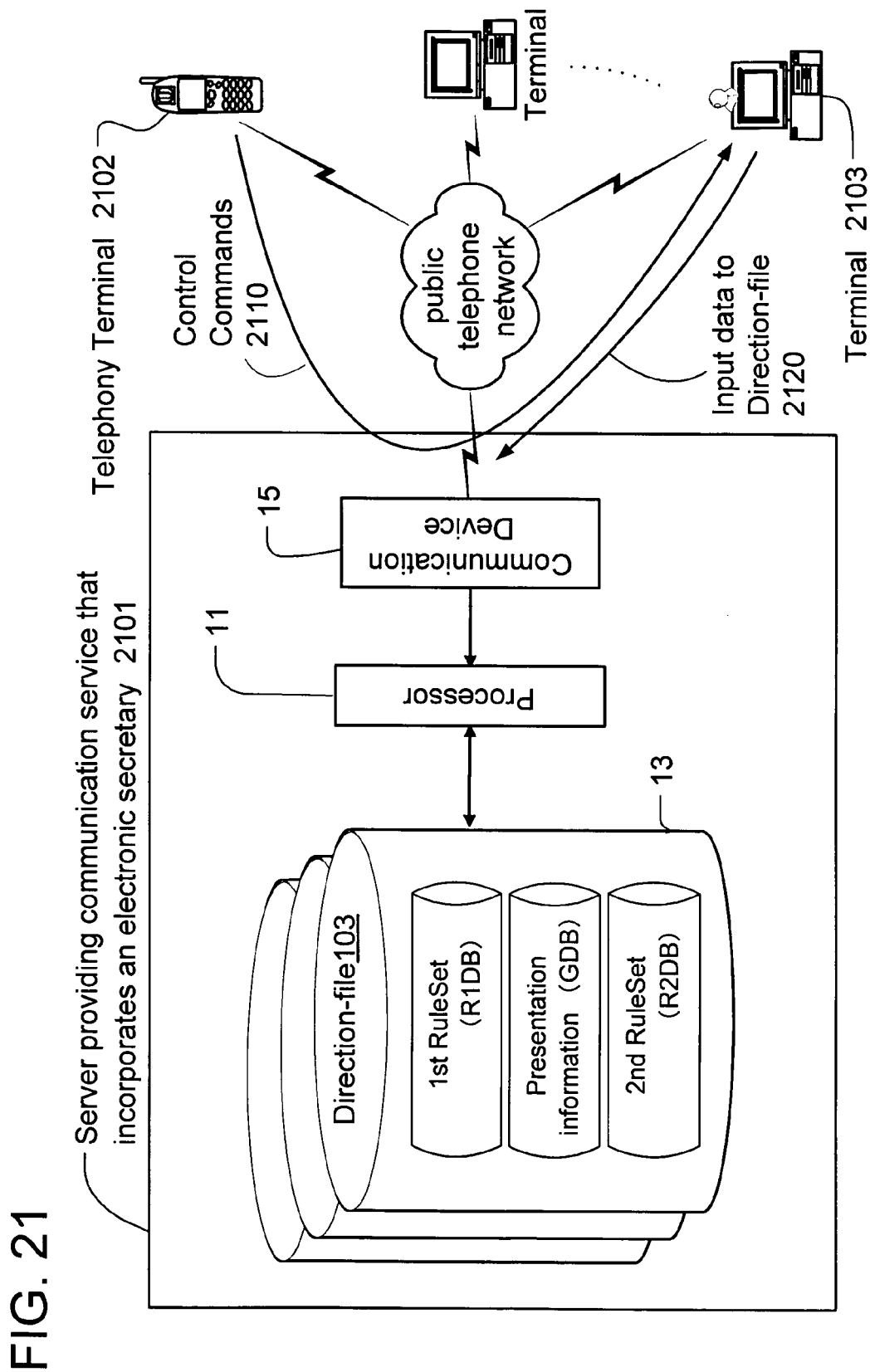

FIG. 21 illustrates the constitution of another embodiment of the present invention.

The electronic secretary and the direction-files are installed in the server 2101 at the side of communication service providers.

The electronic secretary can be used by multiple Users, and each User has his own direction-file. The User inputs (2120) information for constructing the User's own direction-file by arbitrary client terminal 2103 or telephone.

Communication requests or control commands are sent (2110) from initiator terminal 2102 via the electronic secretary.

Figure 22:
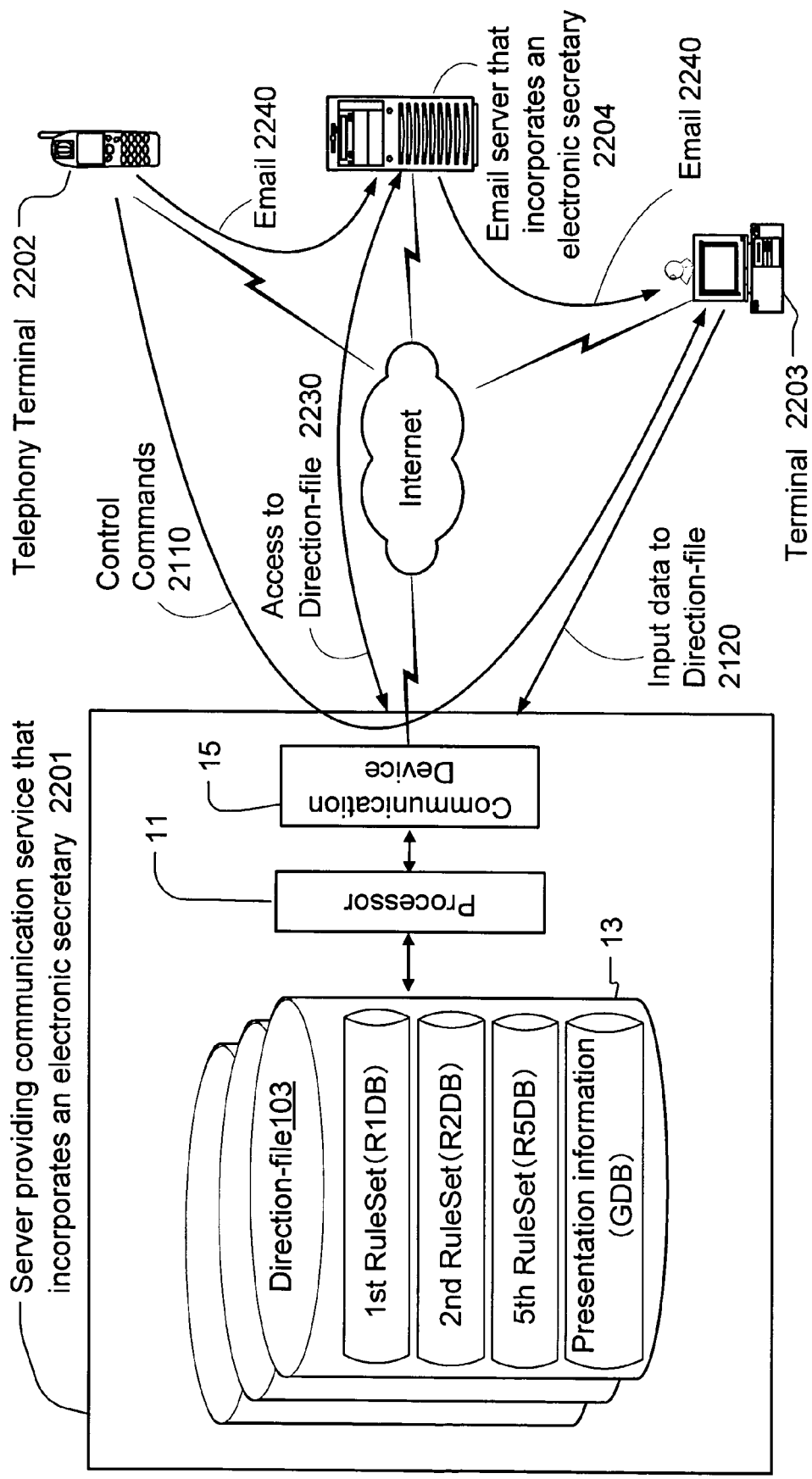

FIG. 22 illustrates the constitution of another embodiment of the present invention.

The electronic secretary has means of accessing (2230) the direction-file via network; one User uses multiple electronic secretaries (2201, 2204). The multiple electronic secretaries access one direction-file 103.

Reference numeral 2240 shows an email delivered via server 2204.

A 5th RuleSet (cf. FIG. 24, R5DB) that the electronic secretaries make is also stored in the direction-file 103.

FIG. 24 illustrates the layout of record of the database (hereafter referred to as R5DB) that stores one embodiment of the 5th RuleSet on recipient, sent time, and Treatment.

FIG. 23 is a flowchart of sending processing part of another embodiment of the embodiment mentioned in explanation of FIG. 3.

The direction-file further includes a set of the 5th rules (hereafter referred also as 5th RuleSet); the 5th rule includes a condition-part and an action-part, the condition-part has an application condition on a recipient ID and a sent time, and the action-part orders execution of an action corresponding to a Treatment.

The electronic secretary is also capable of the following actions:
(a) applying the 5th RuleSet,
(b) sending a communication request to recipient and receiving a Treatment from the recipient, and
(c) creating a 5th rule and adding it to the 5th RuleSet.

The electronic secretary searches 5th RuleSet on recipient ID, sent time, and Treatment to find a rule whose condition is satisfied, tests (2301, 2302) to determine whether a corresponding rule is found.

When found, it processes (2304) the sending request according to the Treatment of found rule.

When not found, it sends a communication request to recipient and receives (2303) a Treatment.

If the receiving-side is an electronic secretary provided by the present invention, specified return codes indicate Treatment.

The electronic secretary of sending tests the return codes; communication is continued (2305, 2306).

If the receiving-side employs conventional technologies, e.g. a conventional email server, preferably permanent error codes are regarded as the communication-inhibition Treatment.

When the Treatment received is "not able to permit communication now" Treatment, a 5th rule is created based on recipient ID, sent time, and Treatment, and it is added (2307) to the 5th RuleSet.

The primary purpose of this embodiment is to stop unsolicited communication at the outbreak source.

Preferably, the invention is operated at server side as illustrated in FIGS. 21 and 22. Initiators cannot prevent the input (2307) of a Treatment; the Treatment includes communication-inhibition or the "not able to permit communication now".

When the Treatment given by the receiving-side is communication-inhibition, repeated communication requests during predetermined amount of time are blocked.

Preferably, the administrator of the server sets the amount of time.

When a Treatment such as "call me again after one hour" is given, it can be carried out at the sender's server.

When R5DB is not cleared, the number of R5DB record of an initiator who sent a large amount of unsolicited communication indiscriminately will become big. According to the number of R5DB record, the administrator of the server can lower the transmission efficiency of the initiator, or can give warning to the initiator.

For sending communication requests from the inside, Treatment processing is executed with a 1st RuleSet set by the User of the terminal for sending.

Attention should be paid to the point that the 1st RuleSet for sending and the 5th RuleSet have different purposes.

In embodiments of the present invention, because the recipient (User) determines whether the communication is allowed, connection between subscriber ID such as telephone numbers and identity of User is separable.

Only the persons within the group of trusted callers can be connected. An effect such as a private network in the public network can be achieved.

The present invention can refuse a communication even if the other party knows the subscriber ID that the recipient has been using, unless the recipient itself deliberately publishes true identity; it is possible to maintain anonymity while using normal telephone numbers.

Besides, the anonymous communication that all communication functions are easily usable can be realized.

However, two parties who have not communication relation at all need mediator to start communication.

Figure 25:
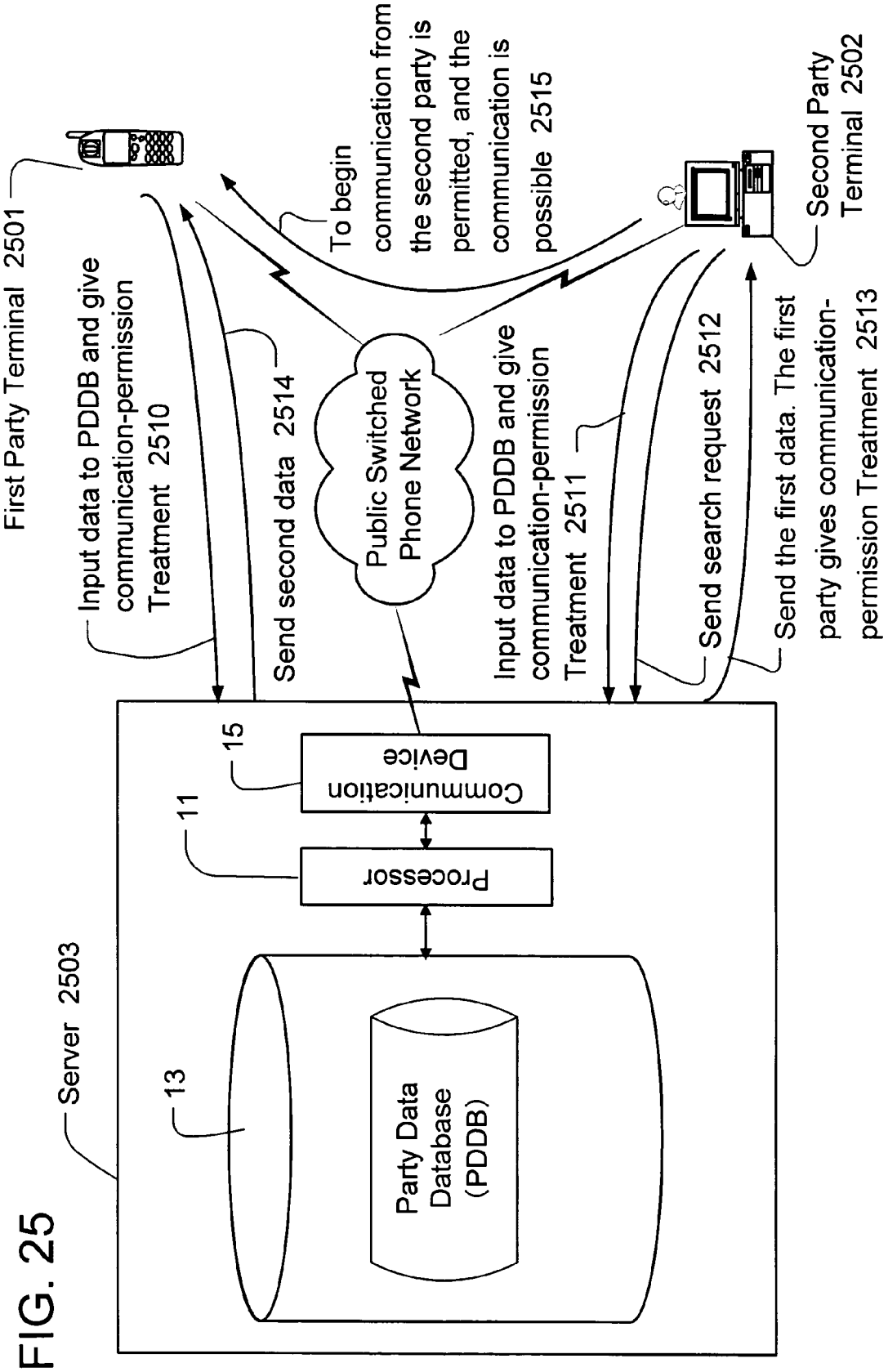
FIG. 25 shows a mediating system that begins anonymous communication.

FIG. 25 illustrates one embodiment system of the present invention that mediates between Users of electronic secretary in order to begin anonymous communication.

A first party and a second party are Users of the electronic secretary. The electronic secretary operates between terminal and the network as shown in FIG. 1, and is incorporated into Users terminal or server 2101 that provide communication service (it is not shown in FIG. 25).

A first and second data are respectively the personal information of the first and second party. This information is shown in FIG. 26 that describes PDDB, and they include party ID such as telephone number, name, pseudonym, address, education history, employment history, etc.

Server system 2503 stores personal information of party hoping for the anonymous communication in PDDB, and provides service such as searching communication partner in order to begin the anonymous communication.

FIG. 26 illustrates layout of record for party data database (hereafter referred to as PDDB), that is one embodiment concerning party data. Other than PDDB, refer to example 3 for another embodiment concerning party data.

Figure 27:
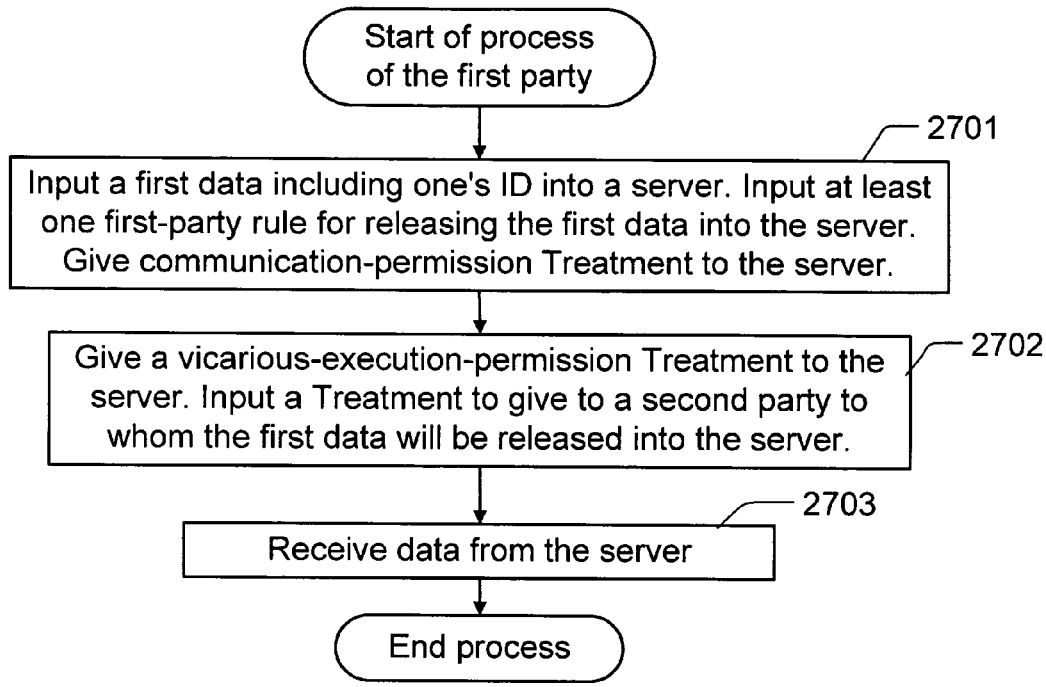
FIGS. 27-28 illustrate flowcharts of the processing of the anonymous communication of the 1st and 2nd party.
Figure 28:
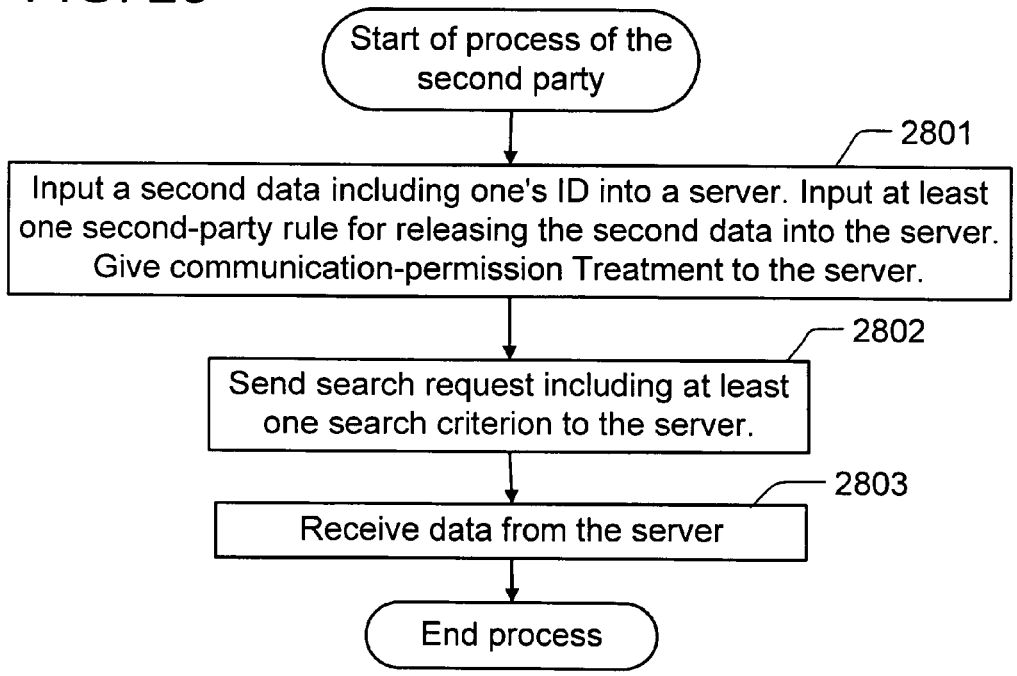
Figure 29:
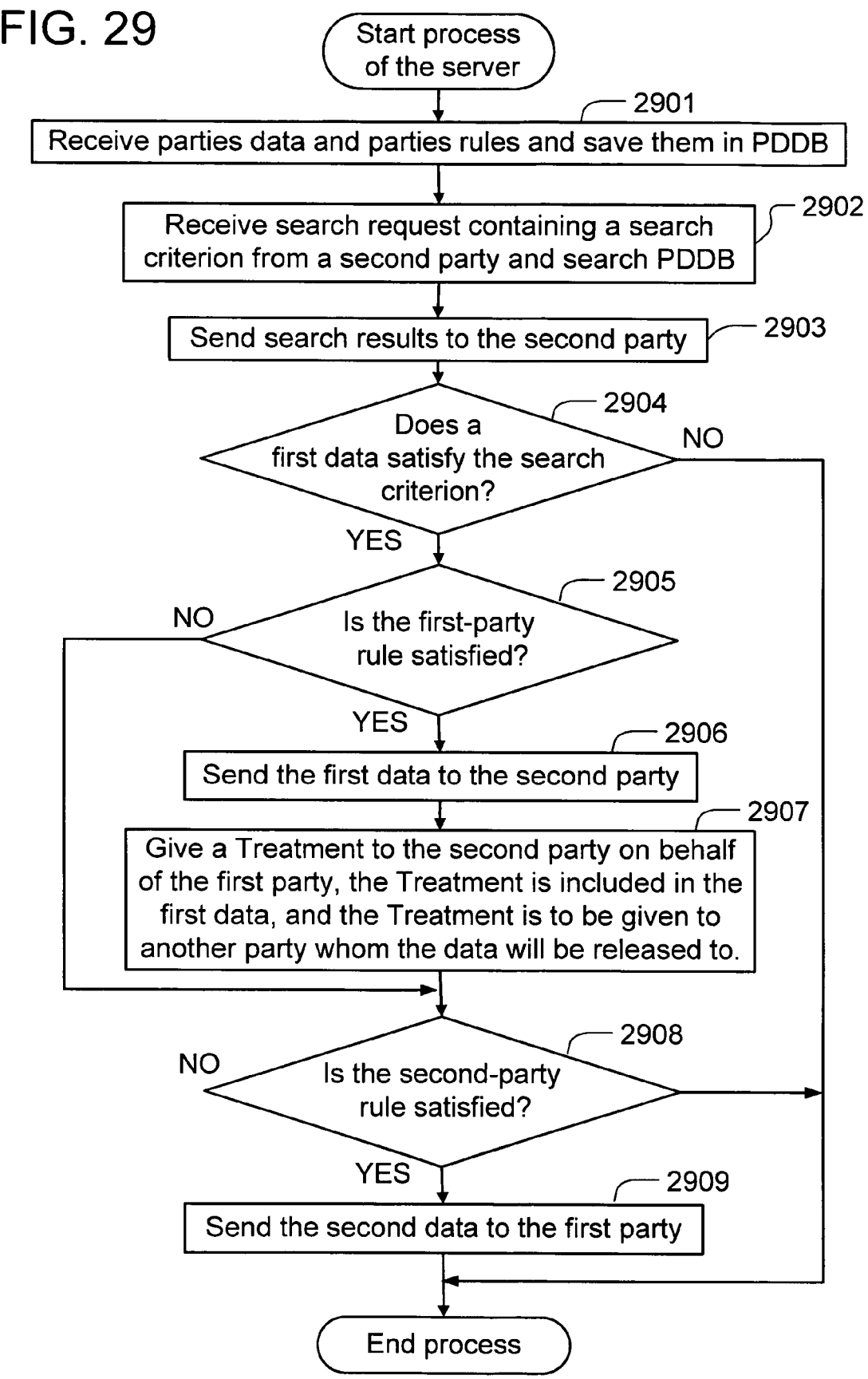
FIG. 29 is a flowchart of the search, data sending, and Treatment setting operation.

FIG. 27 is a partial flowchart of processing of the first party. FIG. 28 is a partial flowchart of processing of the second party. FIG. 29 is a flowchart of processing of searching, data sending, and Treatment configuration of the server 2503.

Multiple parties can use this embodiment at the same time. In following descriptions, it is assumed that the first party inputs a Treatment to gives to a partner into PDDB, give (2702) a vicarious-execution-permission Treatment to server 2503, and the second party sends (2802) search requests to the server 2503.

The first and second party input the first and second party data and at least one party rule for releasing the data to server 2503; and gives communication-permission Treatment to the server by terminal 2501, 2502, respectively (2510, 2511, 2701, and 2801). Server 2503 receives party data and party rules, and stores (2901) them in PDDB.

Party rules are stored in authorization profile of PDDB. The rules include profiles of candidates to which the party will and will not release data. The rules also include whether confirmations are necessary or not before releasing data. The rules also include information as to what information will be released.

The second party sends (2512, 2802) search request including search criterion.

Server 2503 receives it, searches (2902) PDDB, and sends (2803, 2903) search results such as the number of found records to the second party.

The server first tests to determine (2904) whether the first data satisfies search criterions; if there is a first data that satisfied the criterion, tests to determine (2905) whether first-party rule is satisfied, if yes, sends (2513, 2803, 2906) first data to second party.

If the first party gives vicarious-execution-permission Treatment to server 2503, when a Treatment for giving to a second party has been input into PDDB, and when the first data will be released to the second party, server 2503 gives (2513, 2907) the Treatment to the second party on behalf of the first party.

Server 2503 tests (2908) to determine whether the second party rule is satisfied, if yes, sends (2514, 2703, 2909) second party data to the first party.

Before releasing party information, the confirmation of the party may be included as a necessary condition in party rule.

If a User's direction-file is stored in server 2101 in a network, server 2503 logs in to server 2101 using the access-permitting-information (ID and a password), and inputs data into the direction-file.

Vicarious-execution-permission is realized by server 2503 modifying a party's direction-file using access-permitting-information given by the party; or it is realized by giving a use-permission Treatment of resources including passwords of the party to server 2503.

If the direction-file is stored locally, Vicarious-execution-permission is realized by using an information-transmission-permission Treatment given by the party to server 2503, and modifying local direction-file.

A searching process to intermediate for starting anonymous communication is made public by U.S. Pat. No. 5,884,270, Walker, et al. Mar. 16, 1999.

It is preferable to give communication-permission Treatment to a keyword-information of a partner, i.e., to teach a password or a ID number for anonymous communication to the partner.

When the User wants to break off the communication relation, it is not necessary to store the partner's ID such as telephone number on a blacklist. It is good to delete the ID number.

Figure 30:
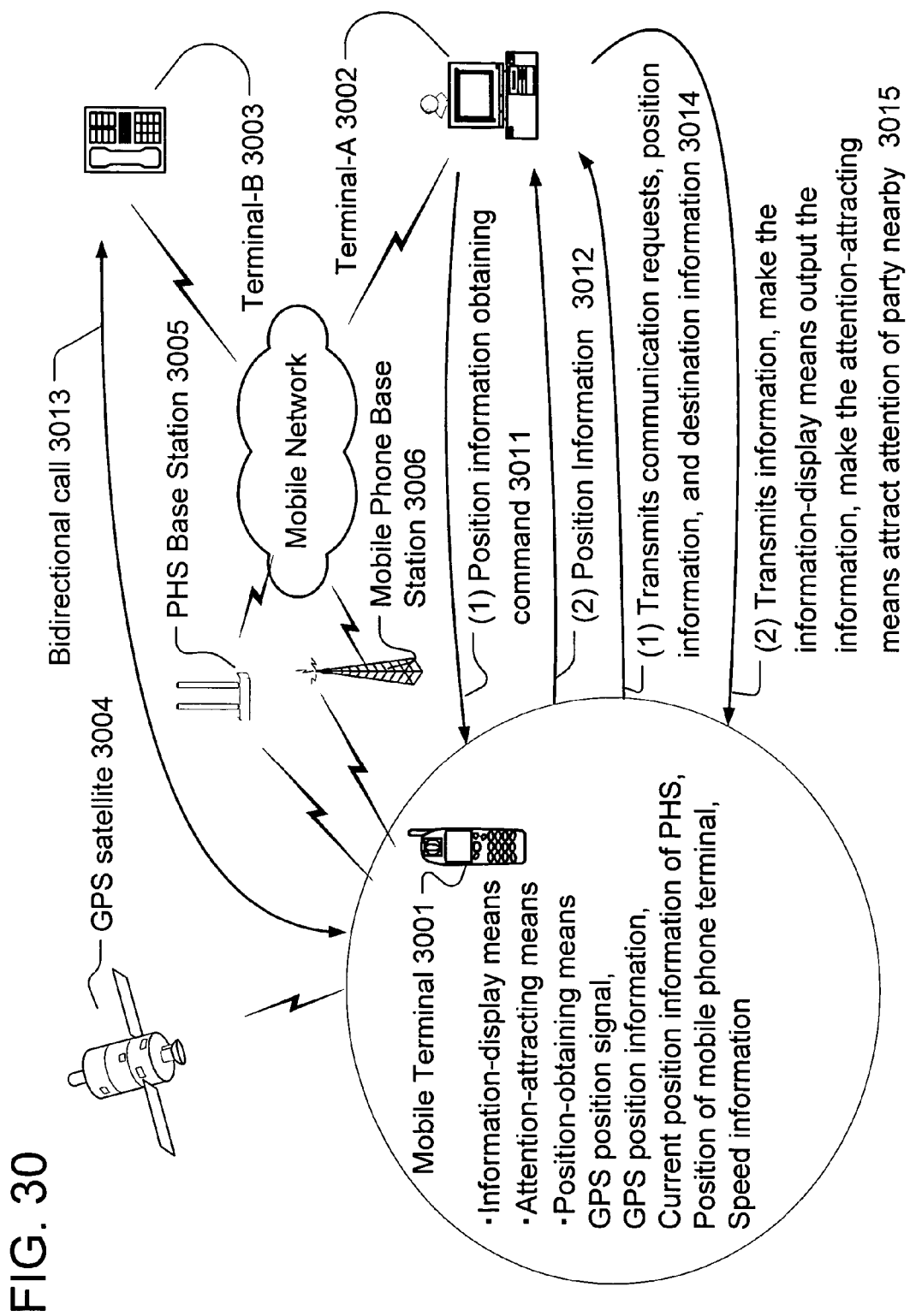
FIGS. 30, 32 illustrate the structures of embodiments related to position information.

FIG. 30 is a conception diagram showing the structure of another embodiment of the present invention. Means illustrated are equipped as necessary, and it is not a meaning comprising all simultaneously.

A User of mobile terminal 3001 gave position-obtaining-permission to initiator of terminal-A 3002. Terminal-A issues a command 3011 for obtaining position information, the mobile terminal follows the command and obtains position information from installed means of obtaining position information, and transmits (3012) the information to terminal-A.

The position information includes a member (hereafter referred to as "concrete-position") of the group consisting of received GPS (Global Positioning System) position signal, position information converted by the GPS position signal, current position information of PHS (Personal handy phone) terminals, and position information of mobile terminals based on position information offered by mobile phone base stations.

The concrete-position includes a member of the group consisting of GPS position signal received from GPS satellite 3004, position information converted by the GPS position signal, current position information based on position information offered by PHS terminals base station 3005, and position information of mobile terminals based on position information offered by mobile phone base station 3006.

When the mobile terminal apparatus (hereafter referred to as "mobile terminal") issues a communication request to terminal-A, whose ID is pre-registered in the mobile terminal, the mobile terminal detects the position information and transmits it to terminal-A (3014), and transmits a travel plan information to terminal-A, and further gives Treatment of (a) information-transmission-permission, and (b) attention-attracting-permission to terminal-A.

Terminal-A transmits information to the mobile terminal, outputs information to the mobile terminal's information-display means, and attracts (3015) attention of the party nearby with the mobile terminal's attention-attracting means.

For example, in the case of groups who will like notifications of positions of each other such as vehicles or mountain climbing persons moving nearby, the members of the group can display positions of each other.

Terminal-A that speed-obtaining-permission was given can obtain speed of the mobile terminal in the same way as the command for obtaining position information.

Then only when it is necessary, terminal-A can get movement information from the mobile terminal.

The attracting attention includes making the mobile terminal make sound, light, or vibration.

The travel plan information includes a arrival destination information, the information to transmit to the mobile terminal includes a member of the group consisting of map information, recommended route information, current route information, traffic congestion information that is ahead of the current position, detouring information, and weather information.

The above position information includes the concrete-position.

Terminal-B 3003 carries out normal bidirectional communication (3013) with the mobile terminal.

Figure 31A:
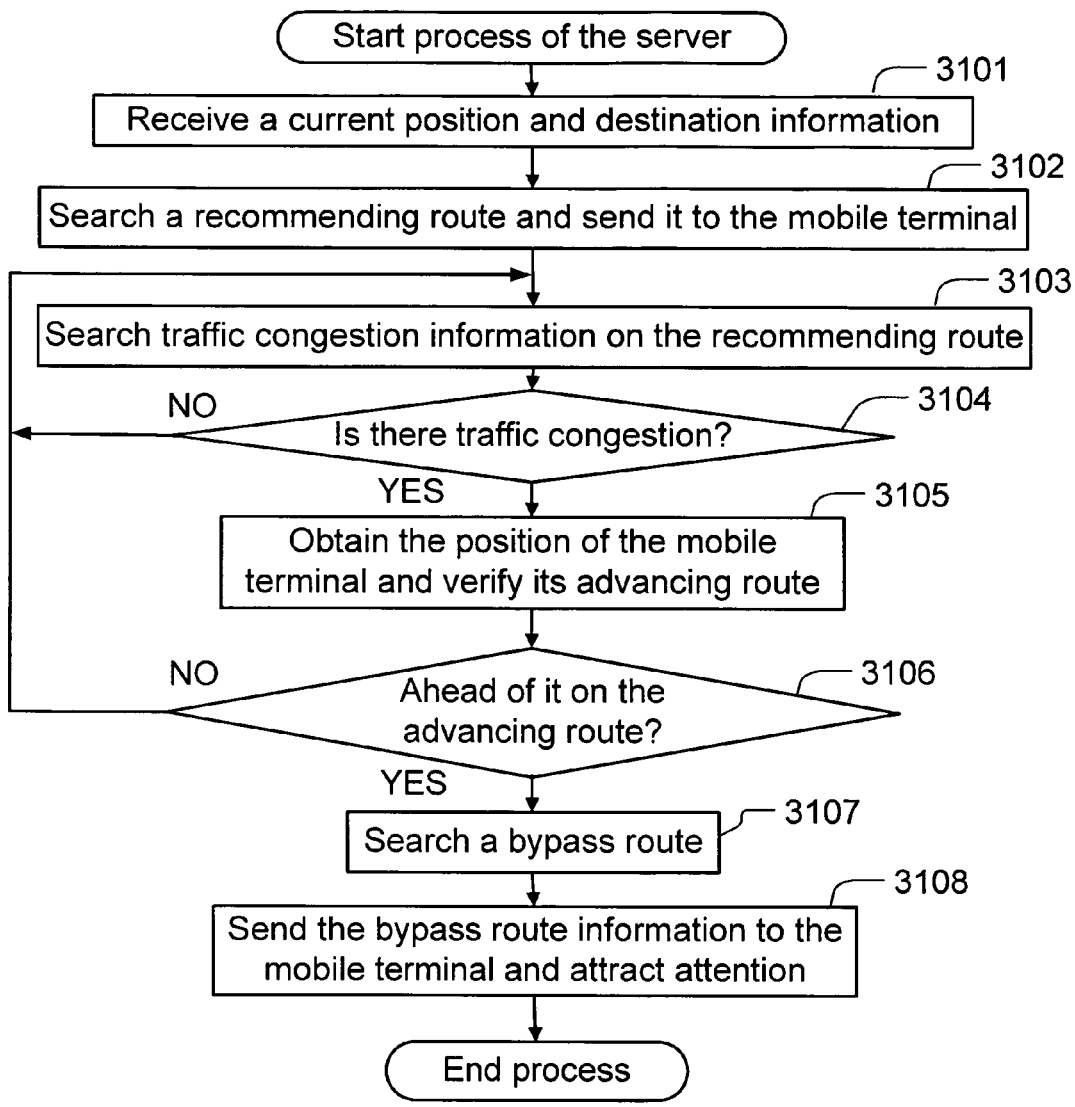
FIG. 31A is a flowchart of one embodiment related to route guidance.

FIG. 31a is a flowchart of another embodiment of the present invention about dynamic route guidance (cf. FIG. 30).

The purpose of the embodiment is to provide efficient vehicle navigation functionalities to mobile terminal that has means of obtaining position information, for example, mobile phone with GPS.

When the mobile terminal issues a communication request to a fixed server terminal whose ID is pre-registered, it transmits detected current position information and destination information to the server; and the server receives (3101) it.

The server then searches recommended route and sends (3102) it to the mobile terminal; then searches (3103) the traffic congestion information on the recommended route at a certain intervals, tests (3104) to determine whether there is traffic congestion; if yes, the server that the position-obtaining-permission Treatment was given obtains position of mobile terminal and verifies (3105) its advancing route, and if the traffic congestion is ahead of the terminal on the advancing route, the server searches (3106-3107) a bypass route, if there exists a bypass, the server that information-transmission-permission and attention-attracting-permission Treatment were given sends the bypass information to the mobile terminal, and then notifies (3108) the attention of the driver by sound.

A searching of route needs a lot of computational complexity and speed.

It is not efficient to search dynamic traffic information from a mobile terminal.

This embodiment leaves the operation that a cheap mobile terminal cannot do to the server, and only when there are traffic congestions in which the driver will probably be caught, the bypass information is notified to the driver through the mobile terminal.

By giving control-permission Treatment to the server, the receiving-side driver needs not to operate the mobile terminal manually.

Figure 32:
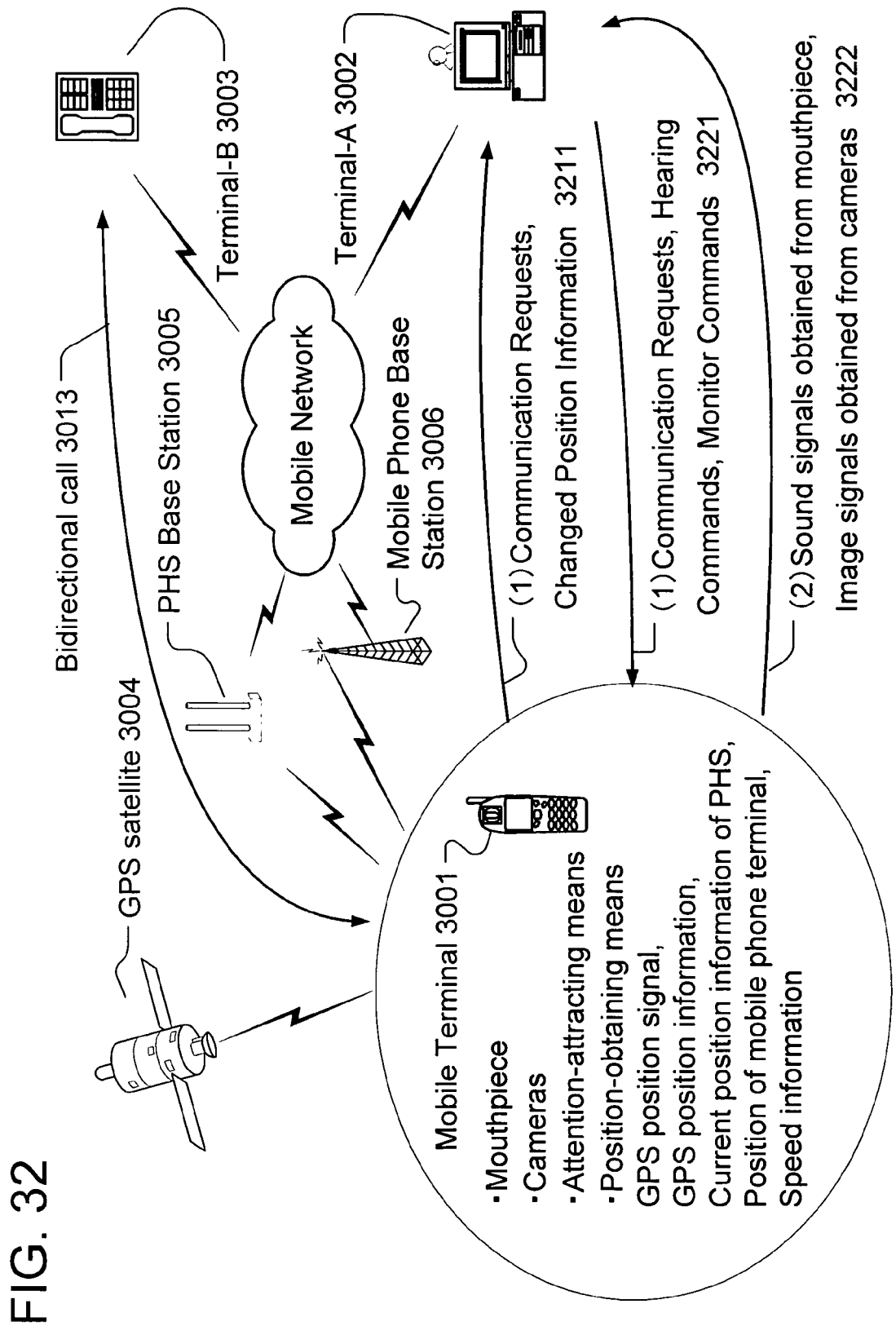

FIG. 32 is a conception diagram of an embodiment of the present invention about position information, et cetera.

Upon detection of changes in position information, mobile terminal 3001 transmits (3211) the changed position information to Terminal-A 3002 whose ID is pre-registered.

Terminal-A gives information-transmission-permission and attention-attracting-permission Treatment to the mobile terminal.

Control-permission includes hearing-permission. It is suppose that the owner of the mobile terminal gave hearing-permission and monitor-permission Treatment to Terminal-A.

Terminal-A issues (3221) communication requests, hearing commands, or monitor commands.

According to the commands, the mobile terminal sends (3222) sound signals obtained from installed mouthpiece, or image signals obtained from cameras, to Terminal-A.

This embodiment can be used on a mobile terminal to watch children. For example, parents can be informed of the child's location, and hear what is happening around the child playing in the park, or attending school, and so on.

When the child is commuting, the changes of the child's position are automatically sent to Terminal-A of the parents.

Preferably, the mobile terminal is PHS; transmission of information is done using packet-based email.

Preferably, Terminal-A is a personal computer with direct connection with the Internet using ADSL lines, displaying the child's position with map information in real time.

The same system can also be used to prevent car thievery. It can be configured to send warning to the owner, and to chase when there is unexpected change of position.

When higher precision of the position information is necessary such as when the system is used in taxies or the transport business, it is preferable to use position-obtaining means of GPS.

Conventionally, there are technologies that a caller obtains position information of a callee party mobile phone.

However, there are problems that the caller (control-authority-caller) who can obtain position information was fixed at the design stage of the terminal in the above technologies. The User of the terminal cannot change, add, or delete the above control-authority-caller. Therefore, an end user using position information of the above terminal cannot obtain the position information when the terminal is not connected through the above fixed control-authority-caller.

In other words, a service center corresponding to the control-authority-caller is indispensable.

According to this embodiment of the present invention, the User can give a control-permission (position-obtaining-permission) Treatment to any caller whom the User decides; can change, add, or delete the address of control-permission (control-authority-caller) in the list (the 1st RuleSet) freely; and the end user to whom control-permission Treatment was given can obtain position information of the callee party terminal directly.

Because a service center of a third party is not necessary, a position information system embodying the present invention differs from the above conventional technology structurally. Because it is simple structurally, the economic effect is obvious.

A cost is necessary besides a usual mobile phone bill in order to obtain position information of a GPS mobile phone in Japan now. The minimum cost of position-information-obtaining service of the position-information-center of KDDI Co. is 3,000 Japanese Yen every month (Japanese KDDI CORPORATION, GPS MAP, http://www.kddi.com/business/solution/mobile/gps/index.html2004.10.17 searched).

Center systems of position information for locating elderly people who get lost appeared several years ago.

Even if there are not the conventional systems, the User can freely locate its family who carry the mobile terminal 3001 to be shown in FIG. 30, 32 when it is necessary.

Models of mobile phone that have displays such as liquid crystal displays that display position information of itself was already commercialized.

The increase of the cost for using this embodiment of the present invention in these models is only to change control programs. Because data of an origin for display can be obtained from the mobile phone of the partner, and the data can be displayed by displays means of itself, it is not necessary to increase hardware of these models of mobile phones.

In addition, when the data is the time information (position signal) of highly precise atomic clock from the GPS satellite that cannot be directly used for display, conventionally, the position information is transmitted to an arithmetic unit, and then the operation result is received, and it is displayed. This embodiment can use the operation result of the similar arithmetic unit.

There is also a disclosing technology for exchanging position information between the mobile terminals that are not connected through a position information center.

However, Users of the above technology cannot choose partners who can or cannot obtain position information.

For example, there is not the function that only parents can obtain position information of the children. It can be supposed that there is not a parent letting a child use such a terminal of the above technology, because have the danger that a criminal may know the position of the child.

Instead of controlling the GPS receiver of the above mobile phone, this embodiment can control cameras of a TV telephone and microphones and bells of general telephone, too. It is impossible to realize the function of this embodiment that can do the following things by simply combining conventional technologies.

(a). When it is necessary, hearing the sound of a classroom of a child during class time or catching sight of the classroom.

In the case of conventional mobile phone, when the terminal that the child carries is being called, ringing bell will cause confusion of classroom.

(b). watching a baby-sitter that is at the User's home with a TV telephone for preventing child abuse; and so on.

In the case of a conventional TV telephone, when a watched person does not receive the TV telephone, the person cannot be watched.

EXAMPLE 1

Autoanswer Multifunction Telephone (3301)

FIG. 33 illustrates a block diagram of the structure of the machine of this example. Reference numeral 17 shows a microphone and a speaker. FIGS. 34-37 illustrate TDB, R1DB, R2DB, and R4DB of this example.

Presentation information is questions to be asked to callers (initiators). The questions are pre-recorded in sound files.

In this example, an empty question field means that the question to callers is unnecessary.

A specified mark for early finishing the question and answer early is 3. C.f. FIG. 19, 1907.

As a save condition, the sum of the mark is 5. If the condition is satisfied, the machine automatically gives the Treatment of the action-part of the 2nd rule to the caller. C.f. FIG. 15, 1509, 1510.

Figure 38:
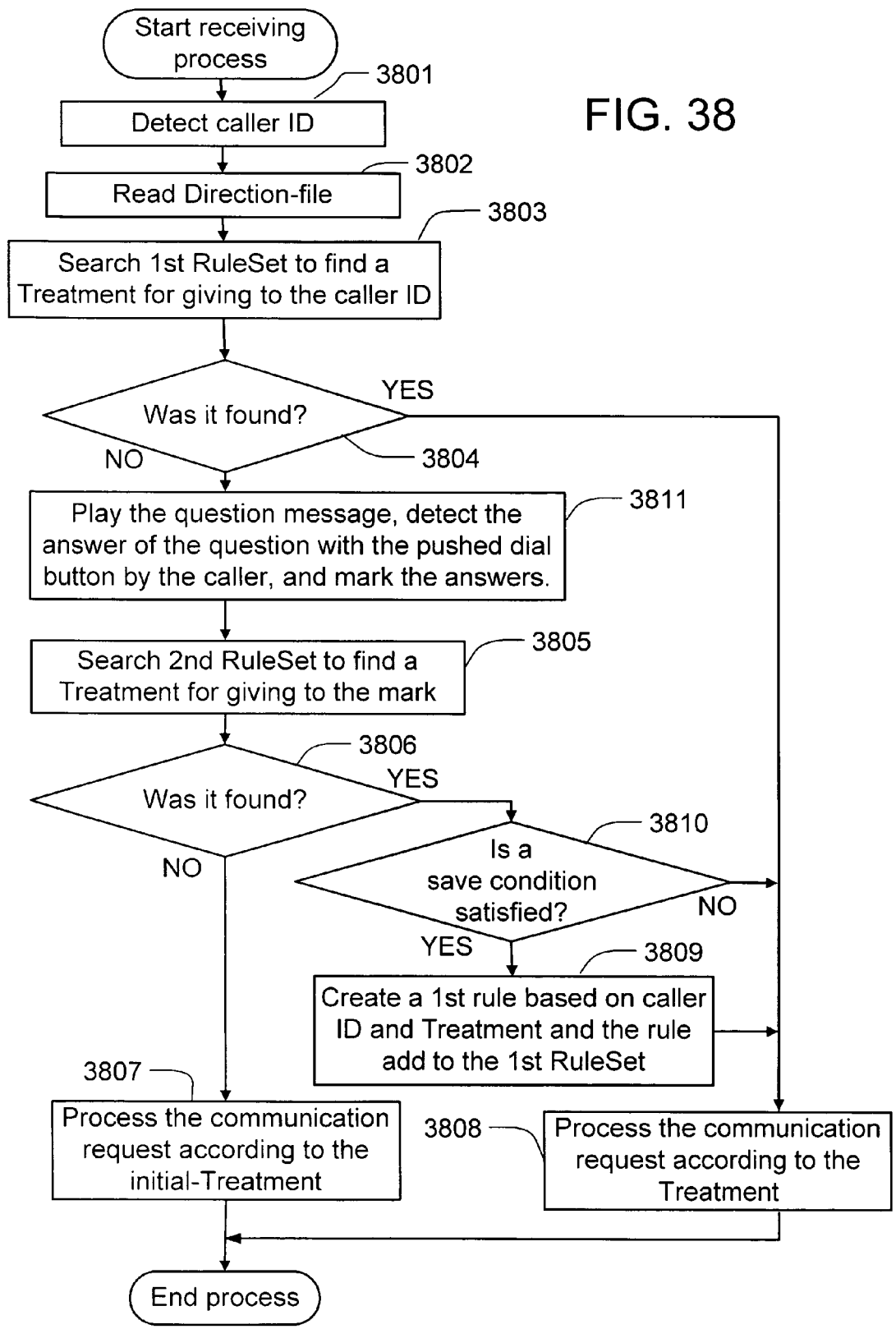
FIG. 38 is a flowchart of the multifunction telephone.

FIG. 38 is the outline flowchart of the processing of this example, and basic portions are the same as FIG. 15. 3801-3810 are equivalent to 1501-1510, and 3811 is the question and marking process that seems to be shown in FIG. 19.

The User terminal in this example can be realized as telephone itself, or as add-on adapter component for telephone, or installed as software into personal computers.

Upon receiving a call from an unknown number, a pre-recorded message is played, and the caller uses the push button on the telephone for answer. Treatments are decided based on the answers.

Various functions can be set from a basic anti-unsolicited communication function. In this example, the setting of the direction-file can realize the following function:

For each caller's phone number there is specified receiving (Treatment ID=4), refusal receiving (Treatment ID=1), and for unknown caller, since communication-verification is required, the phone line is connected immediately without ringing the bell.

This way, unknown callers are charged immediately for a call each time they call, so sanctions on economy can be given a caller of an unsuccessful call from an automatic calling machine.

(The unsuccessful call is an act that cancels the call before the callee picks up the receiver. Before the charge for the call is billed, only the caller's number is left in the memory of the callee's telephone, and a callback of the callee is aimed. It is overused by an act of fraud to ask "the use charges of information" to the person who did the callback.)

Because there is not an answer to be correct from the caller of the unsuccessful call, the total mark will be zero, Treatment ID zero, so they are refused, without leaving any traces on history of incoming call.

However, for callers with permission, upon incoming call, the bell will ring as usual, and the caller will not be billed until the callee picks up the receiver.

When a name of a recipient is made a mistake in by the first question, it is refused the reception promptly.

When 4 is put by choosing: "I have another business", then the second question is sent out, which asks the caller which category of products the caller wants to sell for real estate press 1, for English course press 2, for daily use goods press 3, for sports goods press 4, and for other business press 5.

According to selected category and User's preference, the machine may ring the bell, may not ring the bell but start recording, may hang up, may or may not leave the caller's number in history.

When the secret code "5678" is pressed by caller, the machine automatically connects the line without ringing the bell, so as to realize the hearing-permission, which can be used to hear sound of baby-sitter or child in the house when out.

For example, in the case of a cellular phone for children, the parents can choose for hearing or for speaking over the phone.

The first question in this example is quite simple, but it may be configured in a more sophisticated way.

For example, the machine can be configured to ask first name and last name in two questions (the second question is only asked when the caller knew correct answer of the first question), when five alternatives are each presented, if the reply is nonsense, then the probability that the reply is correct falls to one-25th.

The answers can also be configured in a more sophisticated way. For example, the "secret code" can be named "extension number", and if one sets the guidance information to "please press the extension number", if the person knows the extension number, he can call in regardless of from which telephone he is calling.

When a Treatment was given to caller's number of house telephone member, the message "or please enter your home phone number" can be added to the guidance message so that when someone whose home phone number is given with a Treatment, calls from a public phone, he can receive the same Treatment of calling from his home phone by entering his home phone number.

The actual method used in applying-for-Treatment differs according to communication device the callee uses.

As long as the purpose of the applying-for-Treatment is achieve, various methods such as voice recognition, image recognition can be used.

FIG. 39 illustrates one example of action of the machine which gives the Treatment of ordinary communication to a party through autosetting-permission Treatment. In this example, the electronic secretary accepts the directions from the User in the form of rules and marks, but it is also possible to do so through natural language. For example, "I will receive call from people who know my name", or "I will receive sales call from used car sellers."

By using conventional technologies (for example, U.S. Pat. No. 6,070,149 Tavor, et al. May 30, 2000) of rule base, the secretary can hear these requests, and lets User input insufficient information, so that a necessary rule can be organized.

Reference numeral 21 shows a control unit of an electronic lock, and reference numeral 22 shows the electronic lock of a controlled apparatus.

When the code "8765" is pressed, the mark is 10, the Treatment ID is 6, then a unlocking signal is output, and the unlocking of the entrance door is done.

Besides a telephone line, telecommunication line for the unlocking may use a short distance communications means such as infrared rays.

FIG. 40 shows a simple Treatment-set. Using the simple Treatment-set and omitting the control unit 21, this example can become an example of machine having an answering machine function.

The default-Treatment is "pretending to be out", when unknown caller calls in, the default-Treatment is used, so it is not necessary to pick up the receiver directly.

This way, fraud targeting weak or elderly people can be avoided. Excepting the case of business using for indefinite customers, it is suitable to Users having a communication range limited to some degree.

A call from an outsider without communication-permission or a party that the User does not already want to speak over the phone can be refused.

With the accumulation of the use time, the setting of the Treatment is completed naturally, and the User can achieve its purpose without an excessive burden.

It is preferable to devise operability, such as that the number of a caller can be easily registered (give a Treatment) with one button. Users may want to give Treatment in advance to important people whose call he needs to receive.

A call such as sales that is not against intention of the callee can be accepted temporarily by the "pretending to be out" Treatment.

Existing communication relation with a specified party can be cut off by the "Hang up" Treatment.

This example is simple and cost effective. It can be realized as external adapter that can be connected between line and existing telephone. It can be installed at telephone switchboard or at provider of related services, too.

This example can prevent unsolicited calls without sacrificing most function of a conventional telephone.

EXAMPLE 2

Electron Secretary for Email Terminal

This example was installed as an add-on software programs at the client terminal for receiving or sending electronic mail messages. This example has been released as an application software product for Personal Computers (URL: http://www.netinfotech.co.jp, http://www.emailship.com). In the compact disk, directory /Emailship/Config, 12 files, 245,281 bytes; directory /Emailship/SafeMail, 13 files, 171,924 bytes; and directory /Emailship/State, four files, 21,527 bytes are one part of its source cord.

FIG. 41 illustrates a block diagram of the structure of this example. In this figure, reference numeral 10 shows a server apparatus of ISP. Reference numeral 411 shows a personal computer. This example is a client of an email service server of ISP. Reference numeral 11 is a processor, control of each part, transfer of data, various kinds of operation, and temporary saving of data are done.

Reference numeral 12 shows input and output control means. It controls the data inputting from the server connected via the telecommunication line and outputting to the server.

Reference numeral 15 shows a communication device, and ISP is connected to it.

Reference numeral 16 shows a keyboard and a display, and reference numeral 13 shows a storage device.

First, the programs of this example, which are composed of a configuration program for editing the direction-file and a main program of the electronic secretary itself, are run in processor 11. The direction-file includes Treatment, default-Treatment, questions for verifying a request, and correct answers (key words).

Second, the direction-file is stored in storage device 13 that is a hard disk drive. FIG. 42-45 illustrate TDB, R1DB, R2DB and GDB respectively.

A sender is replied to with presentation information automatically. The basic parts of outline flowchart of receiving processing are the same as FIG. 9.

Figure 46:
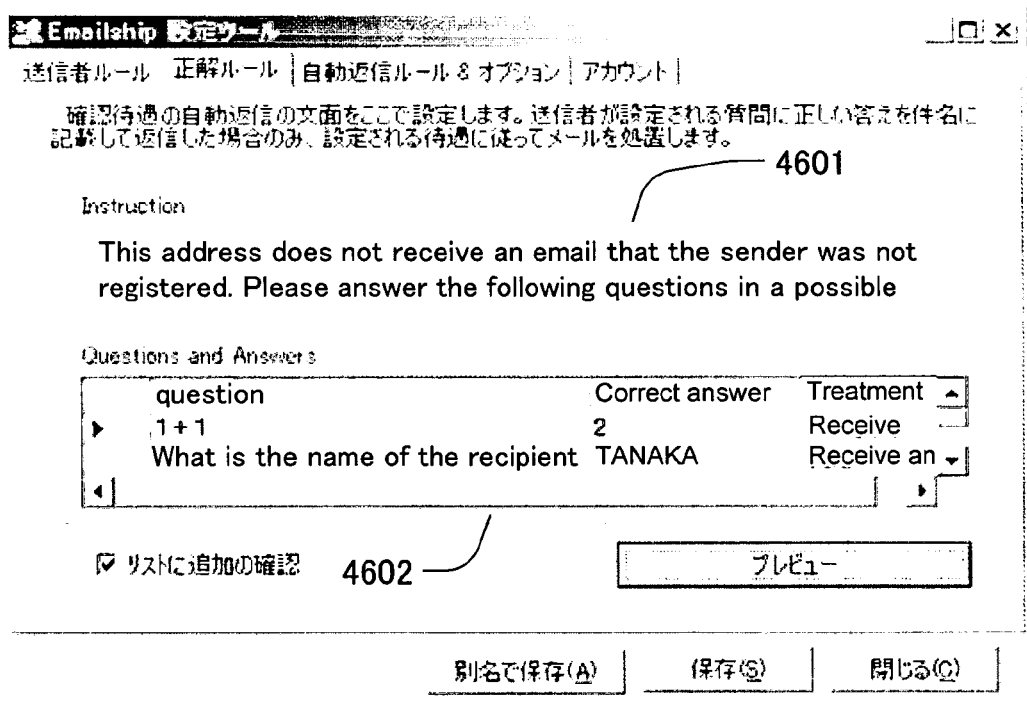
FIG. 46 shows a screen of inputting the 2nd RuleSet and questions.

Processor 11 displays the screen which seems to be shown in FIG. 46 at the display of personal computer 411, in order to let User input the presentation information (4601), the questions for verifying the communication request, correct answers, and Treatments to give to the correct answers, that is the 2nd RuleSet (4602).

When an email from a sender without permission was received by the server, the sender is automatically answered with the questions and the presentation information for guiding application for the permission.

In the guiding application, it is asked for entering the answers of the questions in the subject of a reply email.

A lot of unsolicited emails were transmitted automatically with programs.

For example, "What is one plus one?" may be set to one question. If correct answer is received, it can be confirmed that the sender is human and probably not a program.

The method of processing is different when the sender is an automatic sending program. For a human sender, the recipient can decide by one's intention whether the future reception is hoped.

Of course many programs can compute addition, but it is not fit profit to write a program that can understand all the different questions from each different recipient in natural language.

This example can achieve its object without opening the email.

This feature will save considerably the communication charge induced by receiving the whole email from server, especially in the case of mobile devices.

If acceptable answers set in the direction-file by the recipient, for example the full name of the recipient or keywords of interest of the recipient, are detected from the subject or body of arrived email, then appointed Treatment is given, without the auto-replying process. I.e. a permission application procedure is done tacitly; the sender can be facilitated.

In case of to detect answers from the body of email, preferably the electronic secretary should be used at email servers side as resident type.

Figure 47:
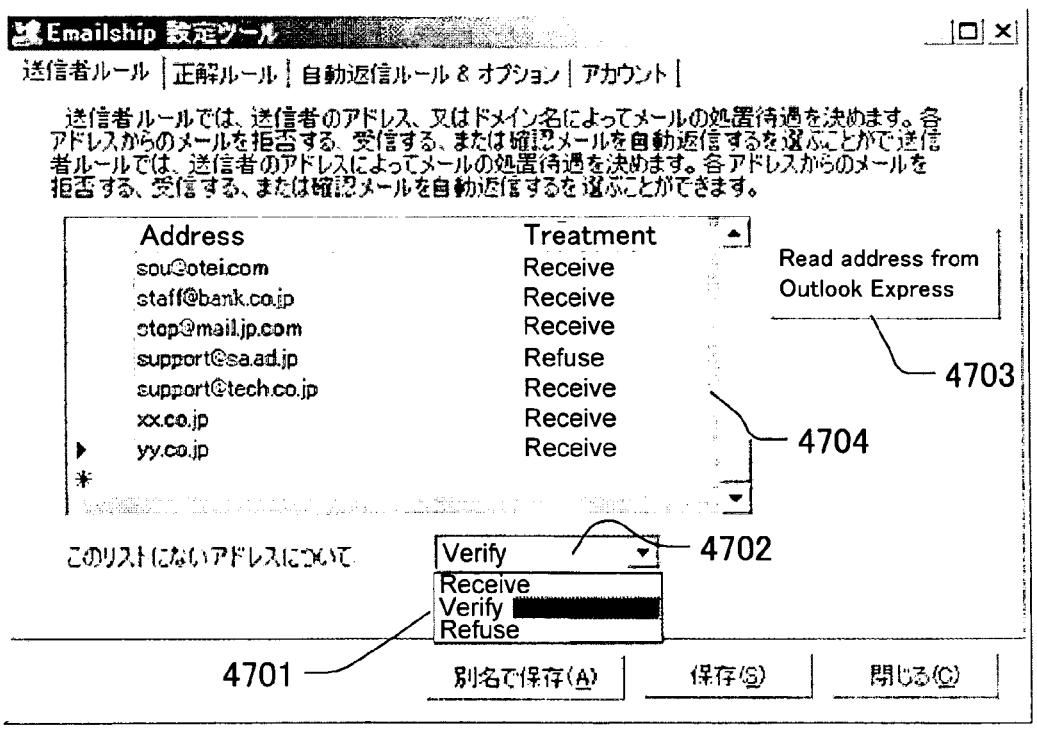
FIG. 47 shows a screen of inputting the 1st RuleSet and an default-Treatment.

Processor 11 displays in display of terminal 411 screen such as FIG. 47, in order to let the User to choose default-Treatment 4702 from a list of Treatment 4701.

FIG. 42 shows the Treatment-set used in this example and the concrete realization of the communication-verification Treatment is: "Reply with questions for verifying and refuse to receive the email".

When necessary, Treatment such as "Reply with questions for verifying and only receive the subject of the email" can be added.

The example of Treatment of partially permitting communication is "Receive the limited size, store the partial email in temporary folder, and notify the recipient".

It is "Receive" Treatment to be necessary for further examination by manual operation.

The "Receive and give the "Receive" Treatment to it" Treatment receive a email and give the "Receive" Treatment to the sender after receiving it, that is this is an example of the autoSetting-permission Treatment.

Default-Treatment is "Reply with questions for verifying and refuse to receive the email". When a email is arrived from an unknown email address, the system replies with questions for verifying and refuses to receive the email.

As the initial setting of this example as the product, the Treatment (Treatment ID=4) of permitting receiving is given to every address on the existing address book of existing email client software by pushing button 4703.

The User may also individually modify or add each address or each domain name (group of addresses) to the list 4704 (That is the 1st RuleSet) and associated Treatment any time. In addition, an address is extracted from the email that the User sent, and it can be given with the Treatment of permitting receiving automatically.

FIG. 42-45 illustrates one configuration of the direction-file. This configuration achieves the following functionalities:

Emails of a predetermined address or domain are received (Treatment ID=4).

Emails of a predetermined address or domain are refused (Treatment ID=1).

Unsolicited emails that are transmitted automatically with programs are refused (Treatment ID=2).

In the case of persons who can answer the question: "1+1=?", but have no relation to the recipient, emails from the persons are received with size limitation and wait for manual Treatment assignment. (Treatment ID=3).

In the case of persons knowing the name of the recipient, the Treatment of permitting receiving is given to the sender after receiving the email which the persons sent. (Treatment ID=5).

This example handles multiple languages of the presentation information according to encoding information included in the email header and suffix of domain names of sender's email address.

EXAMPLE 3

Internet Videophone and Monitor System

This example is a completed system composed of an electronic secretary operating at server, and client side videophone programs that communicate via the electronic secretary. In the compact disk Copy1, the directory /VCALL is one part of the source cord of the electronic secretary, and the directory /iphone is one part of a source cord of the videophone terminal.

Figure 48:
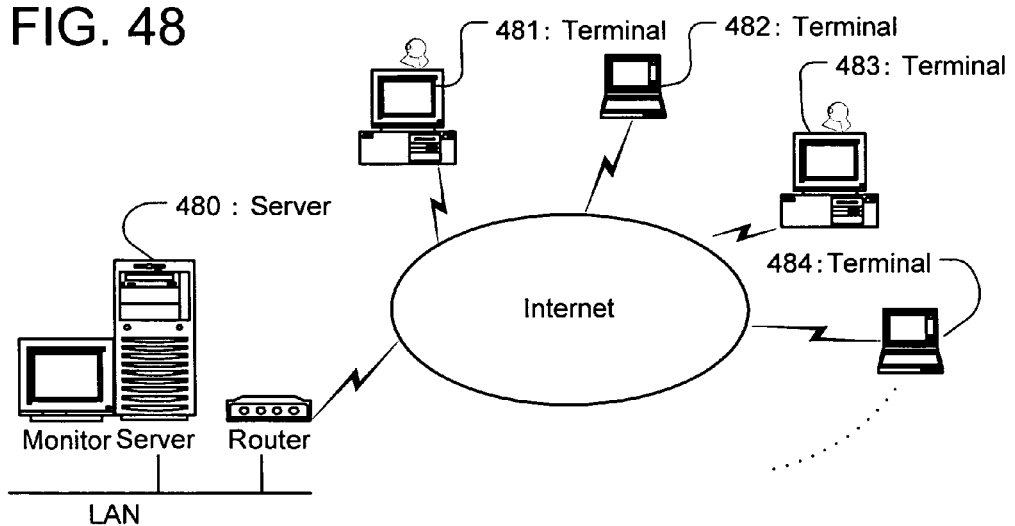
FIG. 48 illustrates Internet videophone and a monitor system of example 3.
Figure 49:
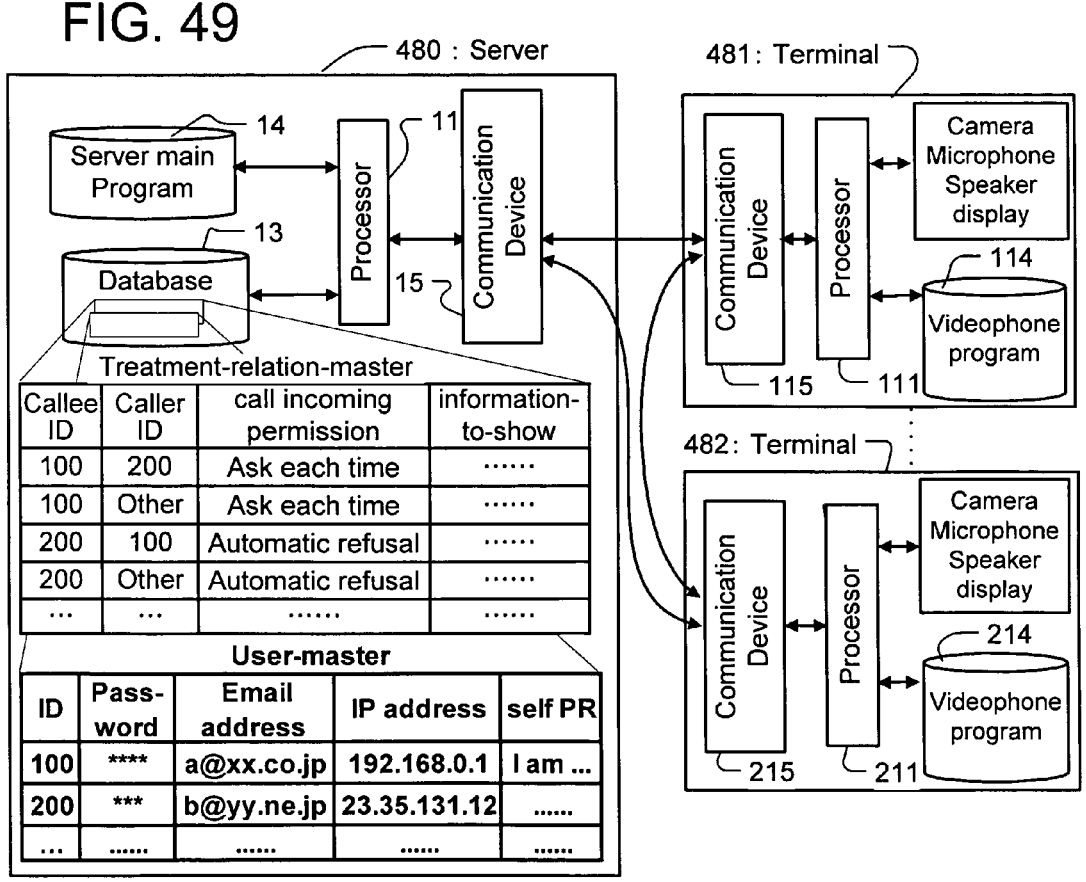
FIG. 49 illustrates its structure.

1. FIG. 48 Illustrates a Block Diagram of the Overall Structure. FIG. 49 Illustrates a Block Diagram of the Structure.

Server 480 is connected to the Internet via router and communication line.

Various terminals 481-484 etc. are also connected to the Internet. These terminals are equipped with output units such as displays and speakers as well as input units such as keyboards, mouse, cameras and microphones. These terminals are also equipped with means of executing videophone programs.

1-1. The Detailed Structure of Server 480.

FIG. 49 shows a block diagram of the structure of server 480 and terminals, where Reference numeral 11 is a processor including CPU, control of each part, transfer of data, various kinds of operation, and temporary saving of data are done.

Reference numeral 12 shows input and output control means. It controls the data inputting from the server connected via the Internet and outputting to the server.

Reference numeral 15 is a communication transfer means connected to the Internet.

Reference numeral 13 and 14 are storage devices storing the following files.

First, in storage device 14, a main program is memorized, which is run in processor 11.

The main program including: a program for displaying an applying-for-Treatment screen at a terminal's display; a program for Treatment examination, which display detailed information of the party who did applying-for-Treatment; and a program for starting a videophone-program.

The program displays an icon to send a communication request to a partner, pseudonyms of parties who did applying-for-Treatment to a members list of the User, and status of parties.

Next, in storage device 13, User-master-database-table and Treatment-relation-master-database-table are stored.

User-master-database-table stores multiple User information records, each of which comprises User ID, password, email address, IP address, self PR and other User predetermined information (another one example about User data refers to PDDB).

The User ID is automatically assigned by processor 11 upon the finish of service sign up procedure. The password, email address, and self PR fields store information sent by Users from terminal 481, 482 . . . are stored.

The IP address field stores address information sent by the videophone client side programs at terminal 481, 482 . . . , upon launch.

Treatment-relation master table stores multiple Treatment information records, each of which comprises Treatment information and a flag of applying-for-Treatment.

FIG. 50 illustrates the layout of record of the Treatment-relation master database (hereafter referred to as TRDB) that stores one embodiment of the Treatment-relation.

An electronic secretary operating in client-side records Treatments those give to partners by R1DB.

When an electronic secretary is operated in the server-side, preferably effective the Treatment-relation master table TRDB is used.

Treatment information comprises a callee ID, a caller ID, and a Treatment given by the callee. The Treatment information and applying-for-Treatment flags are based on an input from terminal 481, 482 . . .

The input is done via User interface of the program for displaying the applying-for-Treatment screen.

2. Operation.

Each terminal 481, 482 . . . may connect to server 480 simultaneously and functions as User terminal.

I assume that terminal 481 is connected to server 480.

When this happens, main program run by processor 11 detects this connection through input output control means 12, and displays screen at terminal 481 and receives input from the terminal.

Figure 51:
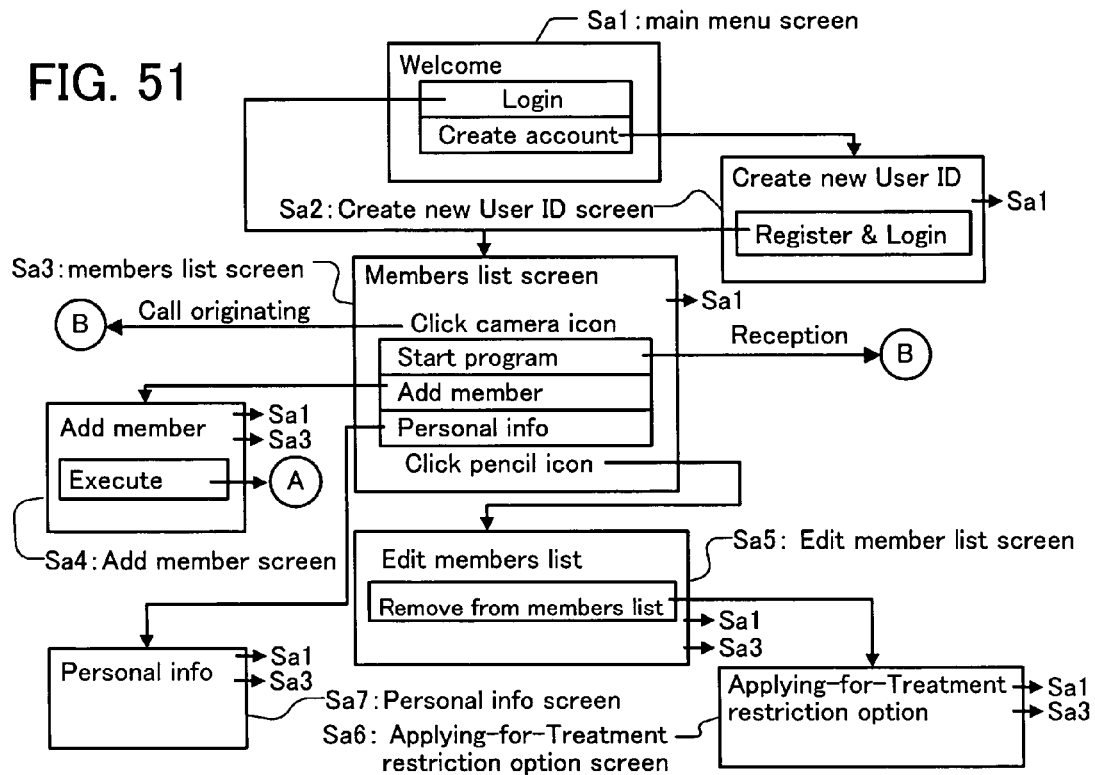
FIG. 51 is a flowchart of process of its main program.

FIG. 51 shows a flowchart describing the operation of this main program.

2-1. In Order to Describe the Procedure of Creation of User Information Record, I Assume the Person at the Terminal is a New User.

Figure 52:
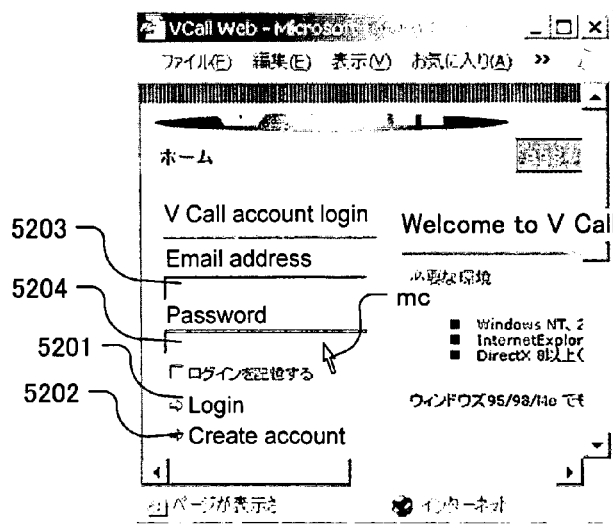
FIG. 52 shows its main menu screen.

At step Sa1 in FIG. 51, processor 11 displays a main menu screen such as shown in FIG. 52 at terminal 481, and let the User to choose "login" or "create account".

In the main menu screen, mouse cursor mc is displayed, various kinds of operation gets possible to be done by clicking a predetermined place. For example, the displayed processing concerned is done if link button 5201 or 5202 is clicked.

The User at the terminal first place mouse cursor MC at link button 5202 on the screen, and click a mouse button to choose "create account". The processor 11 detected this, and then proceeds to step Sa2 which showed in FIG. 51, where the User may input name, email address and password.

When it is determined that inputted email address is not already used by other Users in the User-master-database-table, according to inputted information, a User ID is assigned by processor 11, and is used as public ID for that User.

Figure 53:
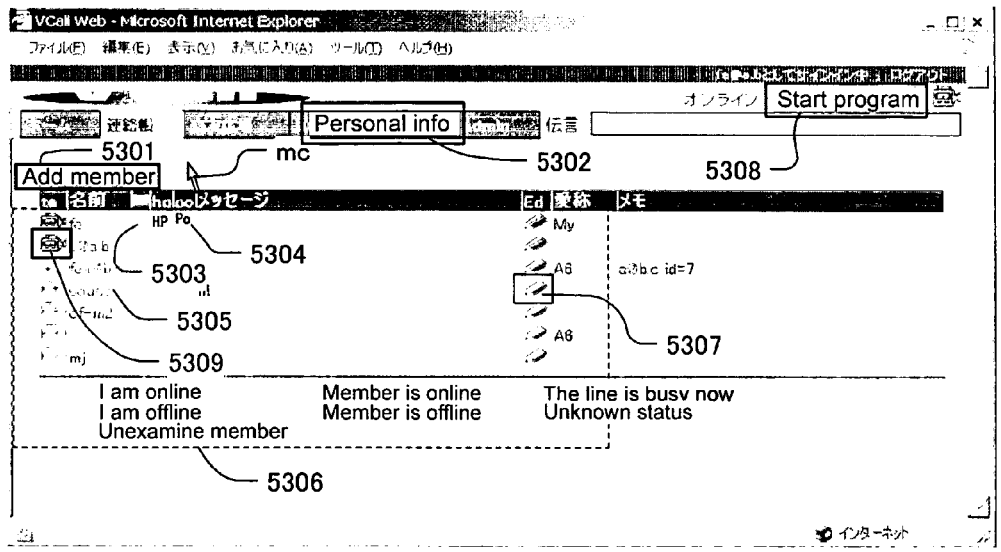
FIG. 53 shows its members list screen.

In the next step Sa3, processor 11 displays members list screen as shown in FIG. 53 at terminal 481.

In step Sa4-Sa7, the User may return to members list screen and main menu screen by certain operation.

In the members list screen, although for User with newly created account, no item is displayed, in the figures. I assume there already is several item on the list.

First an add operation of new member is explained.

In order to communicate with a member in this example, the User does at first applying-for-Treatment to the member.

The add operation is the actual procedure of applying-for-Treatment in this example.

The screen for adding a new member enables the User to specify Treatment to give to the new member as well as to do applying-for-Treatment to the new member.

For a terminal operation User, addition of a member is promoted.

When the User at the terminal clicks link button 5301, processor 11 proceeds to the next step Sa4, where processor 11 displays screen (shown in FIG. 54) for adding a new member at terminal 481, and enables the User to input public ID information.

This shows an example of applying-for-Treatment beforehand.

The public ID information was disclosed on bulletin boards or chat on the Internet by a User self, or was taught directly from the User, or is obtained with anonymous communication embodiment to show in FIG. 25.

In the screen for adding new member, ID input box 5401 and self introduction input box 5402 are shown;

about information-to-show Treatment to give to the new member, checkboxes 5403-5407 corresponding to "Show email address", "Show private email address", "Show web site address", "Show profile address", and "Show status information" are shown; and about call incoming permission Treatments to give to the new member, selection box 5408 is shown. So that it let the User to input or to make choice.

The User input the public ID "200" of the new member into the "ID" box, and input "I am . . . " into the "Self introduction" box. Then the User click the execute link button 5410.

In this example, for responding to videophone call incoming request, there are three Treatments (namely "Automatic refusal", "Ask each time", and "Automatic reception") in the Treatment-set.

"Automatic reception" is equivalent to one of the control-permission Treatments.

The electronic secretary orders the callee's terminal (the videophone) to obey control of the caller, and the caller can communicate with the callee's terminal without intervention of the callee.

Of course it is always necessary for the callee's terminal to be connection waiting state.

An extent of information (5409) to show to other members consists of "Show email address", "Show private email address", "Show web site address", "Show profile address" and "Show status information".

The information to show to a member can be chosen among the extent arbitrarily.

About applying-for-Treatment, there are two kinds: "Refuse applying-for-Treatment" and "Permit applying-for-Treatment".

The default-Treatment is "Ask each time", to show no information and "Permit applying-for-Treatment".

The function to change default-Treatment is not included in this example.

Figure 55:
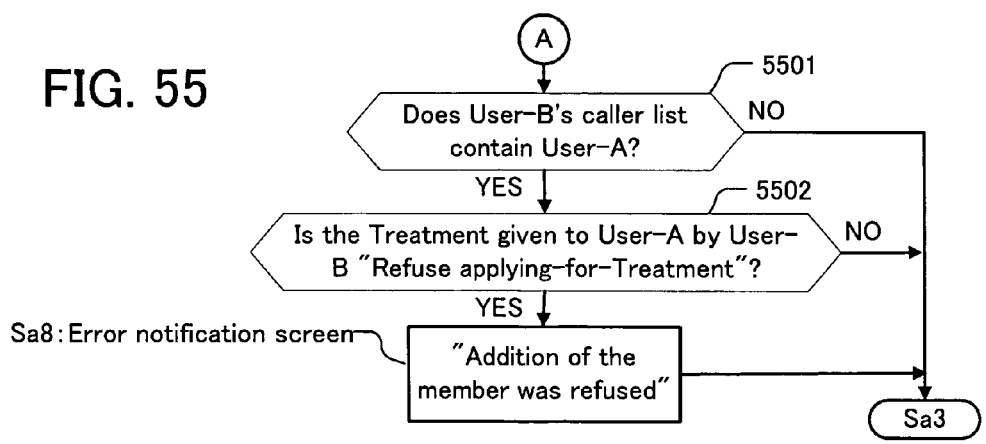
FIG. 55 is a flowchart of applying for Treatment.

The procedure does the next execution processing of applying-for-Treatment (cf. FIG. 55).

It is assumed that the terminal operation person is User-A, and it is assumed that the User-A wish to communicate with User-B. Public ID of User B is "200".

Processor 11 should process applying-for-Treatment based on the Treatment that User-B gave to User-A.

At first it is checked (5501) whether there was already User-A in the caller list of User-B by searching the User-master-database-table that already was made.

When there was it, the Treatment that User-B gave to User-A on applying-for-Treatment is checked (5502).

When the given Treatment is "Refusal applying-for-Treatment", processor 11 displays "Addition of the member was refused" at the screen of terminal 481, then returns to step Sa3, and displays the members list screen again.

When there is not User-A in the caller list of User-B, and when the given Treatment is not "Refuse applying-for-Treatment", prescribed default-Treatment is given to User-A, and a new Treatment information record comprises ID of User-B and User-A, the default-Treatment, and a flag of applying-for-Treatment is created and inserted into Treatment-relation-master-database-table.

Then the procedure returns to the members list screen.

In step Sa3, processor 11 displays a members list screen as shown in FIG. 53 at terminal 481. Verifying of personal setting is promoted to a User. When the link button 5302 is clicked, processor 11 processes next step Sa7.

Figure 56:
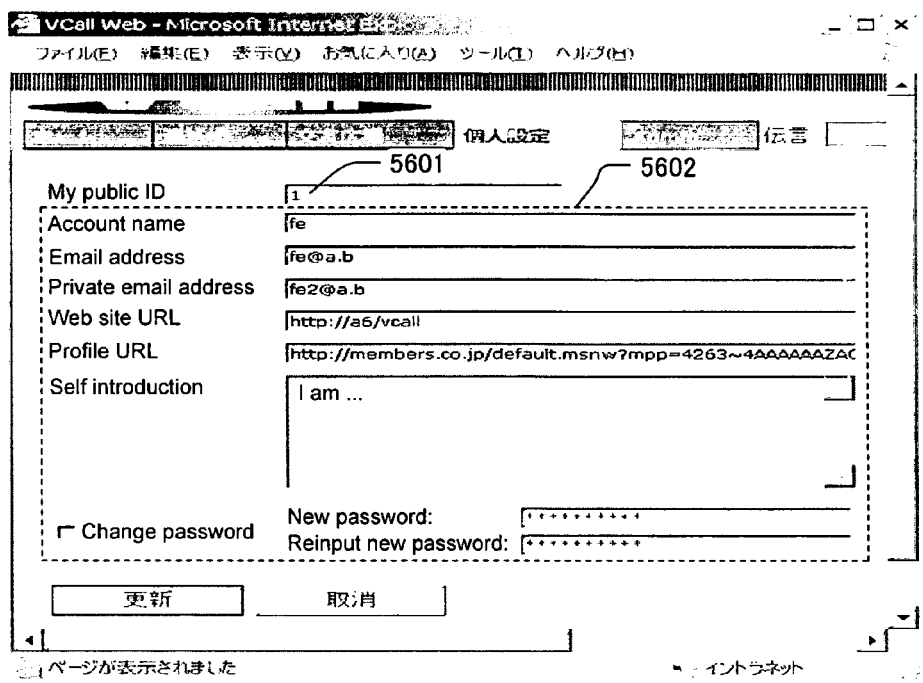
FIG. 56 shows member settings screen.

In step Sa7, processor 11 displays the personal settings screen as shown in FIG. 56 at terminal 481, displays the public ID (5601), disables the change of public ID, and enables the User to modify personal information (5602).

2-2. Login.

It is assumed that the terminal operation person is User-A, who has completed the applying-for-Treatment to party B. It is also assumed that User-B is the operation person at terminal 482.

It is assumed that FIGS. 52 and 53 is displayed at terminal 482 (though FIG. 52, 53 was displayed at terminal 481 in explanation of above 2-1, in convenience these are used here) and that terminal 482 has connected to server 480.

When terminal 482 connects to server 480, this connection is detected by input and output control means 12; processor 11 controls terminal 482 according to the main program.

Figure 57:
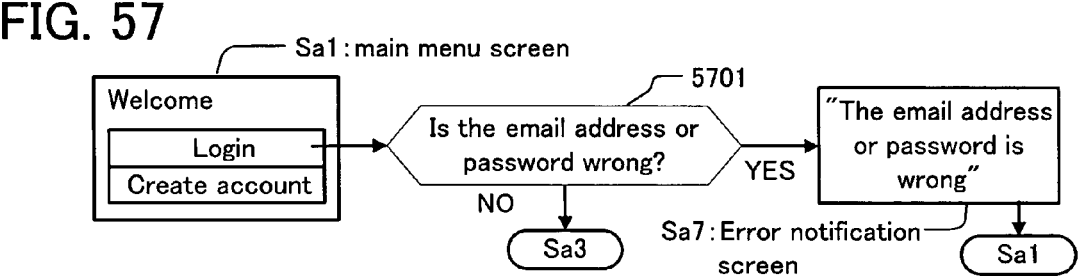
FIG. 57 is a flowchart of login process.

FIG. 57 shows a flowchart describing the operation of login of this main program.

In step Sa1 in FIG. 51, processor 11 displays a main menu screen as shown in FIG. 52 at terminal 482, so as to enable the User at the terminal to choose "login" or "create account".

In here, the User inputs an email address into "email address" input box 5203, inputs a password into "password" input box 5204, and clicks link button 5201 for choosing "login". Then processor 11 that detected this searches User-master-database-table which was already created based on input email addresses and passwords in order to check (FIG. 57, 5701).

When processor 11 found no match, it proceeds to step Sa7 and displays "the email address or password are not right" at terminal 482, and then return to step Sa1 and displays the main menu screen.

Otherwise if a match is found, it proceeds to step Sa3.

In step Sa3, processor 11 displays members list screen as shown in FIG. 53 at terminal 482.

When processor 11 extracts a new applicant of Treatment from Treatment-relation-master-database-table, notifies User-B, the pseudonym "souss" of User-A who did applying-for-Treatment is displayed (5305) in the members list of User-B in green color.

According to the information-to-show Treatments that other members gave to User-B, processor 11 shows (5306) status of the Users with colors and icons.

If a member shows its email address, email-making-icon 5303 will be displayed at where.

If a member shows its profile address, link-icon 5304 will be displayed at where.

Pencil icons are link buttons displaying detailed information of the members.

Figure 58:
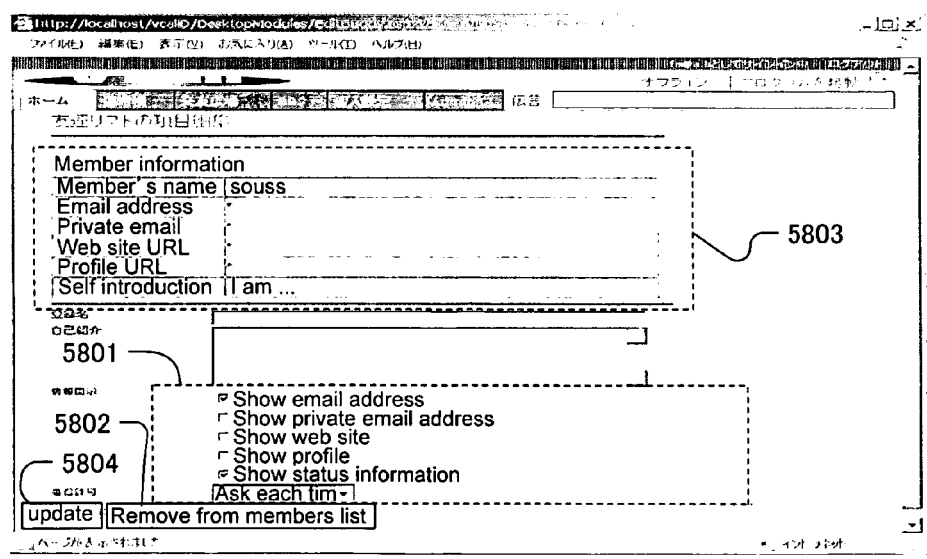
FIG. 58 shows a members list edit screen.

When link button 5307 is clicked, processor 11 proceeds to step Sa5, where it displays a members list edit screen as shown in FIG. 58 at terminal 482, so as to display detailed information 5803 about the specified member and to enable the User to modify Treatments 5801 to give to the specified member.

This screen enables User-B to examine the applying-for-Treatment of User-A and decide what Treatment to give to User-A.

This screen also enables modification of Treatments given existing members.

After User-B selects various options of Treatments, it clicks link button 5804.

Then, based on chosen Treatments contents, processor 11 updates Treatment information record stored in Treatment-relation-master-database-table.

Figure 59:
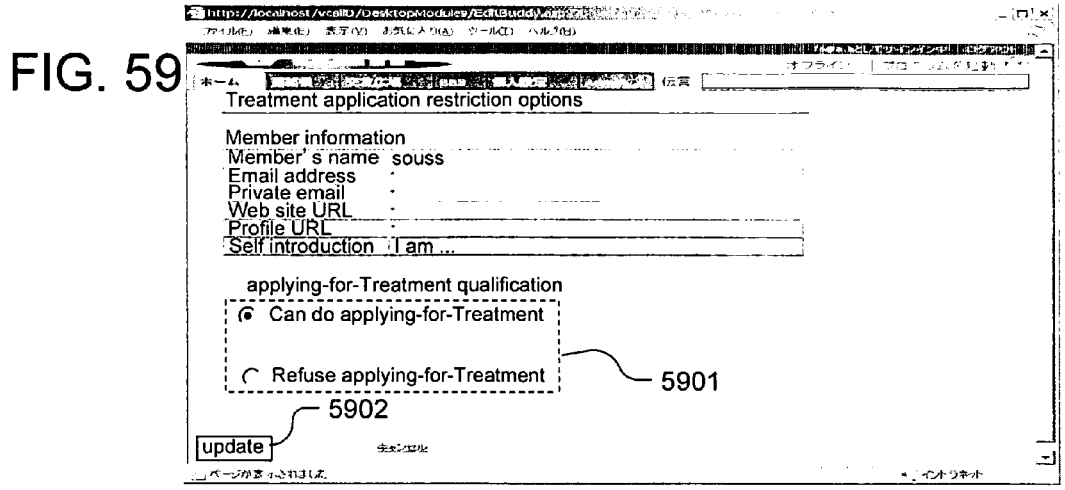
FIG. 59 shows an applying-for-Treatment restriction options screen.

To discontinue relations with the specified member, it clicks delete link button 5802. Then processor 11 proceeds to step Sa6, where it displays a Treatment application restriction options screen as shown in FIG. 59 at terminal 482.

If "Refuse applying-for-Treatment" is chosen in applying-for-Treatment qualification 5901, the communication from the member will be refused in future.

When User-B clicks submit link button 5902, processor 11 updates Treatment information record in Treatment-relation-master-database-table according to selected options.

This example exemplifies realization of anonymous communications.

Unless the User discloses its identity itself, this example easily realizes anonymous communications with normal numbers (ID) without any functional restrictions.

There is no need for specialized communication channel or central controller, in order to remove any information that would reveal the identity of the Users.

2-3. Videophone Communications

It is assumed that User-A and User-B established Treatment-relation by the procedure described in 2-1 and 2-2, and server 480 and terminal 481, 482 are connected.

Figure 60:
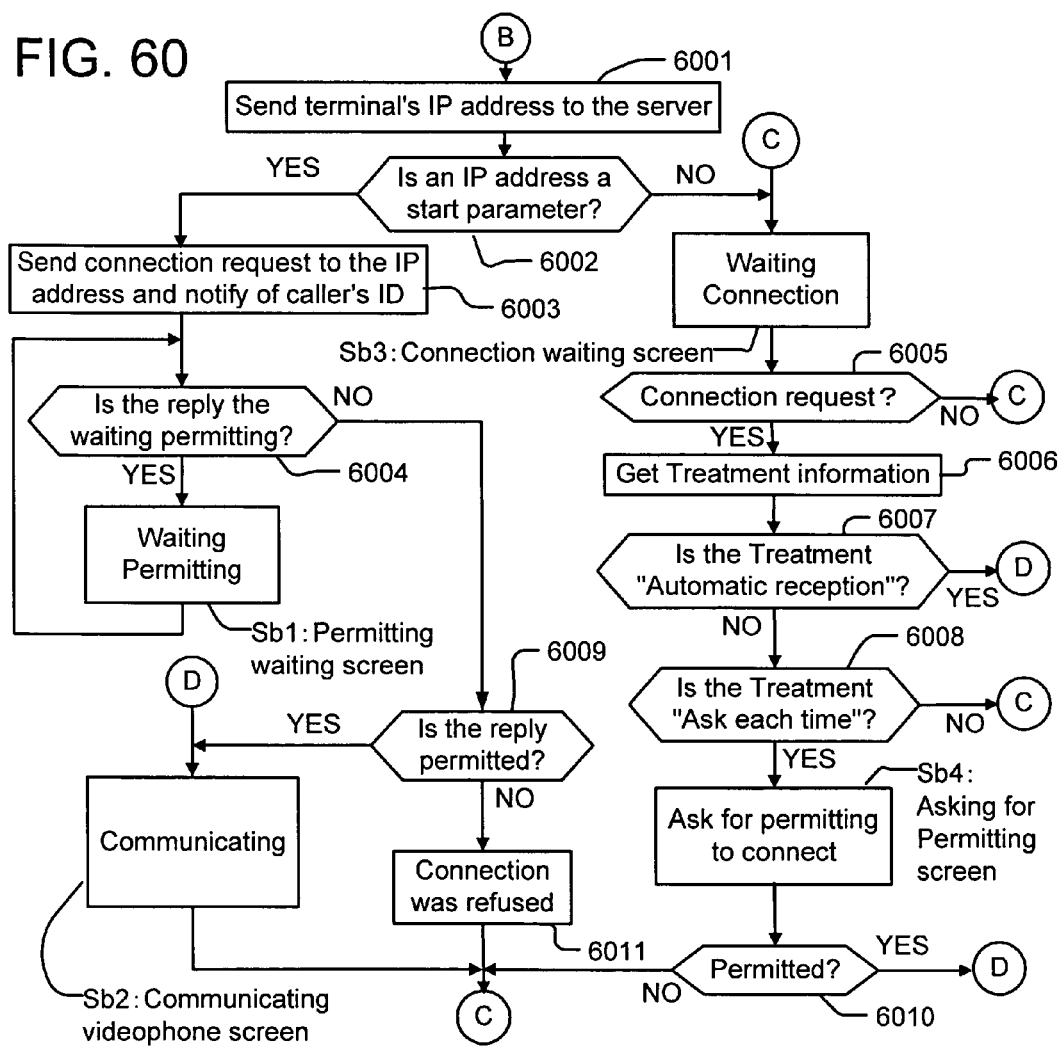
FIG. 60 is a flowchart of the operation of the videophone program.

FIG. 60 illustrates a flowchart describing the operation of a videophone program.

In step Sa3, processor 11 displays screen as shown in FIG. 53, and User-B clicks link button 5308 "start program".

Then, processor 11 let the terminal of User-B start the videophone program, with a start parameter "-".

When the videophone program is started, the program sends (6001) the terminal's IP address to server, and then tests (6002) to determine whether an IP address is given as a start-parameter.

Figure 61:
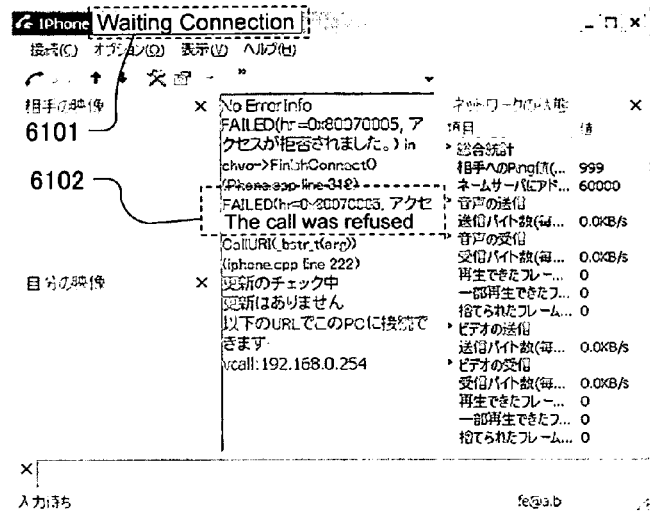
FIG. 61 shows a connection waiting screen.

If no IP address is found, it starts waiting connection and displays the screen of waiting connection as shown in FIG. 61 in step Sb3.

A connection request is checked (6005) in connection waiting state.

Processor 11 updates information record of User-B in User-master-database-table according to the IP address sent by the videophone program from terminal of User-B.

Then, Processor 11 displays at the member screen of User-A a camera icon (FIG. 53, 5309) indicating the status of User-B.

When User-A clicks the camera icon 5309 of User-B, processor 11 extracts the IP address of User-B, lets terminal 481 of User-A start the videophone program, gives (6003) the IP address and caller ID as start-parameters, lets the program connects to the IP address.

The program originates a call to User-B, and receives (6004) a response from the videophone program of User-B.

When User-B's videophone program receives a connection request, it uses the received caller ID as parameter to query processor 11 at server. Processor 11 extracts (6006) the Treatment information from Treatment-relation-master-database-table of server 480 based on the received caller ID, and returns the Treatment given to User-A to the videophone program.

Figure 62:
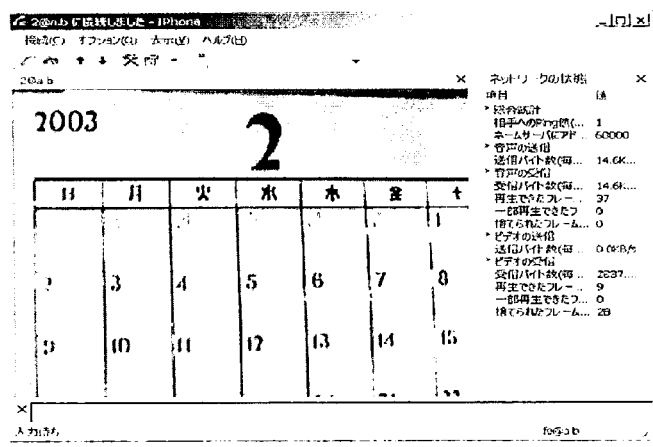
FIG. 62 is a screen in videophone communicating.

If the Treatment is "Automatic reception" (6007, YES), the electronic secretary indicate to the callee side's videophone program that the caller has control authority; as the result of this indication, the program permits the communication request, sends out the response of connection permission, and starts sending image signals from the camera to the caller's program automatically, i.e. sends image signals, and if the caller's image signals is received, displays the image in the screen of videophone as shown in FIG. 62 in step Sb2 simultaneously;

in this case, the connection is without ringing as well as without displaying the screen that ask for connection permission.

On the other side, the videophone program of caller User-A receives permission response, and through step 6004 and 6009, displays received image-signals, and let the User to talk or watch in step Sb2.

If the Treatment given to the caller User-A is "Ask each time", (FIG. 60, 6008, YES), then the videophone program of callee User-B notifies callee by ringing sound, and displays a screen including a message "Incoming call from User-A, receive?" in step Sb4, in order to ask User-B whether to connect.

At the same time, the videophone program at the caller side displays a At the same time, the videophone program at the caller side displays a permitting waiting screen with a message "waiting the callee to receive the call" at step Sb1.

When callee User-B permit (FIG. 60, 6010, YES) the call, the program at callee User-B's side notifies the program at caller User-A's side the permission, then the caller side's program judges (6009, YES) this response, and start a videophone session between two side.

If callee User-B refuses to receive the call, (FIG. 60, 6010, NO), the videophone program returns to connection waiting state, and notifies the program at caller User-A's side of the refusal.

Then the program executing at the terminal of caller User-A judges (6009, NO) the response, and displays a screen at the terminal of User-A with a message "The call was refused" (FIG. 61, 6102, FIG. 60, 6011), and then returns to connection waiting state in step Sb3 of the screen as shown in FIG. 61.

If the Treatment given to caller User-A is "Automatic refusal", (FIG. 60, 6008, NO), the program automatically perform the same procedure as if the callee chose to refuse to receive the call.

3. Brief Explanation of the Flow

Figure 63:
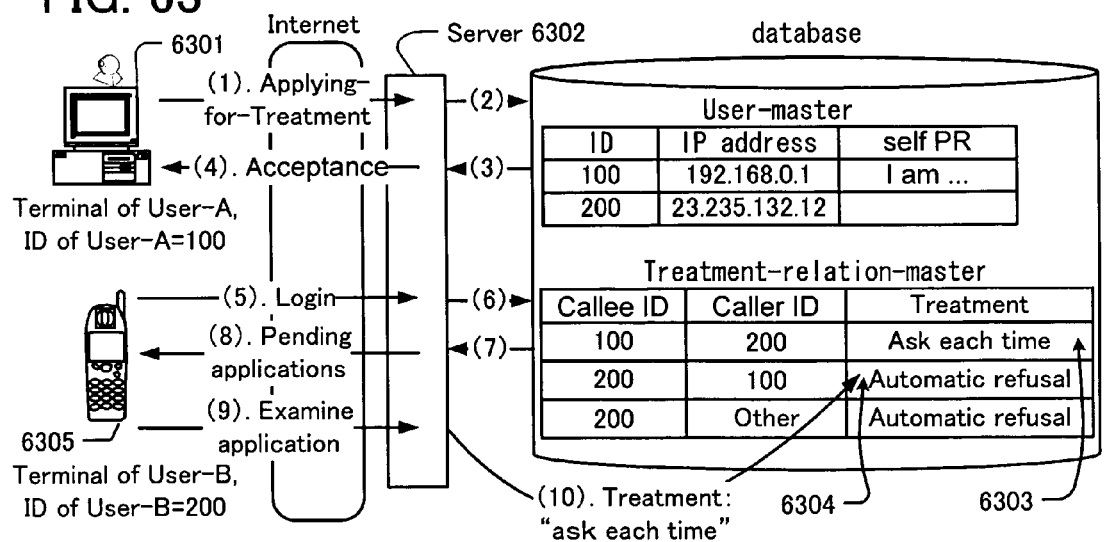
FIG. 63 illustrates a summary flow of establishing Treatment-relation.

FIG. 63 illustrates the flow of establishing Treatment-relation with a callee through public ID.

In order to receive communication service of this example, User-A using terminal 6301 logs in to server 6302 via the Internet, and makes (1) Applying-for-Treatment using a public ID 200 disclosed by User-B, in order to assert the intention to communicate with User-B.

Figure 54:
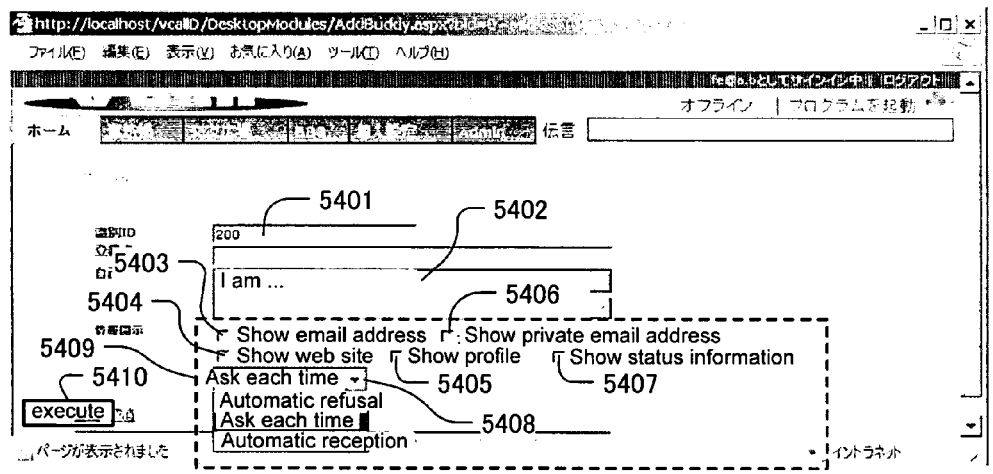
FIG. 54 shows an new member adding screen.

The applicant User-A enters the public ID: 200 of party User-B at box 5401 of FIG. 54, and at the same time, User-A gives the Treatment "Ask each time" (selection box 5408) to User-B.

The server stores (6303) the Treatment "Ask each time" given by User-A to User-B in Treatment-relation-master-database-table, and if User-A does not exist as an entry in User-B's caller list, the server gives (6304) the default-Treatment (Automatic refusal) configured by User-B to User-A.

In this state, User-B can initiate a call, and communicate to User-A. But User-A cannot communicate to User-B in the reverse direction. As a result, the callee holds leadership.

The server returns (3, 4) confirmation that it has received applying-for-Treatment of User-A. When User-B logs in to the server from terminal 6305, the server extracts pending applications of Treatment, and notifies (5 to 8) User-B, in the User-B's members list screen as in FIG. 53, pending Treatment applicant User-A's pseudonym "souss" is displayed (5305) in green, and other User's status are disclosed (5306) in the screen by colors and icons, according to the information-to-show Treatment given by each Users to User-B.

The screen as in FIG. 58 displays a detailed information of User-A who has made the applying-for-Treatment to User-B.

User-B examines the applying-for-Treatment, and decides (FIG. 58, 5801) the Treatment to be given to User-A.

The Treatment ("Automatic refusal") memorized in the server is replaced (10) with the Treatment ("Ask each time") given to User-A.

As the result, both User-A and User-B can initiate video telephone request to each other.

This example can give anyone or plural callers the control-permission Treatment.

The caller can control the camera of callee's videophone directly, can start the image transfer program of the callee side, and can transfer data between both.

Instead of control of cameras of this example, it can be executed for control of GPS receivers of mobile phones by the same method.

EXAMPLE 4

Email Server Electron Secretary

Figure 64:
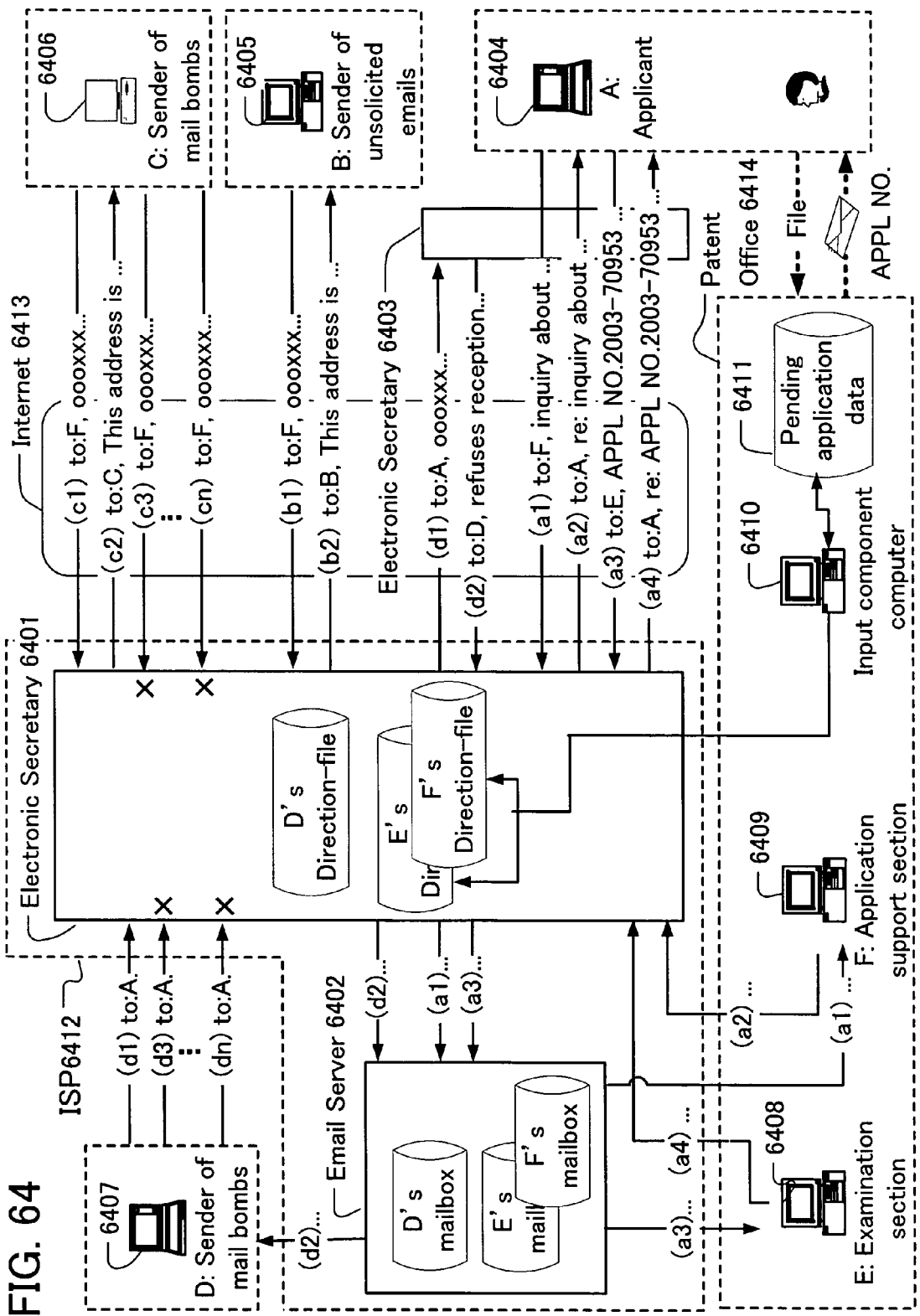
FIG. 64 is a block diagram of the structure of the electronic secretary of an email server of example 4.

FIG. 64 illustrates a block diagram of this example, which demonstrates operation of the electronic secretary 6401 at the email server side at ISP 6412.

The electronic secretary which is independent of existing email server transmits received email messages with permission to existing email server 6402.

FIG. 65A-D, 66A-D show a example of a setting of direction-files.

Email messages sent from clients of ISP 6412 are directly handled by the electronic secretary.

For business contact addresses of organizations providing services to general public, upon arrival of a message without communication permission given beforehand, the electronic secretary 6401 replies to with a guidance email message including information and keywords about the organization or provided services, and then refuses to receive the message, unless by applying the 2nd rules after receiving header of the message, predetermined keyword is found from the arrived message.

For example, It is assumed the contact email address for applicant registration at Japan Patent Office (JPO) is "PA1670@jpo.go.jp" (abbreviated as reference mark "F" in FIG. 64). The guidance information (FIG. 65B) for this address is set to "This address is the inquiry address of application registration at Japan Patent Office. If you need to send message to this address, please put the phrase "inquiry about application registration" in the subject of the email and send it again", a rule of giving a temporary-receiving-permission (an email is received, but a Treatment is not given to the sender. cf. FIG. 65A, 65C, ID=5) to the keyword: "inquiry about application registration" is inputted into the 2nd RuleSet.

It is assumed that the email address of the applicant of terminal 6404 is fe1@netinfotech.co.jp (FIG. 64, reference mark "A"), the applicant obtains the inquiry email address from the website of the patent office.

Preferably the guidance information is posted in the website.

Then the applicant will send an email to "PA1670@jpo.go.jp" (F) with the subject "inquiry about application registration. About registration method . . . " (FIG. 64, (a1)).

The electronic secretary permits the email according to the 2nd rule and transfers it to email server 6402, and reach the mailbox of F. The reply email (a2) from application support section is sent via the electronic secretary.

If the applicant sends email without knowing the key phrase, the electronic secretary immediately replies an email message including the guidance.

Even after business hours, the applicant can receive the above guidance information in a short time.

The course occurring by automatic reply of guidance information is from the applicant—sending server 6403—receiving server 6401—sending server 6403—the applicant.

I tested the transfer time in the real environmental: an ADSL line, servers URL: mail.netinfotech.co.jp and mail.yahoo.co.jp, from a sender—a sending server—a receiving server—a recipient, the transfer time was less than five seconds.

Therefore, the applicant can send a message according to the guidance without a delay of time almost.

Let's suppose terminal 6405 sends advertising emails (FIG. 64, (b1) To:F, oooxxx . . . ) using a program to the address F for sales.

The electronic secretary replies with guidance message (b2) and then refuses to receive the advertising email.

In most cases the advertising emails sending programs cannot understand the guidance and follow the instructions.

When someone intentionally attacks the recipient by sending emails that according to the guidance, the recipient can give the communication-inhibition Treatment by manual operation to the sender.

Let's suppose an attacker 6406 uses an automatic sending program, and to transmit a large quantity of emails (email bomb) (FIG. 64, (c1) To:F, oooxxx . . . ) to F frequently.

Upon arrival of the first message, the electronic secretary replies with the guidance (c2) and refuses to receive the message.

In the case that the electronic secretary using the method to show in FIG. 16 replies automatically, a 3rd rule is created based on the sender's email address, received time and predetermined communication-inhibition Treatment (ID=0), and it is added to the 3rd RuleSet (FIG. 66A) for preventing attack.

FIG. 66B shows the predetermined fixed numbers.

The predetermined time in condition-part of the 3rd RuleSet for preventing attack is 60 minutes, the predetermined Treatment is "Refuse to receive and do not reply", then when the second email (c3) is sent from the attacker within 60 minutes, the communication-inhibition Treatment that have not a reply (FIG. 65D) is given (FIG. 16, 1607), and attack after this is refused immediately by looking at the envelope of emails.

Preferable variation of this invention is to add the count of email arrival to the condition-part of the 3rd RuleSet for attack prevention.

For example, only after receiving five emails from a attacker within 60 minutes, processing the communication request based on a Treatment.

This example does not allow a large quantity of useless communication to occur in the public network, there is no worry that the communication band is pressed, there is not the worry that a server area runs out by email bomb attack.

By the mechanism of the 3rd RuleSet for preventing attack, there is no possibility that the emails of an automatic reply itself have become a lot of new spam mails.

These points are different from a conventional art replying automatically simply.

When the mechanism of this example is used in the client side such as a mobile phone, the charged packets by unsolicited emails can be decreased greatly. In other words an unreasonable charge can decrease greatly.

As above, the present invention guarantees normal business operation and completely shuts out irrelevant emails, aggressive emails, and advertising emails which send with programs.

A preferable variation of the present invention memorizes a list of IP addresses of abnormal senders for refusing TCP connection with the IP address on that list.

If the sender is an email sending server using conventional art (an SMTP client), the electronic secretary receives the header of the email to determine the identity of the sender without receiving the body of the email, forcibly breaks the communication by shutting down underlying transport-level connection (FIG. 14).

Conventional email sending-servers that communication is forcibly broken will re-try. The status of the forcibly broken are stored with an exclusive 3rd RuleSet.

Upon the re-trying of the sending-server, the electronic secretary determines the sender's identity using stored sender's ID, so as to formally refuse receiving the email. FIG. 66C illustrates the exclusive 3rd RuleSet (R3DB2).

Please note that R3DB1 and R3DB2 are separate instance of the 3rd RuleSet, they record different information. R3DB1 shown in FIG. 66A is used for preventing attack.

If the email sending-server exchanges the above conventional art, and employs the sending client that is shown in FIG. 13, it sends (FIG. 13, 1304) informational fields in header before sending body.

The electronic secretary at receiving-side receives these informational fields and applies the 2nd RuleSet (FIG. 11, 1106-1107 and 1109) to determine if it allows the sender to send the body.

I.e., when the communication is permitted, it is conveyed to the sending side, and the communication can be continued (FIG. 13, 1306).

Then there is not necessity to forcibly break the communications, and this will thus further reduce wasteful communications.

If emails are sent from the electronic secretary, the unsolicited communications can be prevented from sources (cf. FIG. 23).

Let's suppose that the sender (6407) D of email bombs sends an email (FIG. 64, (d1) To:A, oooxxx . . . ) to the applicant A, and the applicant uses the electronic secretary 6403 that runs in the server side.

Electronic secretary 6403 receives (d1) the communication request.

Because there is not receiving-permission, electronic secretary 6403 replies (d2) with guidance information of the applicant A automatically, and refuses the reception.

Electronic secretary 6401 that sent the d1 receives a communication-inhibition Treatment from 6403, creates a 5th rule, adds it to the 5th RuleSet R5DB (FIG. 66D), and saves it to the sender D's direction-file.

If D attempts to send email d3 to A again within the time interval predetermined in the 5th RuleSet (1 day), electronic secretary 6401 will refuse (FIG. 23, 2304) delivering the email as the result of applying the 5th RuleSet.

Therefore, unsolicited emails like these will be blocked at the first sending client before it is being transferred on the Internet.

For instance, if the sender uses email software like Microsoft Outlook, when he presses the send button, Outlook will immediately report that the transmission is not possible.

When the predetermined time of the condition-part have passed since the created time, the 3rd and 5th rules will be removed periodically.

Many organizations provide services to specified groups of people.

Public communication networks such as email are economical, but since they are open to general public, they themselves are unsuitable for providing services only to specific group of people.

The present invention provides method and systems to make public communication networks suitable also for these services.

For example, the Japan Patent Office uses only postal mail to provide inquiry service of patent examination. This example suggests work by the next email system.

Suppose the inquiry email address is E (FIG. 64, 6408). The guidance information of E is set to:

"This is the inquiry address for patent examination process. If you are a first time user, please put "APPLICATION NUMBER: ATTORNEY DOCKET NUMBER" to the subject, and please send it again. For example: "2003-70953:0302-001""

Upon arrival of emails, by applying the 2nd RuleSet, sender who put a valid application number and an attorney docket number will be given communication-permission Treatment, which is stored in the first set of rules.

"APPLICATION NUMBER: ATTORNEY DOCKET NUMBER" has the role of a password in the first time communication for getting the permission of communication. Instead of using this scheme, password issued by the patent office or the applicant and sent to the applicant by postal mailed may also be used.

When the Treatment ID determined by applying the 2nd RuleSet is 6 the Treatment is saved. I.e. the next-emails sent by the sender is not checked with the password.

In some enterprise system there are a large number of people involved dynamically in the communication, so the manual input of direction-file may be difficult. This problem is solved by the direction-file input component.

Figures 67, 68, 69:
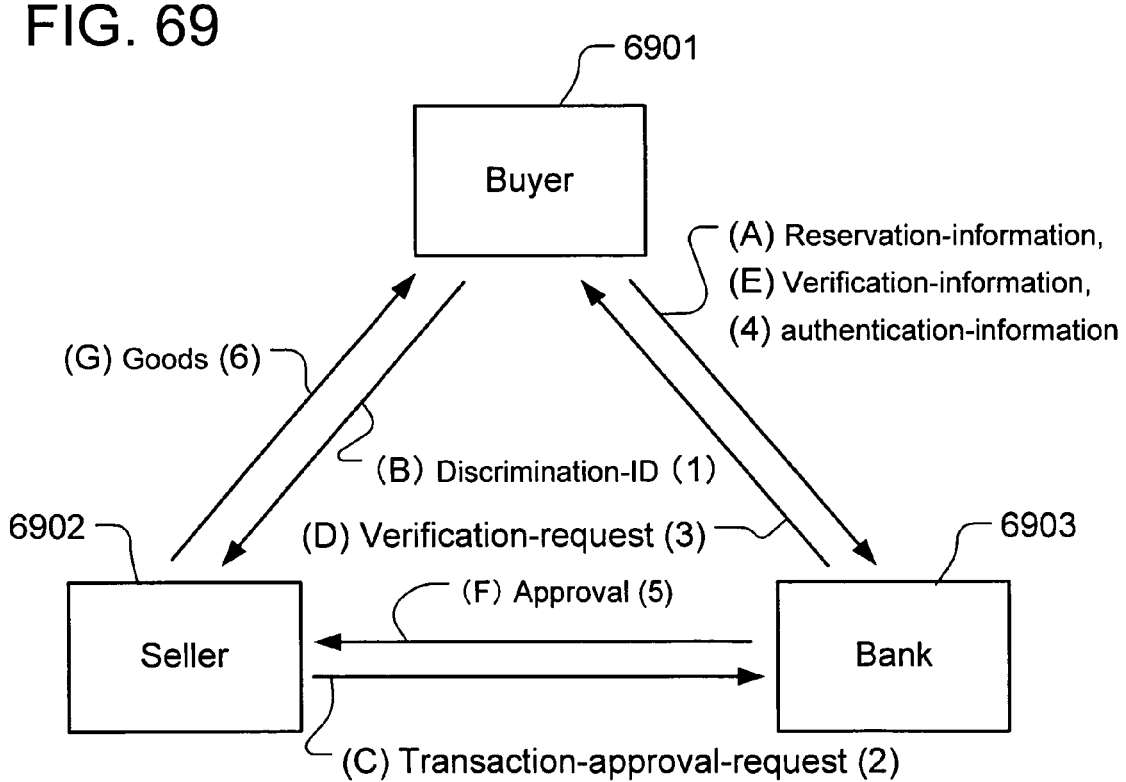
FIG. 67 shows a layout of interface.
FIG. 68 shows data to pass to a component.
FIG. 69 is a block diagram of an electronic transactions system of example 5.

FIG. 67 illustrates the User interface of the direction-file input component. FIG. 68 illustrates the data passed from the User interface to the direction-file input component.

The electronic secretary 6401 operates in a computer running Microsoft Windows Operating System.

The User can manually input some information that does not vary often, such as guidance information and configuration constants through the Internet.

The input component operates in a computer running Microsoft Windows Operating System.

Computer 6410 running existing patent examination management system extracts application numbers and attorney docket numbers from pending application data 6411, then pass them to the component.

Or when an application number is determined and is saved in management data, the management system calls the component to input the number into the direction-file.

Preferably the management system also calls a component to remove completed patent application's numbers from the direction-file.

Therefore, the present invention provides a communication environment that seems to be a secure private communication network for enterprises having a large number of users who are constantly changing, and without manual maintenance through public Internet communication networks.

The electronic secretary 6401 directly sends emails to the Internet 6413, but it may also sends (it is not shown in FIG. 64) emails other than automatically replied ones, via existing email server 6402; for example, from 6408 to 6401 to 6402 to 6413.

This way, because emails transfer of the ISP inside (from 6401 to 6402) is early, queue management functionality will be no need to implement within the electronic secretary. The queue management functionality provided by existing email servers can be utilized.

Any existing email server can be used, such as Sendmail running in a UNIX base computer. This example may be used as a component of an email server.

EXAMPLE 5

An Electronic Transactions System

FIG. 69 is a block diagram of systems and methods for electronic transactions.

In an electronic transactions system and method processing commercial transactions between a account holder (hereafter referred to as "buyer") and a seller, in order to do payment of planned purchases in electronic transactions, the buyer (FIG. 69, block 6901), who holds an account (credit card or debit card for example) in optional financial institutions or settlement institutions (hereafter referred to as "bank"), transmits reservation-information (FIG. 69, (A)) to reserve electronic transactions to the bank (FIG. 69, block 6903), and uses a discrimination-ID (FIG. 69, (B)) to purchase goods (FIG. 69, (G)).

FIG. 73B shows a simple example of reservation-information, data, and operation-information.

As used herein, the terms are defined as follows:

the term "communication-ID" shall mean the communications destination to be used to verify transaction-approval-requests with the buyer, it can be a mobile phone number or a computer communications address;

the term "discrimination-ID" shall mean identification of a user that is linked to the buyer's account in the bank, it can be a phone number or a license plate number;

the term "virtual-account" shall mean virtual-account that is used only to pay a specified type, group of sellers, or organizations, such as railroads, toll roads, ATM withdrawals, shops or Internet shops;

the term "balance-limit" shall mean predetermined amount of a balance of a virtual-account, a balance of a virtual-account is set to a balance-limit by reserving it;

the term "no-verification-limit" shall mean amount of payment upper limit that may omit verification;

The term "no-verification-accumulation-limit" shall mean an amount, if an accumulation of payments that omitted verification is more than the amount (hereafter referred to as "accumulation-excess"), then a verification is required, after the verification the accumulation restarts from zero;

the term "balance-notifying-amount" shall mean an amount of balance below which the buyer should be notified for reserving;

the term "auto-recovery-interval" shall mean the amount of time between automatically recovering the balance to the balance-limit;

it is assumed that a discrimination-ID medium holder passes through an entrance of a toll area, and when the holder passes through an exit of the area, the user is demanded for payment;

the term "transaction-reservation-verifying-need-or-no" shall mean a flag that designates whether or not it is necessary to reserve transaction request of the exit with the user when the holder passes through the entrance;

the term "verification-information" shall mean information that to be used to verify transaction-approval-requests, the verification-information is equivalent to the password of a virtual-account;

the information that is described with the above terms, balance-notice-destinations and account passwords are the reservation-information, c.f. FIG. 73B;

the term "balance" shall mean balance of virtual-accounts unless particularly specified;

the term "user-identifying" shall mean a Treatment that is provided with a kind of control-permission Treatment, Treatment ID cf. FIG. 70;

the term "operation-information" shall mean information that is input into authorization program started by user-identifying Treatment.

The transaction-reservation-verifying-need-or-no flag which is not used for a virtual-account in FIG. 73B is shown with "-".

Responsive to receipt of the purchase request, the seller submits a transaction-approval-request (FIG. 69, (C)) to the bank for being approved.

The bank determines a virtual-account from the seller identification included in the transaction-approval-request; if both the balance and the bank account balance (hereafter referred to as "total-balance") are enough, the bank presents a verification-request (FIG. 69, (D)) to the buyer in order to verify the transaction-approval-request.

The buyer presents a verification-information (FIG. 69, (E)) to the bank to verify the transaction-approval-request.

The bank transmits an approval (FIG. 69, (F)) to the seller only after the transaction-approval-request is verified by the buyer; and settles the account.

A virtual-account is specified with such as seller's business type, name or goods kind by the buyer. Banks offer that identification information of sellers to buyers for choosing the link with virtual-accounts.

Data structures related to settlement procedure in this example is disclosed by documents such as U.S. patent application 20020007345, Kind Code, A1, Harris, David N. Jan. 17, 2002.

Virtual-accounts differ from conventional arts such as special account, reserved amount (the amount that cannot be withdrawn from the account), or prepaid cards.

There is not any limit to withdraw savings from the account though using virtual-accounts. FIG. 73A is a model diagram of a bank account and virtual-accounts that are reserved by the bank account holder.

Balances of virtual-accounts can be set to higher than the total-balance.

However, the payment possible amount of money using a virtual-account is not more than both the balance and the total-balance.

The virtual-accounts have an effect to maintain fluidity of funds while keeping safety of transactions.

In the conventional art, once too much money is transfer to a special account, the funds cannot be easily used by other uses.

As for the virtual-account, there is not such inconvenience.

The above verification-request includes a request cause and an amount of money, and the buyer is requested to verify the transaction-approval-request.

It is demanded that the bank processes it immediately. A settlement institution of seller own to serve as the position of a bank may be administered.

Many means of communications can be employed. Means including telephone, e-mail or the internet can be employed as long as the purpose is satisfied.

A communications means to do continuous connection in a network may be used. For example, mobile Internet Web or chat-like interaction communications may be used.

The buyer may initiate a communication request to the bank in order to verify pending transaction-approval-requests.

The electronic secretary analyzes sending communication requests, and executes user-identifying Treatment for the communication request to verify the transaction-approval-request.

For example, the electronic secretary starts user-identifying program when a telephone call to a bank electronic transactions number, or an access to a web site identified with an URL that provides electronic transactions service, is detected.

The reservation-information may also include criterions of verification.

The bank may approve a transaction-approval-request without exchange of verification-request and verification-information, if the criterions are satisfied by data contained in the transaction-approval-request.

Examples of the criterions may include, but not limited to, seller identification, payment amount limit, date, time or their combination, or other criterions convenient to the buyer.

The bank may transmit the verification-request to the buyer for verifying through a seller's communication device such as the check-out counter terminal.

The verification-request may be chosen to send to both of the seller's device and the buyer's device. The verification-request may be sent with an e-mail, and the buyer may verify with the web.

The discrimination-ID record medium may use optional means to match with a seller's device.

For example bar-code can be displayed on the screen of a mobile phone.

Magnetic card, ID tags, IC card, or infrared communication devices may also be used.

A discrimination-ID may be input into the seller's device by hand.

Further the buyer may choose to print out or to display the use history, the balance, or the total-balance on the seller's device.

The discrimination-ID record medium may be duplicated for use by for instance family members.

For example, a child may buy juice and present a bar-code with discrimination-ID at a convenience store, and his parents can answer the transaction-approval-request sent to a mobile phone while sitting at home.

When the bar-code is lost or stolen, illegal use can be readily detected and the discrimination-ID can be voided.

The present invention can be used to confirm all withdrawal from the user's bank account.

For example, when the user withdraws cash from ATM machine, the ATM can be seen as a seller (FIG. 69, block 6902).

The user enters an account number or inputs a unique ID by a magnetic cards medium, and the amount to withdraw into the ATM, and the ATM will only withdraw cash after the bank verifies through the mobile communication terminal of user (the buyer).

The conventionally authentication of a bank card may be added.

Furthermore, the bank can transfer a transaction code generated every time to user's mobile phone. Using a short distance communications means input the above transaction cord into ATM in order to collate it.

Then only the user can do the transaction by operating an authentication program by fingerprints.

The balance of the virtual-account is an upper limit on the amount payable with that account using electronic transaction.

The settlement debits from the virtual-account with the settlement amount.

When the balance is insufficient, the transaction-approval-request is denied.

The balance can be used with the verification-information which is different from a password.

The balance is the greatest loss amount even if the discrimination-ID, the verification-information and the buyer terminal are stolen simultaneously.

When the no-verification-limit is reached the account holder is notified immediately for verifying.

The no-verification-limit is an amount of a cash sense it can be used only with the discrimination-ID.

When it is refused to transaction-approval-request, a verification-information may be repealed, and a virtual-account may be frozen.

The payment that omitted the verification is accumulated in the amount of accumulation.

The transaction-approval-request is verified at the time of accumulation-excess.

After the verification the accumulation restarts from zero.

The verification of accumulation-excess can be used to verify a payment of a successive promotion.

The no-verification-accumulation-limit is the amount of maximum loss when an discrimination-ID and a verification-information are stolen simultaneously.

When the balance goes below the balance-notifying-amount, the message is sent to a specified balance-notice-destination.

Further, when certain condition is satisfied, the balance is automatically recovered (automatic recovery) to the balance-limit.

For example, it is recovered automatically if time passed through the auto-recovery-interval since last automatic recovery or since last reserving.

The verification-information is different from authentication-information such as a password in the property.

There can be multiple verification-information for each virtual-account, and they may have different importance according to the purpose of each virtual-account.

When a virtual-account is used for payment in public environment, the verification-information which is different from a password had better be used.

The verification-information of a virtual-account for ATM corners environment that can be input safely may use the same as the account password.

As used herein, the term "discrimination-IDentifying" shall mean a Treatment including:
attracting attention of the user by sound or vibration for a communications request to arrive,
receiving information and visually or audibly presenting it, and
starting an authentication program automatically.

The authentication program including:
authenticating the user by operation-information,
transmitting information (registered-information) registered with beforehand to the outside (banks) when the authentication is successful.

The operation-information includes a simple button operation, an approval cord, a voice, a password or a characteristic of a human body (biological information) such as a fingerprint.

The verification-information is used as the registered-information.

If it is necessary, it can be provided with the plural user-identifying Treatments such as to be shown in FIG. 70.

The reservations of electronic transactions are based on discrimination-ID or account number and password, and it can be done through Internet or telephones or at a bank window.

The reservations may be possible only at banks window.

Preferably One Time Password (OTP) is used for the password (authentication-information). Because different passwords are used in every communications, the communications intercept damage can be prevented.

For example, the authentication program may be provided with function to realize OTP.

The reservation is possible with a public telephone temporarily.

A use limit per day may be used in order to prevent the damage of line wiretapping.

Further OTP may be used for the verification-information.

It is desirable to validate electronic transactions (make it into the status that can approve a transaction) after passing through user-authentication.

For example, users give a user-identifying Treatment to the bank through setting direction-files.

Or a flag controlling the status of electronic transactions in direction-files is established.

Electronic transactions is validated or invalidated by setting the flag. When the flag is set in invalidity, the user-identifying Treatment refuses to communication.

The user-authentication uses a user-authentication-means being attached to terminal devices.

Buyers register a user-identification-information in the devices beforehand. When the user-authentication-means is started, the users are promoted to input the user-identification-information into the devices.

The input information is collated with the user-identification-information registered, and if the collation result agreed (authentication success), the next operation is forgiven.

The user-identification-information includes information such as password or biological information.

Preferably, the electronic transaction is invalidated after it is validated through predetermined time (e.g. four hours).

The maximal security can be expected by doing a reservation of electronic transactions before going for shopping and by doing the verification by fingerprints. The reservation is done by setting the balance to a planned use amount, by setting the no-verification-limit to zero and by setting the communication-ID to the user's mobile phone number.

It is possible to go shopping without carrying anything by setting the communication-ID to seller's device and by memorizing a discrimination-ID and verification-information. The payment can do by inputting the discrimination-ID and the verification-information in the shop.

In everyday's shopping there is no need to use the password of the real bank account.

The password is needed only when do the reservation. It is good if the reservation is done safely.

The virtual-accounts can control use speed of money according to purposes freely, there is no possibility of the high-priced damage that such as a conventional back card is forged, and there is not trouble to do the repetitional reservation in an expected everyday consumption life range with the automatic recovery.

Detailed Descriptions:

The details being used conventional arts (such as communication software, command transmission, execution of programs, IC card, OTP) are omitted.

FIGS. 70 and 71 shows TDB and R1DB that to be used in an example of a mobile phone having function of the electronic transactions. A block diagram showing the structure of the phone is basically the same as FIG. 18.

The R1DB is one example of that shown in FIG. 5.

Caller's number is used in order to do explanation easily. Like example 3, packet transmission to do continuous connection of Internet communications means can be used, the initiator can be also distinguished with ID such as an email address.

Figure 74:
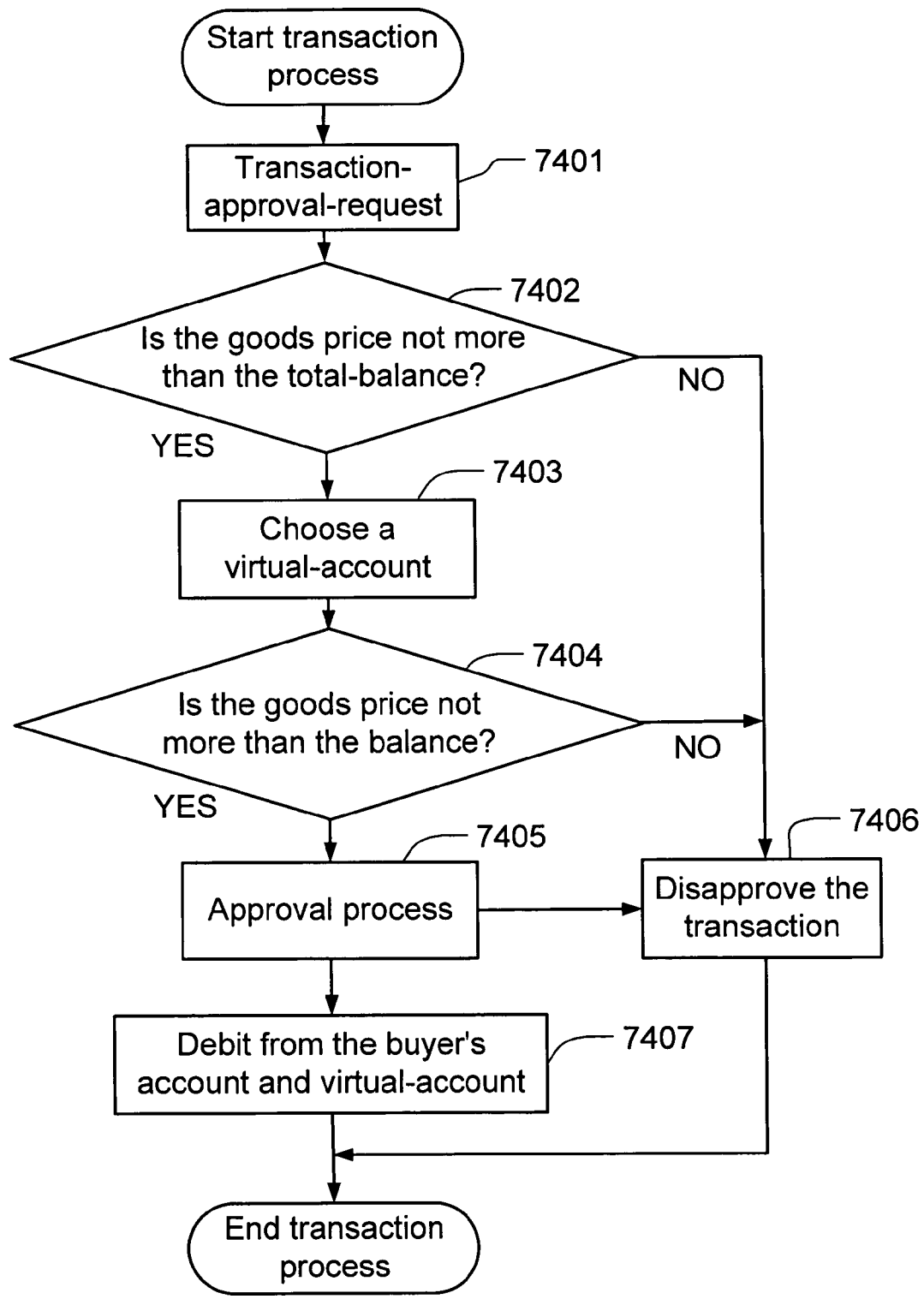
FIG. 74 is a flowchart of transaction process in a virtual-account.
Figure 75:
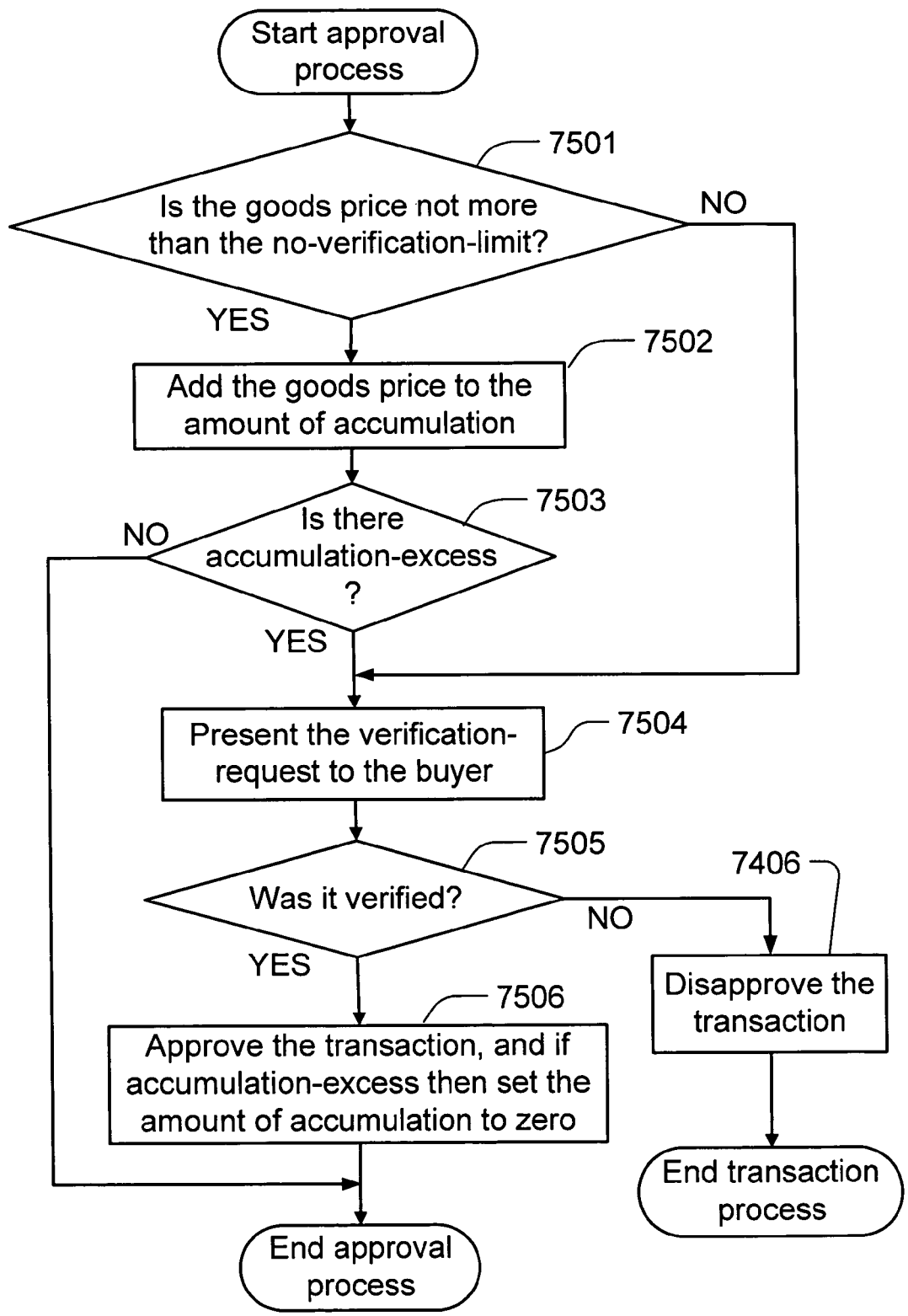
FIG. 75 is a flowchart of approval process.

FIG. 74 shows a flowchart of the transaction processing in the virtual-account shown in FIG. 73A. FIG. 75 shows a flowchart of the approval processing to show in FIG. 74.

The reservation of virtual-account "Shopping" is described in the reservation-information to show in FIG. 73B.

The communication-ID is "090-1234-5678" and "shop". The discrimination-ID is "045-1234-5678". The verification-information is "456". See FIG. 73B, the other reservation-information.

The reservation-information is transmitted for the reservation.

The verification-information and the buyer fingerprint describing in FIG. 73B are stored in the direction-file.

The communication-ID is mobile phone number and "shop", this means the verification-request will be sent to both of the mobile phone and a shop's terminal.

The discrimination-ID is a home phone number, and a bar-code that recorded the discrimination-ID is pasted on the back of the mobile phone.

In FIG. 74, 7401, the seller reads the discrimination-ID by bar-code reader of such as a POS terminal, and transmits the transaction-approval-request including the discrimination-ID, the seller's account number, the shop name and amount (X) of money to the bank.

The buyer can input home phone number by hand in the POS terminal if forgetting to carry the mobile phone.

The bank searches the account number based on the discrimination-ID; for example, the first time payment X is 500 yen; when the total-balance (Y) is 200,000 yen, continues (7402, YES) the processing because Y is enough;

chooses (7403) the shopping account, when the predetermined virtual-account cannot be determined;

does approval processing (7405) because X has not exceed (7404, YES) the balance 100,000 yen;

omits the verification because X has not exceed (FIG. 75, 7501) the no-verification-limit 1,000 yen, approves the transaction-approval-request promptly.

adds up (FIG. 75, 7502) the 500 yen amount of money of the payment that omitted the verification in the amount (Z) of accumulation; (Z becomes 500 yen.)

transfers 500 yen to the credit of the seller and debits the account of the buyer with that amount, and debits the virtual-account with that amount simultaneously.

The new total-balance becomes 200,000−500=199,500 yen, and the balance becomes 100,000−500=99,500 yen (7407).

It is assumed that the amount of the second time payment X is 600 yen by the shopping. Z becomes 1,100 yen for accumulating.

Because Z exceeds (step 7503, YES) the no-verification-accumulation-limit, the bank searches a mobile phone number based on the discrimination-ID, and initiates communication with the user to verify the pending transaction-approval-request.

At the same time, the verification-request is also displayed (7504) on the POS terminal.

The transaction-approval-request is verified by the buyer with inputting the verification-information "456" into the POS terminal, or is verified by the buyer with inputting the fingerprint into the authentication program started by the mobile phone through a fingerprint sensor.

The transaction-approval-request is not verified (step 7505, NO) if the input information is not right, then the transaction is disapproved (step 7406).

The transaction is approved when it is verified, and if accumulation-excess then the amount of accumulation Z is set to zero yen (step 7506).

The new total-balance becomes 200,000−1,100=198,900 yen, and the balance becomes 100,000−1,100=98,900 yen.

FIG. 72 is a block diagram showing further another example to apply this example to tickets.

[Field]

It is relates to the field: toll collection system of a toll area (hereafter referred to as "road") such as the railroad, the bus, an expressway, Congestion Charging, parking lots, and stadiums.

[Means]

The electronic transaction to show in FIG. 69 is used.

The seller (a road, FIG. 72, 6902) reads (FIG. 72, 1) the discrimination-ID at the entrance (FIG. 72, 7204), and transmits transaction-reservation information (FIG. 72, 2) including the discrimination-ID and the cause to the bank to reserve the transaction.

The bank sends the verification-request (FIG. 72, 3) verifying the reservation to a user.

The user verifies the verification-request and sends the verification-information (FIG. 72, 4) to the bank.

The bank sends reservation-complete information (FIG. 72, 5) to the seller only after the verification-request is verified by the user.

The seller reads (FIG. 72, 6) the discrimination-ID at the exit (FIG. 72, block 7205), adjusts the toll, and sends the transaction-approval-request (FIG. 72, 7) to the bank.

The bank sends the verification-request (FIG. 72, 8) verifying the transaction-approval-request to the user.

The user verifies the verification-request and sends the verification-information (FIG. 72, 9) to the bank.

The bank transmits approval (FIG. 72, 10) to the seller only after the verification-request is verified by the user; and then settles the account.

When the transaction-reservation-verifying-need-or-no flag is reserved in "Yes", it is possible to control the entrance by the approval or denial result of the reservation of the transaction.

Detailed Descriptions

A payment of a railroad fare is a specific example.

The discrimination-ID is recorded to a non-contact type IC card.

The reservation of virtual-account "Railroad" is described in the reservation-information to show in FIG. 73B.

The communication-ID is mobile phone number "090-1234-5678".

The discrimination-ID is "IC card number".

The verification-information is "456".

The transaction-reservation-verifying-need-or-no flag is "No".

See FIG. 73B, the other reservation-informations.

The reservation-information is transmitted for the reservation.

The ticket gate of the departure station (block 7204) reads the discrimination-ID, and forward it to a server (it is established in FIG. 72, block 6902, and it is not shown in this FIG.).

The server creates an entrance record to record the discrimination-ID, the departure station, and time. And the server sends the transaction-reservation information (different from the reservation-information of the virtual-account) including the discrimination-ID and name of the departure station to the bank.

The bank omits the verification (FIG. 72, 3, 4) when the transaction-reservation-verifying-need-or-no flag is "No", and sends reservation-complete information to the ticket gate.

Then the entrance is allowed.

The ticket gate of the arrival station reads the discrimination-ID, adjusts fare of the passenger distinguished by the discrimination-ID, transmits the transaction-approval-request to the bank, and the exit is permitted if the approval is received.

In the case of the fare which does not exceed the no-verification-limit, the bank omits the verification (FIG. 72, 8, 9). Therefore the judgment processing of exit can be made faster.

When the transaction-reservation-verifying-need-or-no flag is "Yes" and the discrimination-ID that the entrance ticket gate reads is valid, the transaction-reservation is sent to the bank after permitting the entrance.

The exit ticket gate may transmit the transaction-approval-request to the bank after permitting the exit when the reservation-complete information has been received.

The judgment processing of entrance or exit can be made faster for this.

In order to process high speed further, and in order to hold down the expense of transaction-approval-request processing, the amount of money of the payment that omitted the verification may be accumulated to the IC chip card or to the server.

The accumulation and entrance or exit judgment can approve offline without communicating with the bank.

In order to approve offline, the seller obtains the necessary reservation-information set by the buyer from the bank.

Figure 76:
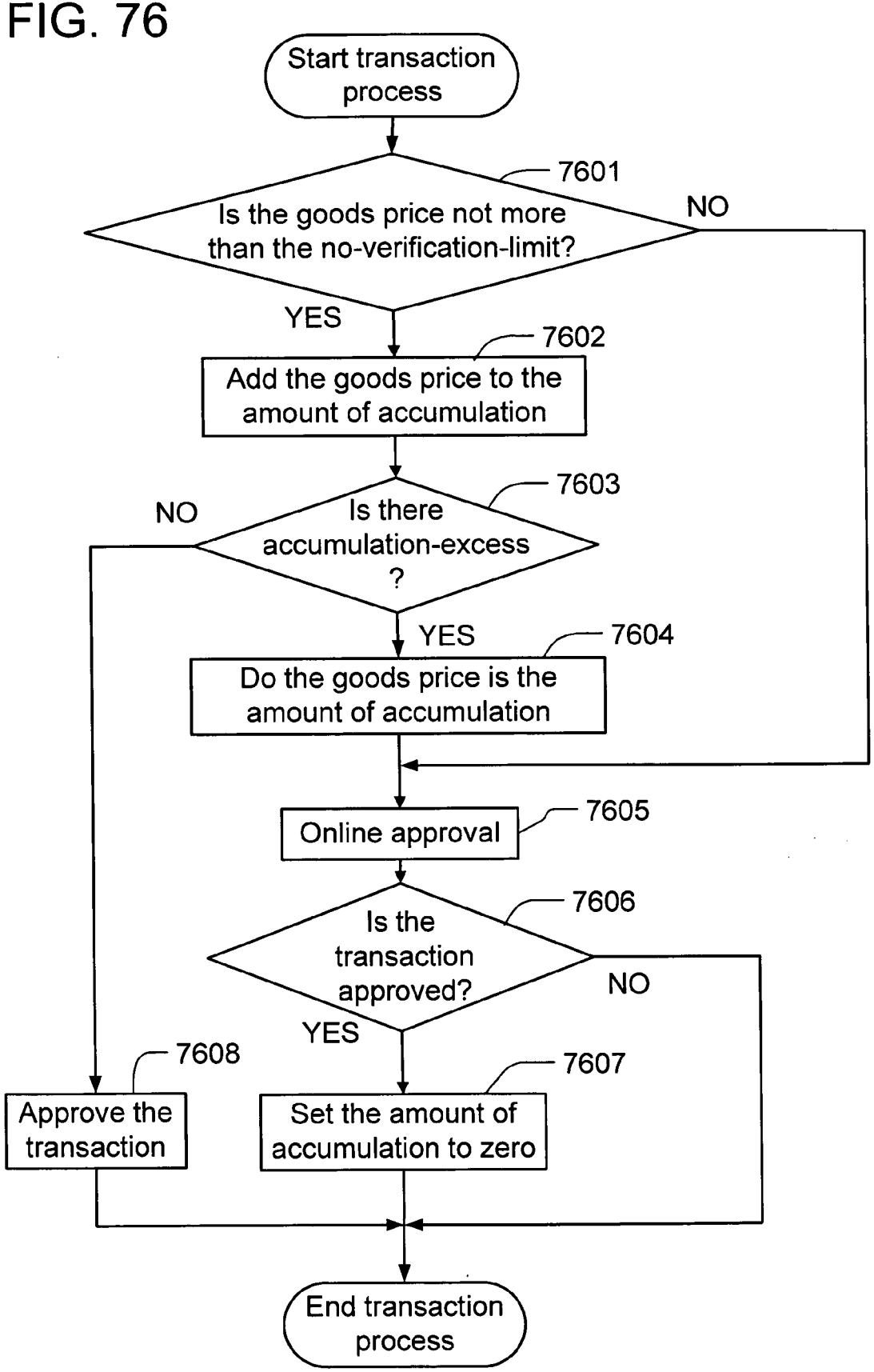
FIG. 76 is a flow chart of offline-approval.

FIG. 76 is a flowchart of the offline-approval.

The seller's terminal reads the discrimination-ID. When the goods price is not more than the no-verification-limit (FIG. 76, 7601), the goods price is added (7602) to the amount of accumulation that the seller side stored.

In the case of accumulation-excess, the seller creates the transaction-approval-request in order to charge the amount of accumulation, and submits it to the bank for requesting (7605) approval according to the procedure to show in FIG. 74; Herein referred to as "online-approval".

When the transaction is approved (7606, YES), the amount of accumulation is reset (7607) to zero.

When there is not accumulation-excess, the transaction is approved without communicating with the bank.

In this system, this processing is named "offline-approval".

The discrimination-ID (such as IC cards) may be lent for an amount of security.

When the transaction-approval-request is refused, the fare is charged in cash.

When the abolition of the discrimination-ID is required, the amount of money that deducted the amount used from the amount of security may be repaid to the user.

The no-verification-accumulation-limit and the amount of security may be limited in same amount degree.

There is an effect to guarantee the collection of the fare.

For example, it is assumed that the discrimination-ID is lent or is validated; the amount of security is 1000 yen. It is supposed that taking a train that the accumulation fare is 990 yen allowed without the transaction-approval-request, then the next time transaction-approval-request of 1110 yen will be submitted at an exit ticket gate if the fare is 120 yen. When the transaction-approval-request is refused, the passenger is charged 120 yen in cash as the fare, and the amount of repayment is 10 yen if the abolition of the discrimination-ID is required.

The offline-approval can be done by plural sellers that store the amount of accumulation originally with one discrimination-ID.

For example, the same mobile phone number can be used as the discrimination-ID, and can be used for different railroad company.

Further the entrance or exit processing can be processed at high speed by the passenger giving position-obtaining-permission Treatment to the seller.

The entrance ticket gate can judge the validity of the nearby passenger's discrimination-ID beforehand.

The exit ticket gate can adjust a supposed-fare (it is supposed that the passenger gets off at the nearest station).

The position of the mobile phone can be obtained from the system of the phone company.

It is not need to connect to the mobile phone directly.

In the case of processing of a ticket to enter stadiums, customers order a ticket from ticket shops beforehand.

The entrance management server is equivalent to the bank, and ticket information is stored in it.

The ticket information includes data such as the discrimination-ID, the stadium name, the event name, the date and time, the number of people, and seat positions.

And the server initiates communication to the mobile phone linked to the discrimination-ID which is read by the entrance ticket gate, and entrance is permitted after doing user-authentication.

Sellers may administer an own settlement institution.

Instead of the public communications means, the ticket gate may communicate with the mobile phone by a short-distance communications means such as infrared, DSRC (Dedicated Short Range Communication), or Bluetooth, and may start the user-authentication program of a mobile phone directly.

Toll collection of an expressway is described as further another example.

[Background]

Electronic Toll Collection (ETC) System of Japan consists of in-vehicle apparatuses, ECT cards, tollgates, and a DSRC (Dedicated Short-Range Communication) radio system is used for road-vehicle communication. The ECT card stores personal information, contract information, and electronic money.

However, it is demanded to pass the tollgates with the low speed; "can be stopped at any time" is demanded. In addition, the expense is high-priced.

While in Singapore, toll collection system for ERP films a license plate of vehicles with cameras. Even vehicles to pass through at a speed of 180 k.p.h. are all right.

The camera method of existing technology can realize the free flow tollgate which can pass high speed, but separation of a owner and a payer of a car is difficult.

[An Object]

The free flow toll collection system that cash is unnecessary is realized by a low cost.

[Means]

The electronic transaction to show in FIG. 69 is used.

A vehicle license plate number is used as the discrimination-ID to discriminate a user.

The reservation of virtual-account "Expressway" is described in the reservation-information to show in FIG. 73B.

The communication-ID is mobile phone number "090-1234-5678".

The verification-information is "456".

The transaction-reservation-verifying-need-or-no flag is "Yes".

See FIG. 73B, the other reservation-informations.

The reservation-information is transmitted for the reservation.

The seller films a license plate with a digital camera at an entrance (block 7204), and reads the discrimination-ID with image recognition means, and sends the transaction-reservation information including the discrimination-ID and the entrance name to the bank.

The toll is adjusted on the basis of entrance record after permitting exit when reservation-complete information is received, and a transaction-approval-request is transmitted to a bank.

Further the record such as type of the car which met toll classification and the photograph are included in the entrance and exit record as the use evidence.

When the transaction-reservation or the transaction-approval-request is refused or electronic transactions is not reserved, the seller can send a bill to the user (the owner) of vehicle determined by the discrimination-ID, and the office work fee cost may be add to the amount of money of the bill.

When a gate is installed at an entrance, a vehicle is allowed to pass the gate in the following condition:
the discrimination-ID is reserved in the virtual-account; or
the reservation-complete information is received.

When a gate is installed at an exit, a vehicle is allowed to pass the gate in the following condition:
the discrimination-ID is reserved in the virtual-account;
the reservation-complete information is received; or
the approval information is received.

Preferably the vehicle is guided by electric light signals or by the mobile phone's sound according to the judgment result.

A nonstop lane for electronic transactions may be installed in parallel with a conventional gate in tollgates.

Further the gate may decide passage permission at high speed by the following preprocessing for the vehicles that approach to the gate:
judging the payment method at the entrance gate;
adjusting the supposed-toll at the exit gate.

The gate may decide the vehicles that approach to the gate by the following method:
installing cameras at the first arrival position of traffic lanes; or
obtaining position information of the mobile phone approaching to the gate.

Preferably the buyer specifies a road use-plan period, and if the period passed, the virtual-account will be canceled.

In the case of charging for passing through a toll area such as a downtown area, at the boundary line the charging can be done similar to the above exit.

A charging system on the basis of mileage (distance charging) can be realized.

The buyer provides a position-obtaining-permission Treatment to the system and lets the system almost grasp the position of the mobile phone continually when enter in a toll area. For example, the server may obtain the mobile phone's position information (such as location cell or GPS information) and may chase it.

The system considers the moved distance of the mobile phone to be the moved distance of the vehicle, and calculates the amount of toll. When the position cannot be determined when the battery of the mobile phone is cut, a fixed toll will be applied.

The vehicle information to be necessary for charging is read with cameras. The cameras may be replaced by other means to obtain the above information.

For example, a license plate system having a communication function may be used.

[Effect]

In the case of a conventional ETC system, when a vehicle passes a gate or a boundary line at speed, the following is necessary: recognizing the vehicle instantly; doing interactive communication with the vehicle in order to move electronic money instantly; keeping the security of the credit card information; preventing the data manipulation; processing this in high reliability in large quantities at high speed. This is the cause that the cost of the ETC system is high.

While in this example, it is only necessary to film the vehicle, and to read the license plate. And processing technology for this purpose is maturity. There is the following effect: it is not necessary to transmit credit card information; it is not necessary to process a large quantity of data at the gate at high speed; because the in-vehicle apparatus and the ETC card are not necessary, the cost of roads and vehicles are lowered; the problem such as forgery of a prepaid expressway card can be prevented; separation of a owner and a payer of a car is easy; nonstop at tollgates can be realized easily; because a card is not used, it is not necessary to worry about the card being forged, a lack of balance or increase of electronic money.

Further, FIG. 69 shows a block diagram about another transaction method and system.

In an electronic transactions system and method processing commercial transactions between a buyer and a seller, the buyer uses the discrimination-ID (FIG. 69, 1) to purchase goods (FIG. 69, 6) from the seller.

Responsive to receipt of the purchase request, the seller submits a transaction-approval-request (FIG. 69, 2) to the bank (FIG. 69, block 6903).

The bank presents a verification-request (FIG. 69, 3) to the buyer in order to verify the transaction-approval-request.

The buyer transmits a authentication-information such as password (FIG. 69, 4) to the bank to verify the transaction-approval-request through a buyer's communications module.

The bank transmits an approval (FIG. 69, 5) to the seller only after the transaction-approval-request is verified by the buyer.

When a communication request which is for verifying the transaction-approval-request is received, the user-identifying Treatment is executed. Then the authentication program is started by the user-identifying Treatment.

The authentication-information is included in the registered-information. Because the registered-information is transmitted to the bank by the authentication program, as for the buyer, there is not necessity to input the authentication-information in public.

Preferably the electronic transaction is invalidated after verifying the transaction-approval-request.

Then in order to validate electronic transactions user-authentication always is done every time before paying, and there is not danger to be damaged even if a mobile phone is lost.

EXAMPLE 6

A Mobile Phone Key

[Field]

A mobile phone is used as a key for a home door, a safe, or a car.

[Means]

When unlock, the electronic lock control system verifies the unlocking-request with a user through communications module.

The system unlocks only after the request was verified by the user.

The user sends an authentication-information such as password to the electronic lock control system to verify the request.

FIG. 33 exemplifies structure of an electronic lock control system. The case to unlock by a call originating from the mobile phone was described in example 1.

This example, the electronic lock side of controlled apparatus originates a call.

When the user unlock by operation means such as unlocking operation buttons, the system originate a call to the user. In FIG. 70, 71, an example to give a user-identifying Treatment to the communication request to verify the unlocking-approval-request is shown. The system unlocks only after having received a predetermined authentication-information.

Further the unlocking operation may be collated with the password that input by a ten key.

Unlocking operation may merely push a call button of a door phone. The door phone may connect with a mobile phone. Unlocking can be remotely controlled.

[Effect]

A strong keyless lock can realize by a user-authentication result such as biometrics authentication.

EXAMPLE 7

[Field]

This example relates to collection of traffic information and route guidance of moving-objects.

It is shown herein an exampling using mobile phone as personal mobile communication terminal, but it is not restricted to mobile phone, electronic equipments with communication capabilities such as notebook PC, hand held PC, or car navigation systems can also be used.

[Background]

The following technology is known: to collect traffic information from cars; to predict traffic on roads; to prevent traffic congestion in advance.

[An Object]

To achieve cooperative efficient traffic information collecting, prevention of traffic congestion, and dynamic navigation of moving-object.

[Means]

A database including information such as traffic, maps and institution data is stored in a traffic center that is capable of calculating best routes. Through telecommunication line, the traffic center collects departure time and trip plans including a starting point and destination from users (pedestrian and drivers), and provides recommended trip plans and routes to the users.

The user's mobile terminal obtains current position information, and the traffic center communicates with the terminals, to obtain movement status.

When traffic congestion is happening or predicted, the traffic center only chooses the limited numerical vehicles which can dissolve the traffic congestion to send bypass information.

When it is necessary, the traffic center also sends information such as forward map to vehicles.

Whenever a mobile terminal is communicated with, the center collects movement information such as a position, speed, and a moving direction to update a traffic real condition database.

The center may connect with the vehicles by plural methods including constant connection, intermittent connection.

The center may connect with the vehicles when certain events are detected.

The mobile terminal measures data such as position, speed and moving directions, and provides necessary control Treatment such as "measurement-data-obtaining-permission", "map or voice information-transmission-permission", and "attention-attracting-permission" to the center, and the user in driving is not necessary to get a hand off the steering wheel to operate the mobile terminal.

When the mobile terminal initiates communication to the center, it sends information including its current position and requests such as route search, traffic congestion information search.

Then the traffic center replies with route information, and commands.

The terminal operates according to the commands. The user is guided to the received route.

If the vehicle is off the route, the terminal sends request to the center again for route search.

When there is fog or visibility is bad, or when there are uphill slopes of a traffic congestion outbreak factor position or intersection, event of speed changes of vehicles can be detected.

The center grasps the positions of vehicles continually, and tells the drivers the position of nearby vehicles, and urges regulation of speed to keep a safe distance among the vehicles.

This way, the traffic congestion prevention and safe driving are assisted.

The mediation of the center enables accident prevention service which is provided through communications among nearby vehicles.

Nearby vehicles are treated as a group. The center grasps the position of each member of the group. By the mediation of the center, such as the connection numbers of each member are exchanged.

Then the vehicles can be connected directly. The positions of other vehicles in the group are displayed on the screen of the mobile terminal by communication among vehicles.

When the dangers (such as approach of vehicles which are in front or behind, braking hard, airbags inflate, or accidents) are detected, the mobile terminal sends urgent warning to vehicles concerned.

The mobile terminal can keep the position information of all the vehicles in the group and help auto navigation system in the vehicles to keep safe distance between vehicles.

When information lacks, the traffic center uses mobile phones which have a positioning device as monitors to watch the movement information.

When the monitors are carried on moving objects (such as vehicles), movement information is collected from the monitors.

The traffic center analyzes the received information, creates information collecting commands, and sends it back to the monitors.

One start method of the monitor is to transmit movement information automatically to the traffic center when a predetermined condition such as speed higher than 20 km/h is met. The center then replies with a transmitting interval (T) as a command. It is assumed the spatial density of monitors is represented in D. the T and D are made in a positive correlation. In other words when D increases the center increases the T When density D increases, the possibility that the same movement information is transmitted to the center increases. The center increases in the transmitting interval T in order to control useless information transmission.

For example, T is calculated by equation:

$$T=A*D+B$$

wherein A and B represents constant values.

Figure 31B:
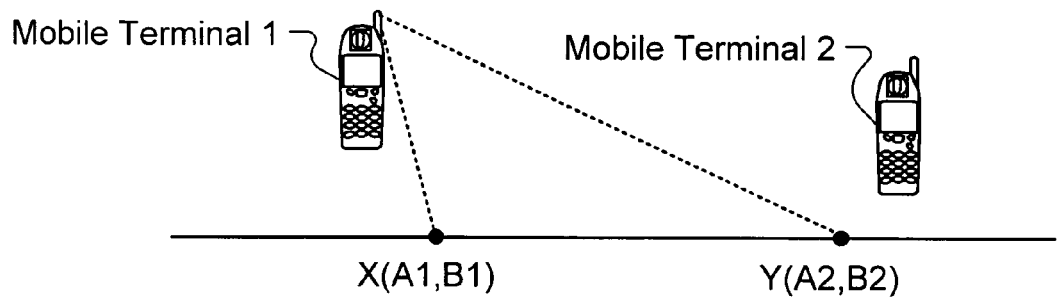
FIG. 31B is a model diagram of a method to decide a measuring coefficient.

FIG. 31 B is a model diagram of method to determine a value of A and B. The value of A and B is smaller the information is more much. When there is necessity, the downtown area and the suburbs may use difference values. The center uses the value which is predetermined according to the current location of the monitor.

For example, the constant value of spot X is set to (A1, B1), and Y is set to (A2, B2); because mobile terminal 1 is the nearest to spot X, the center uses the value (A1, B1) for mobile terminal 1; the number of the monitor which transmitted around spot X for less than 10 minutes is counted as density D1; and the center uses the value (A2, B2) for mobile terminal 2.

Concretely if D1=10, A1=5, and B1=10 then T1 is 60 minutes. In other words that mobile terminal 1 is ordered to transmit information again after 60 minutes.

Further the following information transmission conditions can be included in the command: do not transmit in a predetermined period of time, speed range, or area; transmit only when speed or moving direction changed.

A management of the monitor provides reward to informants or sells the automatic monitor function built-in mobile phone. Preferably the reward is offered as points depending on offered quantity of information, route guidance service is offered in exchange for the points that the user accumulated.

It is possible to optimally control traffic lights by using real-time traffic information such as real traffic flow or urgent vehicles.

For example, when an expectation position of vehicles becomes near to an intersection, the traffic center initiates communication with the vehicles in order to grasp its real position for avoiding needless red lights.

If the vehicles such as urgent send itself position information at realtime, the center can do optimization control its front traffic light.

The traffic center examines the position of other vehicles in front course of urgent vehicles, and evacuation can be ordered to pertinence vehicles.

The traffic center can watch speed limit violations as well as movement of vehicles near intersection, and warns nearby drivers or walker when there is danger of collision.

The traffic center can do route guidance service to walkers carrying the mobile terminal. When trains have been canceled, or missed the last train, through using the user's action plan or commuting course, the current location and time, the center can guide a course of evasion.

[Effects]

The center can simultaneously provide traffic navigation and collect real-time information to facilitate the traffic navigation.

The following feedback effect can be expected: if traffic starts to be congested, then the request for navigation service will increase, then the information collected by the traffic center will increase, then the center can provide better navigation service based on the collected information and consequently the traffic congestion will be decreased.

Because the recommendation course where a traffic center fits the real condition can be guided, the most suitable traffic system is enabled by changing the traffic flow that is not cooperative into cooperative.

The center can provide personalized relevant information to each driver and pedestrian in a timely manner.

Traffic congestion can be foreseen, and optimal bypass route can be found from the destination information of each vehicle.

Transport capacity of the traffic network can be used enough without making concentrate on a specific road.

The spots measured with the monitors in comparison with stationary sensors on roads are not limited. The traffic conditions information that met in equality or importance in probability can be collected without omission in roads.

Dynamic route guidance and traffic congestion avoidance service with the mobile phone can be offered. The user of the service is not necessity to operate the mobile phone in moving (There is a law of traffic to forbid the above operation).

The following thing becomes easy: support of safe driving, optimization of traffic management, promotion of efficiency of road management, support of pedestrians, support of emergency vehicles, easing traffic congestion, and preventing traffic congestion beforehand.

What is claimed is:

1. An apparatus comprising:
   first-determination means for determining whether any member on a list of addresses is included in a request;
   second-determination means, responsive to a first-negative-determination, for determining whether a condition is satisfied;
   means, responsive to a second-positive-determination that said condition is satisfied, for causing a control action; and
   means, responsive to a second-negative-determination that said condition is not satisfied, for causing a limitation action;
   said list of addresses comprising at least one address;
   said request being information that is received before a purpose of a source of said request is achieved;
   said first-negative-determination being a determination that each member on said list is not included in said request;
   said control action being an action of performing use of a resource for achieving said purpose;
   said limitation action being an action of limiting said use; and
   said limitation action comprising an action of sending return information to said source for achieving said purpose.

2. The apparatus of claim 1, wherein said resource is a storage device.

3. The apparatus of claim 2, wherein said resource is a time from beginning to end of use of said storage device.

4. The apparatus of claim 3, wherein said purpose includes delivery of communication contents;
   said time is time from beginning to end of said delivery;
   said control action comprises an action of finishing said use after perfecting said delivery; and
   said limitation action comprises an action of finishing said use before perfecting said delivery.

5. The apparatus of claim 4, wherein:
   said request is an email;
   said address is an email address;
   said limitation action comprises an action of replying with said return information;
   said condition is satisfied when an email is received, said email including a specified keyword; and
   said return information is information promoting said source to send said email.

6. The apparatus of claim 2, wherein said resource is a capacity of said storage device for storing communication contents;
   said purpose includes delivery of said communication contents;
   said request is a part of said communication contents;
   said control action comprises an action of storing said communication contents;
   said limitation action comprises an action of storing said part.

7. The apparatus of claim 6, wherein:
   said part is a header of an email;
   said address is an email address;
   said limitation action comprises an action of replying with said return information;
   said condition is satisfied when a header of an email is received, said header including a specified keyword; and
   said return information is information promoting said source to send said email.

8. The apparatus of claim 1, wherein said resource is a communication channel capacity.

9. The apparatus of claim 8, wherein:
said purpose includes delivery of communication contents;
said capacity is capacity for perfecting said delivery;
said control action comprises an action of finishing communication after perfecting said delivery; and
said limitation action comprises an action of finishing said communication before perfecting said delivery.

10. The apparatus of claim 9, wherein:
said request is a header of an email;
said communication contents is said email;
said address is an email address;
said limitation action comprises an action of replying with said return information;
said condition is satisfied when a header of an email is received, said header including a specified keyword; and
said return information is information promoting said source to send said email.

11. The apparatus of claim 8, wherein:
said purpose includes initiating a communication with an entity;
said request includes an address of said entity;
said request represents a transmission request for transmitting said request to said entity;
said capacity includes a capacity for transmitting said request to said entity;
said control action comprises an action of permitting said transmission request;
said limitation action comprises an action of rejecting said transmission request;
said condition is satisfied when security information agrees with registered information, said security information being information inputted from said source; and
said return information is information promoting said source to input said security information.

12. The apparatus of claim 1, wherein said resource includes means for causing a notification to a party.

13. The apparatus of claim 12, wherein:
said notification is a ringing sound;
said resource includes means for talking with said source;
said address is a telephone number;
said request is a incoming telephone call;
said request includes a telephone number of said source;
said condition is satisfied when an operation is performed, said operation being an operation for answering said call;
said control action comprises an action of performing said talking with said source;
said limitation action comprises an action of stopping said ringing sound before said operation is performed; and
said return information is audio information promoting said source to send a voice message.

14. The apparatus of claim 12, wherein:
said address is a telephone number;
said request includes a telephone number of said source;
said condition is satisfied when specified information is received;
said limitation action comprises an action of rejecting said use; and
said return information is a voice guidance message promoting said source to send said specified information.

15. The apparatus of claim 14, wherein said specified information is selected from the group consisting of a number entered via a keypad, a voice, and an image.

16. The apparatus of claim 14, wherein said means for causing a notification is means for transmitting a call to a telephone.

17. The apparatus of claim 12, wherein:
said request is an email; and
said notification is a notification for displaying that said email has been received.

18. The apparatus of claim 1, wherein:
said limitation action comprises an action of rejecting said use before an operation is performed, said operation being an operation for answering a incoming telephone call;
said return information is information to report a wait status to said source,
said wait status representing a status waiting for said operation to be performed; and
said control action comprises an action without intervention by a party who is on the destination side of said request.

19. The apparatus of claim 18, wherein:
said resource includes a means for determining status information of a status of a device on the destination side of said request; and
said control action comprises an action of sending said status information to said source.

20. The apparatus of claim 19, wherein:
said status is a position;
said means for determining is GPS (Global Positioning System) means for determining position data of said position; and
said status information is said position data.

21. The apparatus of claim 19, wherein:
said status is a position; and
said status information is a position data, said position data representing position of a cellular phone based on position of cellular phone base stations.

22. The apparatus of claim 19, wherein:
said status is a change of a status;
said means for determining is a means for determining information of said change; and
said status information includes said information of said change.

23. The apparatus of claim 22, wherein said change is selected from the group consisting of a change of a position, and a change of a speed.

24. The apparatus of claim 22, wherein said action of sending is performed when said change occurs.

25. The apparatus of claim 19, wherein:
said means for determining is a means for determining status of a communication program, said status including an online status, said online status representing that said program is ready for communication.

26. The apparatus of claim 18, wherein:
said resource includes a camera; and
said control action comprises an action of sending images to said source.

27. The apparatus of claim 18, wherein:
said resource includes a microphone; and
said control action comprises an action of sending sound to said source.

28. The apparatus of claim 18, wherein:
said resource includes information output means for outputting information to said party; and
said control action comprises an action of outputting information to said party.

29. The apparatus of claim 18, wherein said resource includes a storage device.

30. The apparatus of claim 29, wherein:
said storage device is a device for storing a direction file, said direction file being configuration information for customizing behavior of said apparatus, said configuration information including said address; and
said control action comprises an action of changing said configuration information.

31. The apparatus of claim 18, wherein said resource includes a control means for receiving a command and for executing said command.

32. The apparatus of claim 31, wherein said control means is a means for controlling an outside device.

33. The apparatus of claim 18, wherein said resource includes a program that is available for executing on a computer system.

34. The apparatus of claim 33, wherein said program is a communication program.

35. The apparatus of claim 1, wherein said condition is satisfied when specified information is received.

36. The apparatus of claim 35, wherein said specified information is determined by a mechanism.

37. The apparatus of claim 36, wherein:
said specified mechanism is a mechanism for using a one-time passwords (OTP); and
said information is said OTP.

38. The apparatus of claim 35, wherein:
said return information is information promoting said source to send said specified information; and
said return information includes information for determining said specified information.

39. The apparatus of claim 1, wherein said address is an Internet protocol (IP) address.

40. The apparatus of claim 1, wherein said address is a URL.

41. The apparatus of claim 1, further comprising means for causing an action of updating said list; and
wherein a first-positive-determination is a determination that any member on said list is included in said request.

42. The apparatus of claim 41, further comprising:
means, responsive to said first-positive-determination, for causing said control action; and
wherein said updating comprises adding an address included in said request to said list.

43. The apparatus of claim 41, further comprising:
means, responsive to said first-positive-determination, for causing an inhibiting action; and
wherein said inhibiting action is an action of rejecting said use; and
said updating comprises adding an address included in said request to said list.

44. The apparatus of claim 41, wherein said updating comprises deleting an address from said list.

45. The apparatus of claim 1, further comprising:
means for communicating with a server; and
means for receiving said request from said server; and
wherein said request is a request stored in said server for achieving said purpose.

46. The apparatus of claim 1, further comprising:
means for receiving requests from a plurality of sources; and
means for transmitting requests to a plurality of destinations.

47. An apparatus comprising:
determination means for determining whether any member on a list of identification information is included in a request;
means, responsive to a positive determination, for causing a control action; and
means for causing a limitation action;
said list of identification information comprising at least one identification information;
said request being information that is received before a purpose of a source of said request is achieved;
said identification information being an original information that can be determined by a user;
said positive determination being a determination that any member on said list is included in said request;
said control action being an action of performing use of a resource for achieving said purpose;
said limitation action comprising a notification, said notification being a ringing sound; and
said control action comprising inhibiting said notification.

48. The apparatus of claim 47, wherein:
said resource includes a means for determining status information of a status of a device on the destination side of said request; and
said control action comprises an action of sending said status information to said source.

49. The apparatus of claim 48, wherein:
said status is a position;
said means for determining is GPS (Global Positioning System) means for determining position data of said position; and
said status information is said position data.

50. The apparatus of claim 48, wherein:
said status is a position; and
said status information is a position data, said position data representing position of a cellular phone based on position of cellular phone base stations.

51. The apparatus of claim 48, wherein:
said status is a change of a status;
said means for determining is a means for determining information of said change; and
said status information includes said information of said change.

52. The apparatus of claim 51, wherein said change is selected from the group consisting of a change of a position, and a change of a speed.

53. The apparatus of claim 51, wherein said action of sending is performed when said change occurs.

54. The apparatus of claim 47, wherein:
said resource includes a camera; and
said control action comprises an action of sending images to said source.

55. The apparatus of claim 47, wherein:
said resource includes a microphone; and
said control action comprises an action of sending sound to said source.

56. The apparatus of claim 47, wherein said resource includes a control means for receiving a command and for executing said command.

57. The apparatus of claim 56, wherein said control means is a means for controlling an outside device.

58. The apparatus of claim 47, wherein said resource includes a program that is available for executing on a computer system.

59. The apparatus of claim 58, wherein said program is a communication program.

60. The apparatus of claim 47, further comprising:
means for receiving requests from a plurality of sources; and
means for transmitting requests to a plurality of destinations.

61. A method comprising the steps of:
determining whether any member on a list of addresses is included in a request;

responsive to a first-negative-determination, determining whether a condition is satisfied;
responsive to a second-positive-determination that said condition is satisfied, causing a control action; and
responsive to a second-negative-determination that said condition is not satisfied, causing a limitation action;
said list of addresses comprising at least one address;
said request being information that is received before a purpose of a source of said request is achieved;
said first-negative-determination being a determination that each member on said list is not included in said request;
said control action being an action of performing use of a resource for achieving said purpose;
said limitation action being an action of limiting said use; and
said limitation action comprising an action of sending return information to said source for achieving said purpose.

62. The method of claim 61, wherein said resource is a storage device.

63. The method of claim 62, wherein said resource is a time from beginning to end of use of said storage device.

64. The method of claim 63, wherein said purpose includes delivery of communication contents;
said time is time from beginning to end of said delivery;
said control action comprises an action of finishing said use after perfecting said delivery; and
said limitation action comprises an action of finishing said use before perfecting said delivery.

65. The method of claim 64, wherein:
said request is an email;
said address is an email address;
said limitation action comprises an action of replying with said return information;
said condition is satisfied when an email is received, said email including a specified keyword; and
said return information is information promoting said source to send said email.

66. The method of claim 62, wherein said resource is a capacity of said storage device for storing communication contents;
said purpose includes delivery of said communication contents;
said request is a part of said communication contents;
said control action comprises an action of storing said communication contents;
said limitation action comprises an action of storing said part.

67. The method of claim 66, wherein:
said part is a header of an email;
said address is an email address;
said limitation action comprises an action of replying with said return information;
said condition is satisfied when a header of an email is received, said header including a specified keyword; and
said return information is information promoting said source to send said email.

68. The method of claim 61, wherein said resource is a communication channel capacity.

69. The method of claim 68, wherein:
said purpose includes delivery of communication contents;
said capacity is capacity for perfecting said delivery;
said control action comprises an action of finishing communication after perfecting said delivery; and
said limitation action comprises an action of finishing said communication before perfecting said delivery.

70. The method of claim 69, wherein:
said request is a header of an email;
said communication contents is said email;
said address is an email address;
said limitation action comprises an action of replying with said return information;
said condition is satisfied when a header of an email is received, said header including a specified keyword; and
said return information is information promoting said source to send said email.

71. The method of claim 68, wherein:
said purpose includes initiating a communication with an entity;
said request includes an address of said entity;
said request represents a transmission request for transmitting said request to said entity;
said capacity includes a capacity for transmitting said request to said entity;
said control action comprises an action of permitting said transmission request;
said limitation action comprises an action of rejecting said transmission request;
said condition is satisfied when security information agrees with registered information, said security information being information inputted from said source; and
said return information is information promoting said source to input said security information.

72. The method of claim 61, wherein said resource includes means for causing a notification to a party.

73. The method of claim 72, wherein:
said notification is a ringing sound;
said resource includes means for talking with said source;
said address is a telephone number;
said request is a incoming telephone call;
said request includes a telephone number of said source;
said condition is satisfied when an operation is performed, said operation being an operation for answering said call;
said control action comprises an action of performing said talking with said source;
said limitation action comprises an action of stopping said ringing sound before said operation is performed; and
said return information is audio information promoting said source to send a voice message.

74. The method of claim 72, wherein:
said address is a telephone number;
said request includes a telephone number of said source;
said condition is satisfied when specified information is received;
said limitation action comprises an action of rejecting said use; and
said return information is a voice guidance message promoting said source to send said specified information.

75. The method of claim 74, wherein said specified information is selected from the group consisting of a number entered via a keypad, a voice, and an image.

76. The method of claim 74, wherein said means for causing a notification is means for transmitting a call to a telephone.

77. The method of claim 72, wherein:
said request is an email; and
said notification is a notification for displaying that said email has been received.

78. The method of claim 61, wherein:
said limitation action comprises an action of rejecting said use before an operation is performed, said operation being an operation for answering a incoming telephone call;
said return information is information to report a wait status to said source, said wait status representing a status waiting for said operation to be performed; and
said control action comprises an action without intervention by a party who is on the destination side of said request.

79. The method of claim 78, wherein:
said resource includes a means for determining status information of a status of a device on the destination side of said request; and
said control action comprises an action of sending said status information to said source.

80. The method of claim 79, wherein:
said status is a position;
said means for determining is GPS (Global Positioning System) means for determining position data of said position; and
said status information is said position data.

81. The method of claim 79, wherein:
said status is a position; and
said status information is a position data, said position data representing position of a cellular phone based on position of cellular phone base stations.

82. The method of claim 79, wherein:
said status is a change of a status;
said means for determining is a means for determining information of said change; and
said status information includes said information of said change.

83. The method of claim 82, wherein said change is selected from the group consisting of a change of a position, and a change of a speed.

84. The method of claim 82, wherein said action of sending is performed when said change occurs.

85. The method of claim 79, wherein:
said means for determining is a means for determining status of a communication program, said status including an online status, said online status representing that said program is ready for communication.

86. The method of claim 78, wherein:
said resource includes a camera; and
said control action comprises an action of sending images to said source.

87. The method of claim 78, wherein:
said resource includes a microphone; and
said control action comprises an action of sending sound to said source.

88. The method of claim 78, wherein:
said resource includes information output means for outputting information to said party; and
said control action comprises an action of outputting information to said party.

89. The method of claim 78, wherein said resource includes a storage device.

90. The method of claim 89, wherein:
said storage device is a device for storing a direction file, said direction file being configuration information for customizing behavior of said apparatus, said configuration information including said address; and
said control action comprises an action of changing said configuration information.

91. The method of claim 78, wherein said resource includes a control means for receiving a command and for executing said command.

92. The method of claim 91, wherein said control means is a means for controlling an outside device.

93. The method of claim 78, wherein said resource includes a program that is available for executing on a computer system.

94. The method of claim 93, wherein said program is a communication program.

95. The method of claim 61, wherein said condition is satisfied when specified information is received.

96. The method of claim 95, wherein said specified information is determined by a mechanism.

97. The method of claim 96, wherein:
said specified mechanism is a mechanism for using a one-time passwords (OTP); and
said information is said OTP.

98. The method of claim 95, wherein:
said return information is information promoting said source to send said specified information; and
said return information includes information for determining said specified information.

99. The method of claim 61, wherein said address is an Internet protocol (IP) address.

100. The method of claim 61, wherein said address is a URL.

101. The method of claim 61, further comprising causing an action of updating said list; and
wherein a first-positive-determination is a determination that any member on said list is included in said request.

102. The method of claim 101, further comprising:
responsive to said first-positive-determination, causing said control action; and
wherein said updating comprises adding an address included in said request to said list.

103. The method of claim 101, further comprising:
responsive to said first-positive-determination, causing an inhibiting action; and
wherein said inhibiting action is an action of rejecting said use; and
said updating comprises adding an address included in said request to said list.

104. The method of claim 101, wherein said updating comprises deleting an address from said list.

105. The method of claim 61, further comprising:
communicating with a server; and
receiving said request from said server; and
wherein said request is a request stored in said server for achieving said purpose.

106. The method of claim 61, further comprising:
receiving requests from a plurality of sources; and
transmitting requests to a plurality of destinations.

107. A method comprising the steps of:
determining whether any member on a list of identification information is included in a request;
responsive to a positive determination, causing a control action; and
causing a limitation action;
said list of identification information comprising at least one identification information;
said request being information that is received before a purpose of a source of said request is achieved;
said identification information being an original information that can be determined by a user;
said positive determination being a determination that any member iR on said list is included in said request;

said control action being an action of performing use of a resource for achieving said purpose;

said limitation action comprising a notification, said notification being a ringing sound; and said control action comprising inhibiting said notification.

108. The method of claim 107, wherein:

said resource includes a means for determining status information of a status of a device on the destination side of said request; and said control action comprises an action of sending said status information to said source.

109. The method of claim 108, wherein:

said status is a position;

said means for determining is GPS (Global Positioning System) means for determining position data of said position; and said status information is said position data.

110. The method of claim 108, wherein:

said status is a position; and said status information is a position data, said position data representing position of a cellular phone based on position of cellular phone base stations.

111. The method of claim 108, wherein:

said status is a change of a status;

said means for determining is a means for determining information of said change; and said status information includes said information of said change.

112. The method of claim 111, wherein said change is selected from the group consisting of a change of a position, and a change of a speed.

113. The method of claim 111, wherein said action of sending is performed when said change occurs.

114. The method of claim 107, wherein:

said resource includes a camera; and said control action comprises an action of sending images to said source.

115. The method of claim 107, wherein:

said resource includes a microphone; and said control action comprises an action of sending sound to said source.

116. The method of claim 107, wherein said resource includes a control means for receiving a command and for executing said command.

117. The method of claim 116, wherein said control means is a means for controlling an outside device.

118. The method of claim 107, wherein said resource includes a program that is available for executing on a computer system.

119. The method of claim 118, wherein said program is a communication program.

120. The method of claim 107, further comprising:

receiving requests from a plurality of sources; and transmitting requests to a plurality of destinations.

121. A method comprising the steps of:

establishing a communication connection with an apparatus of claim 1;

communicating with said apparatus.

122. The method of claim 121, wherein said resource is a storage device.

123. The method of claim 122, wherein said resource is a time from beginning to end of use of said storage device.

124. The method of claim 123, wherein said purpose includes delivery of communication contents;

said time is time from beginning to end of said delivery;

said control action comprises an action of finishing said use after perfecting said delivery; and said limitation action comprises an action of finishing said use before perfecting said delivery.

125. The method of claim 124, wherein:

said request is an email;

said address is an email address;

said limitation action comprises an action of replying with said return information;

said condition is satisfied when an email is received, said email including a specified keyword; and said return information is information promoting said source to send said email.

126. The method of claim 122, wherein said resource is a capacity of said storage device for storing communication contents;

said purpose includes delivery of said communication contents;

said request is a part of said communication contents;

said control action comprises an action of storing said communication contents;

said limitation action comprises an action of storing said part.

127. The method of claim 126, wherein:

said part is a header of an email;

said address is an email address;

said limitation action comprises an action of replying with said return information;

said condition is satisfied when a header of an email is received, said header including a specified keyword; and said return information is information promoting said source to send said email.

128. The method of claim 121, wherein said resource is a communication channel capacity.

129. The method of claim 128, wherein:

said purpose includes delivery of communication contents;

said capacity is capacity for perfecting said delivery;

said control action comprises an action of finishing communication after perfecting said delivery; and said limitation action comprises an action of finishing said communication before perfecting said delivery.

130. The method of claim 129, wherein:

said request is a header of an email;

said communication contents is said email;

said address is an email address;

said limitation action comprises an action of replying with said return information;

said condition is satisfied when a header of an email is received, said header including a specified keyword; and said return information is information promoting said source to send said email.

131. The method of claim 121, wherein said condition is satisfied when specified information is received.

132. The method of claim 131, wherein said specified information is determined by a mechanism.

133. The method of claim 132, wherein:

said specified mechanism is a mechanism for using a one-time passwords (OTP); and said information is said OTP.

134. The method of claim 131, wherein:

said return information is information promoting said source to send said specified information; and said return information includes information for determining said specified information.

135. The method of claim 121, wherein said address is an Internet protocol (IP) address.

136. The method of claim 121, further comprising causing an action of updating said list; and wherein a first-positive-determination is a determination that any member 144 on said list is included in said request.

137. The method of claim 136, further comprising:
responsive to said first-positive-determination, causing said control action; and
wherein said updating comprises adding an address included in said request to said list.

138. The method of claim 136, further comprising:
responsive to said first-positive-determination, causing an inhibiting action; and
wherein said inhibiting action is an action of rejecting said use; and
said updating comprises adding an address included in said request to said list.

139. The method of claim 136, wherein said updating comprises deleting an address from said list.

140. The method of claim 121, further comprising:
receiving requests from a plurality of sources; and
transmitting requests to a plurality of destinations.

* * * * *